United States Patent

Hazama et al.

Patent Number: 5,822,207
Date of Patent: Oct. 13, 1998

[54] APPARATUS AND METHOD FOR INTEGRATING INTELLIGENT MANUFACTURING SYSTEM WITH EXPERT SHEET METAL PLANNING AND BENDING SYSTEM

[75] Inventors: Kensuke Hazama, Yorba Linda; Liang-Yu Huang, Irvine, both of Calif.

[73] Assignee: Amadasoft America, Inc., La Mirada, Calif.

[21] Appl. No.: 706,830

[22] Filed: Sep. 3, 1996

Related U.S. Application Data

[60] Provisional application No. 60/016,958 May 6, 1996.
[51] Int. Cl.[6] .................................................... G06F 19/00
[52] U.S. Cl. ............................. 364/468.03; 364/468.1; 364/472.01; 364/474.07; 395/919
[58] Field of Search .................... 364/468.03, 468.04, 364/474.24, 474.05, 474.07, 472.01, 188, 189, 476.01, 468.09, 468.1, 468.24, 468.02; 395/964, 965, 966, 967, 50, 53, 919; 72/389.1, 379.2; 345/964–967

[56] References Cited

U.S. PATENT DOCUMENTS

| | | | |
|---|---|---|---|
| 5,005,394 | 4/1991 | Sartorio et al. | 364/476.01 X |
| 5,307,282 | 4/1994 | Conradson et al. | 364/468.09 |
| 5,315,522 | 5/1994 | Kauffman et al. | 364/474.22 X |
| 5,396,265 | 3/1995 | Ulrich et al. | 364/474.24 X |
| 5,587,914 | 12/1996 | Conradson et al. | 364/468.01 |

OTHER PUBLICATIONS

Erion—"Generic Environment for USP–Based Experts"—Center for Integrated Manufacturing Decision Systems—Carnegie–Mellon Univeristy—Mar. 1990—pp. 113–136.

Amada Window Unfold: Manual for Cadkey, Table of Contents, pp. 1–35, & Index, U.s. Amada, Ltd., Buena Park California (Nov. 1995).

Nilsson, Nils J., "Problem–Solving Methods in Artificial Intelligence", McGraw–Hill Book Company, New York, Chapter 3, pp. 43–67 (1971).

Bourne et al., David A., "Feature Exchange Language Programmers Guide", The Robotics Institute at Carnegie Mellon University, Pittsburgh, PA (Jan. 1994).

Bourne et al., David A., "Using the Feature Exchange Language in the Next Generation Controller," CMU–RI–TR–90–19, The Robotics Institute at Carnegie Mellon University, Pittsburgh, PA (Aug. 1990).

Bourne et al., David A., "The Operational Feature Exchange Language," CMU–RI–TR–90–06, The Robotics Institute at Carnegie Mellon University, Pittsburgh PA (Mar. 1990).

Naessens, Diederik, "Flexible Automation On Press Brakes", *American Machinist*, pp. 36–39 (Jun. 1994).

Wysong Literature, *The Perfect Forming Touch: New, PH Plus Series, DNC Press Brakes*, Cat. PHP–1, Wysong & Miles Company, Greensboro, North Carolina (1993).

Bourne, David A., "Intelligent Manufacturing Workstations", *Knowledge–Based Automation of Prcoesses*, Session at the 1992 ASME Winter Annual Meeting (Nov. 1992).

(List continued on next page.)

Primary Examiner—Joseph Ruggiero
Attorney, Agent, or Firm—Greenblum & Bernstein, P.L.C.

[57] ABSTRACT

An apparatus and method are provided for integrating an intelligent manufacturing system with an expert sheet metal planning and bending system. The intelligent manufacturing system manages and distributes part design and manufacturing information throughout the locations of a production facility. The expert planning system includes a plurality of expert modules for proposing a bending plan, including bend sequence and tooling selections, and robot motion planning and repositioning. Through the various features and aspects of the present invention, an operator can selectively modify and adapt these integrated systems for particular bend applications, including robot-based and human assisted bending operations.

71 Claims, 29 Drawing Sheets

OTHER PUBLICATIONS

*Amada Unfold: Manual for Autocad*, Table of Contents, Index & pp. 1–28, U.S. Amada, Ltd., Buena Park, California (Mar. 1994).

*Amada Unfold: Manual for Cadkey*, Table of Contents, Index & pp. 1–18, U.S. Amada, Ltd., Buena Park, California (May 1994).

*Amada Windows Unfold: Manual for Cadkey*, Table of Contents & pp. 1–13, U.S. Amada, Ltd., Buena Park, California (Nov. 1995).

*AMACOM: AP40 Literature*, Version 4, Amada Co., Ltd., Japan (Jul. 1996).

*AMACOM: AP60 Literature*, Amada Co., Ltd., Japan (Jul. 1996).

*AMACOM: AP200 Literature*, Amada Co., Ltd., Japan (Jul. 1996).

*Bending Soft*, Literature on the AMACOM AP40, No. 9112–01, Amada Co., Ltd., Japan (Publication date Unknown).

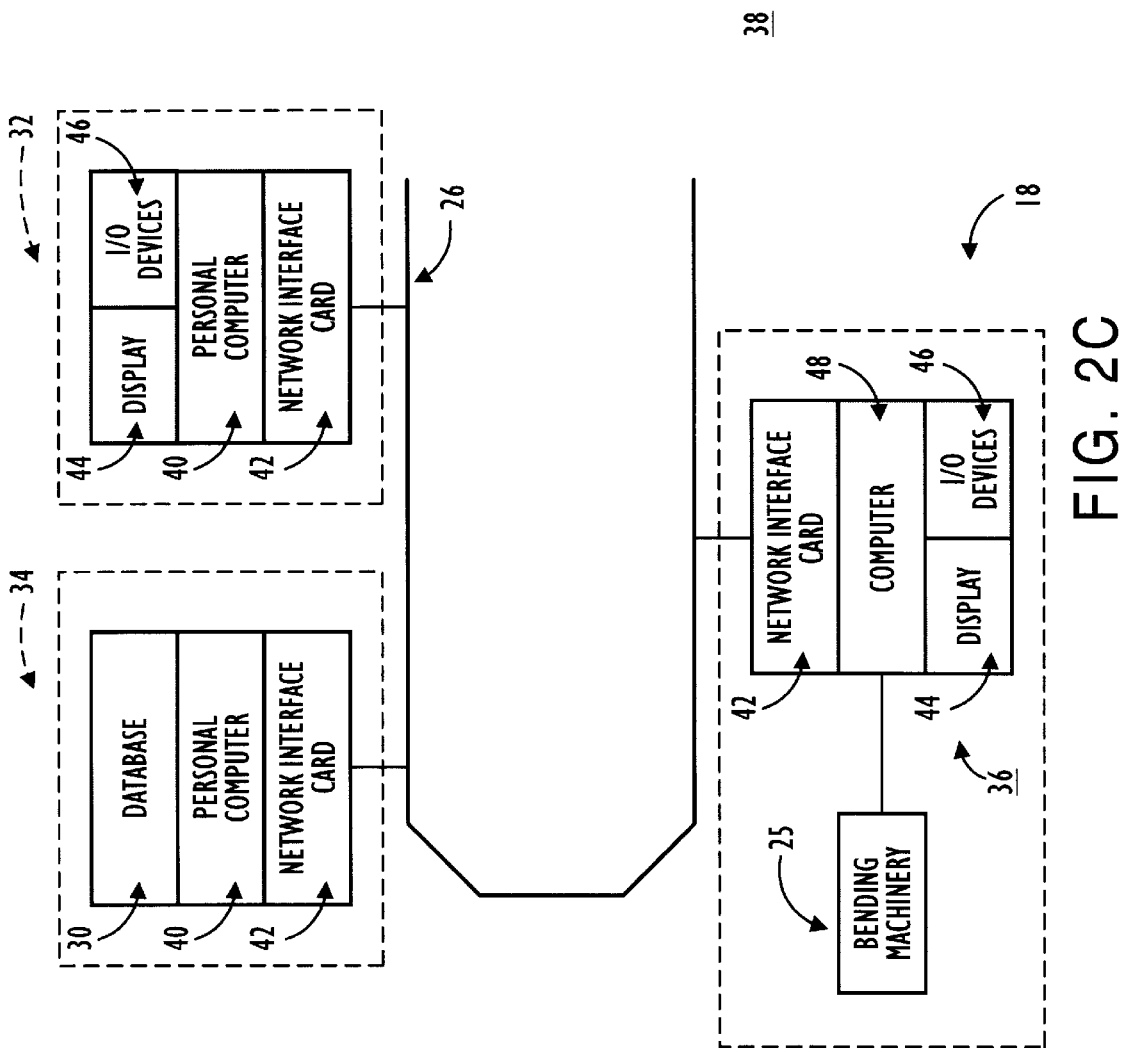

| ID1 | SEQ1 |
|---|---|
| 1 | #1 |
| 2 | #4 |
| 3 | #3 |
| 4 | #2 |
| 5 | #5 |
| 6 | #5 |

| ID1 | ID2 |
|---|---|
| 1 | 1 |
| 2 | 4 |
| 3 | 3 |
| 4 | 2 |
| 5 | 5 |
| 6 | 5 |

FIG. 23E

| ID1 | SEQ2 |
|-----|------|
| 1   | #1   |
| 2   | #2   |
| 3   | #3   |
| 4   | #4   |
| 5   | #5   |
| 6   | #5   |

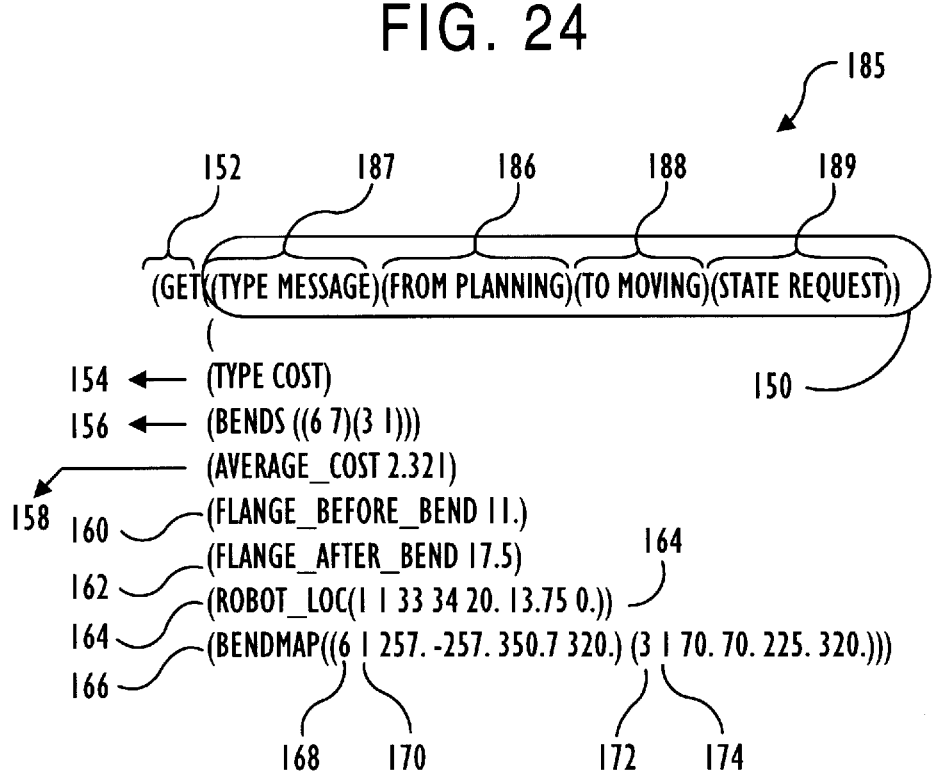

APPARATUS AND METHOD FOR INTEGRATING INTELLIGENT MANUFACTURING SYSTEM WITH EXPERT SHEET METAL PLANNING AND BENDING SYSTEM

RELATED APPLICATION DATA

This application claims the benefit of commonly assigned, U.S. Provisional Application Ser. No. 60/016,958, filed May 6, 1996, entitled "Apparatus and Method For Managing and Distributing Design and Manufacturing Information Throughout A Sheet Metal Production Facility", the disclosure of which is expressly incorporated herein by reference in its entirety. The present disclosure is also related to the disclosure provided in commonly assigned, U.S. patent application Ser. No. 08/690,084 pending, filed Jul. 31, 1996, entitled "Apparatus and Method For Managing and Distributing Design and Manufacturing Information Throughout A Sheet Metal Production Facility", which also claims the benefit of U.S. Provisional Application Ser. No. 60/016,958. The disclosure of U.S. patent application Ser. No. 08/690, 084 is expressly incorporated herein by reference in its entirety.

In addition, the present disclosure is related to the disclosures provided in the following U.S. applications: U.S. patent application Ser. No. 08/338,115 pending, entitled "Method For Planning/Controlling Robot Motion", filed on Nov. 9, 1994, in the names of David A. BOURNE et al., and U.S. patent application Ser. No. 08/386,369 pending, entitled "Intelligent System For Generating and Executing A Sheet Metal Bending Plan", filed on Feb. 9, 1995, in the names of David A. BOURNE et al., which is a continuation application of U.S. patent application Ser. No. 08/338,113, filed on Nov. 9, 1994, now abandoned. The disclosures of U.S. patent application Ser. Nos. 08/338,115 and 08/386,369 are expressly incorporated herein by reference in their entireties.

COPYRIGHT NOTICE

A portion of the disclosure of this patent document contains material which is subject to copyright protection. The copyright owner has no objection to the facsimile reproduction by anyone of the patent disclosure, as it appears in the U.S. Patent and Trademark Office patent files or records, but otherwise the copyright owner reserves all copyright rights whatsoever.

BACKGROUND OF THE INVENTION

1. Field of the Invention

The present invention generally relates to the field of manufacturing, and to the production of bent sheet metal components. More particularly, the present invention relates to an apparatus and method for integrating an intelligent manufacturing system, which manages and distributes design and manufacturing information throughout a production facility, with an expert planning system that generates a bending plan and control information for the production of sheet metal components.

2. Background Information

Traditionally, the production of bent sheet metal components involves a series of production and manufacturing stages. The first stage is a design stage during which a sheet metal part design is developed based on a customer's specifications. A customer will typically place an order for a particular sheet metal component to be produced at the facility. The customer's order will usually include the necessary product and design information so that the component may be manufactured at the facility. This information may include, for example, the geometric dimensions of the part, the material required for the part, special forming information, the batch size, the delivery date, etc.

During the design stage, a sheet metal part design may be developed by a design office at the manufacturing facility using an appropriate computer-aided design (CAD) system. Based on a customer's specifications, a two-dimensional (2-D) model of the sheet metal part may be developed by a programmer with a CAD system. Typically, a customer will provide a blueprint or drawings of the component and the critical geometric dimensions of the part. The drawings may also indicate any special forming or marking to be included in the part, as well as the location of holes or other types of openings on the surface(s) of the sheet metal part. The design programmer will often use this blueprint or drawing to develop a 2-D model on the CAD system. The 2-D model may include a flat view and one or more other perspective views of the sheet metal part, with bending line and/or dimensional information.

Before actual bending of the sheet metal component can take place, the part must first be punched and/or cut from initial sheet metal stock material. Computer numerical control (CNC) or numerical control (NC) systems are typically used to control and operate punch presses and/or plasma or laser cutting machinery to process the stock material. In order to facilitate processing of the stock material, a computer-aided manufacturing (CAM) system or CAD/CAM system can be used by a design programmer to generate control code based on the 2-D model. The control code may comprise a part program that is imported to and utilized by the punch press and/or cutting machinery to punch or cut the sheet metal component from the stock material.

The next stage in the production process is a bending plan stage. During this stage, a bending plan is developed by a bending operator at the shop floor. The operator will normally be provided with the blueprint or 2-D drawing of the component, along with one or more samples of the cut or punched stock material. With these materials, the bending operator will develop a bending plan which defines the tooling to be used and the sequence of bends to be performed. The bending workstation may include CNC metal bending machinery, such as a CNC press brake, that enables the operator to enter data and develop a bending code or program based on the bending plan.

Once the bending plan is developed, the operator will set up the workstation for initial testing of the bending sequence. During this testing stage, the punched or cut stock material will be manually loaded into the press brake and the press brake will be operated to execute the programmed sequence of bands on the workpiece. The operator will analyze the final bend sheet metal part and inspect it for conformance with the customer's specifications. Based on the results of the initial runs of the press brake, the operator may modify the bending sequence by editing the bending program. Further testing will typically be conducted until the bent sheet metal component is within the required design specifications.

One of the final stages in the production process is the bending stage. After the bending plan has been developed and tested, the bending operator will set up the required tooling at the bending station and operate the press brake based on the bending plan and the stored bending program or code. Job scheduling is also performed in order to ensure that the necessary amount of punched or cut stock material will be available on time at the bending station, and so that other jobs will be completed by the requested delivery dates. After the final bent sheet metal parts have been produced, the parts may then be assembled and packaged for shipping to the customer.

The conventional production and manufacturing process described above suffers from several drawbacks and disadvantages. For example, although the design and manufacturing data for each customer's order is normally archived physically (e.g., by paper in a file cabinet) or electronically (e.g., by storing on a disk or magnetic tape), such data are normally stored separately and not easily retrievable. Further, such data is often lost or damaged and valuable time is often lost in attempting to distribute the design and manufacturing information to the shop floor and to the other locations throughout the production facility. Considerable manufacturing time is also lost during the development of the sheet metal part design and bending plan, since the development of the part design and bending plan is primarily performed by the design programmer and the bending operator, and relies heavily on the individual's knowledge, skill and experience.

In recent years, there have been developments and attempts to improve the conventional sheet metal manufacturing process and to improve the efficiency of the overall process. For example, the use and development of 2-D and three-dimensional (3-D) modeling in commercially available CAD/CAM systems has facilitated and improved the production process and the modeling of bent sheet metal components. The 2-D and 3-D representations of the part may now be utilized by the design programmer and operator to better understand the geometry of the part and to more efficiently develop a part design and bending code sequence. The ability to store and transfer data electronically has also improved the flow of information from the design office to locations on the shop floor. With the advancement of computers and data communication networks, it is no longer necessary to search through a cabinet or file of old paper tapes or magnetic disks.

Other recent developments have also improved the efficiency of the design and manufacturing process, and have provided a greater level of automation in the production process of sheet metal components. For example, robotic manipulators and controllers have been developed for handling and positioning sheet metal workpieces within a press brake to perform bending operations. Further, material handlers have been provided for loading and positioning workpieces at a location for a robot to grasp and for unloading finished workpieces. Repositioning grippers have also been introduced for holding a workpiece within a press brake while a robot changes or repositions its grasp of the workpiece.

For example, a conventional bending workstation 110 for bending a sheet metal part (workpiece) 116 under the control of a manually created program downloaded to various control devices is illustrated in FIG. 1. The exemplary bending workstation 110 of FIG. 1 may comprise a BM100 Amada workstation, available from Amada America, Inc. (previously operating under the corporate name of U.S. Amada Ltd.), Buena Park, Calif. As shown in FIG. 1, the bending workstation 110 includes: a press brake 129 for bending workpiece 116; a five degree-of-freedom (5 DOF) robotic manipulator (robot) 112 for handling and positioning workpiece 116 within press brake 129; a material loader/unloader (L/UL) 130 for loading and positioning a blank workpiece at a location for robot 112 to grab, and for unloading finished workpieces; and a repositioning gripper 132 for holding workpiece 116 while robot 112 changes its grasp.

As further shown in FIG. 1, press brake 129 includes at least one die 119 which is placed on a die rail 122, and at least one corresponding punch tool 118 which is held by a punch tool holder 120. Press brake 129 further includes a backgauge mechanism 124 and one or more bending stages (three bending stages are illustrated in the example of FIG. 1). In addition, robot arm 112 includes a robot arm gripper 114 which is used to grasp workpiece 116. Material loader/unloader 130 may include several suction cups 131 which create an upwardly directed suction force for lifting a sheet metal workpiece 116, thereby allowing L/UL 130 to pass workpiece 116 to gripper 114 of robot 112, and to subsequently retrieve a finished workpiece 116 from gripper 114 and unload the finished workpiece.

In operation, loader/unloader (L/UL) 130 lifts a blank workpiece 116 from a receptacle (not shown), and raises and moves workpiece 116 to a position to be grabbed by gripper 114 of robot 112. Robot 112 then maneuvers itself to a position corresponding to a particular bending stage located within bending workstation 110. As shown in FIG. 1, stage 1 comprises the stage at the leftmost portion of press brake 129, stage 2 is located to the right of stage 1 along die rail 122, and stage 3 is located to the right of stage 1 in the drawing. If, for example, a bend is to be made at stage 1, robot 112 will move workpiece 116 to stage 1 and maneuver workpiece 116 within press brake 129, at a location between punch tool 118 and die 119, until it reaches and touches a backstop portion of backgauge mechanism 124. With the aid of backgauge mechanism 124, the position of workpiece 116 is adjusted by robot arm 112. Then, a bend operation is performed on workpiece 116 at stage 1 by moving die rail 122 upward. As punch tool 118 and die 119 simultaneously contact workpiece 116, so that workpiece 116 assumes a relatively stable position within press brake 129, gripper 114 may release its grasp on workpiece 116 to move gripper 114 away from workpiece 116. Press brake 129 will then complete its bending of workpiece 116, by completing the upward movement of die 119 until the proper bend has been formed.

Depending upon the next bend to be performed, and the configuration of workpiece 116, the gripping position of gripper 114 may need to be repositioned. Repositioning gripper 132, shown in FIG. 1, is provided for this purpose. Before performing the next bend, for which repositioning of robot gripper 114 is needed, workpiece 116 will be moved by robot 112 to repositioning gripper 132. Repositioning gripper 132 will then grasp workpiece 116 so that robot gripper 114 can regrip workpiece 116 at a location appropriate for the next bend or sequence of bends.

The bending workstation 110 illustrated in FIG. 1 is controlled by several control devices which are housed separately, including an MM20-CAPS interface 140, a press brake controller 142, a robot controller 144, and a load/unload unit controller 146. Press brake controller 142 comprises an NC9R press brake controller, and robot controller 144 comprises a 25B robot controller, which are each available from Amada America. Each of press brake controller 142 and robot controller 144 have their own CPU and programming environments. Load/unload unit controller 146 comprises a stand alone Programmable Logic Controller (PLC), and is wired to respective consoles provided for press brake controller 142 and robot controller 144.

Each of controllers 142, 144, and 146 has a different style bus, architecture, and manufacturer. They are coordinated primarily by parallel I/O signals. Serial interfaces are provided for transporting bending and robot programs to the controllers, each of which is programmed in a different manner. For example, logic diagrams are used to program the PLC of the load/unload controller 146, and RML is used to program robot controller 144.

In order to generate a plan for bending workstation 110, an operator must determine the proper bend sequence, tooling selection and tool stage layout, and the required robot motion and gripper repositioning. After determining the plan, supplied programs or software 148, such as an NC9R press brake program and a 25B RML robot program, may be developed by the operator for the various controllers. Each of these programs may be created with the use of an initial part design created from a CAD system. Both the robot program and the bending program must be developed manually, and are quite labor-intensive. In addition, design programmers often examine each part style to determine if previously developed and classified programs may be used or whether a new program must be written. However, since each classified program typically supports only a narrow range of acceptable part dimensions, new programs must frequently be written by the operators. The final RML robot program, when complete, is compiled and downloaded by the MM20-CAPS system 140 to robot controller 144. The bending program may be entered and debugged on a control pendant provided on press brake controller 142.

In view of the drawbacks of such systems, research and development has taken place in the field of intelligent/expert systems for automatically generating a bending plan and other manufacturing information required to produce sheet metal components. For example, U.S. patent application Ser. No. 08/386,369, entitled "Intelligent System For Generating and Executing A Sheet Metal Bending Plan", discloses an intelligent, automated bending system which generates a bending plan and then executes the generated plan to produce a bent sheet metal component. The system disclosed therein includes one or more expert modules or subsystems for providing expert information regarding tooling, holding and robot motion to a bend sequence planner, which determines and generates a final bending plan. A sequencer is also provided for executing the final generated plan and for formulating and transmitting the appropriate commands to the various components within the bending workstation in order to produce the bent sheet metal components. Further, U.S. patent application Ser. No. 08/338,115, entitled "Method for Planning/Controlling Robot Motion" discloses an expert system for planning and controlling the motion of a robot in order to facilitate the production of sheet metal components. The system disclosed therein plans the motion of a robot within a space confined by obstacles, so that the robot can hold and maneuver a workpiece throughout a sequence of bending operations to be performed by a bending apparatus.

Other advancements have led to the improvement of the management and distribution of design and manufacturing information throughout a production facility. For example, U.S. patent application Ser. No. 08/690,084 (Attorney Docket No. P14651), which was filed based on the priority of U.S. Provisional Application No. 60/016,958, discloses an apparatus and method for improving the efficiency and organization of stored expert knowledge by logically storing both the design and manufacturing information related to sheet metal parts, so that they may be easily accessed or retrieved from any area within the production facility. According to one aspect, previous job data is stored at a central database or file server so that it may be accessed from any location within the factory, and a searching method or process is provided so that previous job information that is similar to or the same as a current job request may be located and retrieved. Various other features are also disclosed in U.S. patent application Ser. No. 08/690,084 to, for example, facilitate the development of a bending plan by human operators.

Despite such advancements, there is still a need to provide greater flexibility in the manufacturing process and to integrate the features of systems similar to that described above in order to accommodate various types of workstations and job requests. Thus, while robotic machinery and expert systems have led to greater automization in the production of sheet metal components, such components and systems have not been integrated with intelligent manufacturing systems that manage and distribute part information to workstations throughout a manufacturing facility. There is also a need for a system that provides expert knowledge and information for both robotic and human operated machinery. Such a system could increase productivity by enabling expert systems to be selectively accessed to provide assistance to human operators in selecting and determining, for example, tooling or an optimum bend sequence, when developing a bending plan. In addition, by providing greater flexibility and customization in such expert and intelligent manufacturing systems, a bending operator or programmer could adapt such systems for a wide variety of uses to accommodate different types of bending workstations and machinery.

SUMMARY OF THE INVENTION

In view of the foregoing, the present invention, through one or more of its various aspects, embodiments and/or specific features or sub-components thereof, is provided to bring about one or more objects and advantages, such as those specifically noted below.

A general object of the present invention is to provide greater flexibility in intelligent manufacturing systems and bending expert systems in order to increase the efficiency of the manufacturing and production of bent sheet metal components.

A further object of the invention is to provide an apparatus and method for integrating an intelligent manufacturing system with an expert sheet metal planning and bending system.

Another object of the present invention is to provide an apparatus and method that permits an operator to selectively customize an expert planning and bending system so as to accommodate various applications, including both robotic and non-robotic assisted bending applications.

Yet another object of the present invention is to provide an apparatus and method that permits an expert planning and bending system to communicate with and respond to messages from an intelligent manufacturing system. Such an interface may include an apparatus and method for generating, transmitting and responding to commands sent in a query-based language to and from the bending expert system. An apparatus and method may also be provided for translating commands and/or information received from the expert system in order to store bending plan information within the intelligent manufacturing system.

Another object of the invention is to provide an apparatus and method for automatically generating constraint phrases based on, for example, bend sequence constraints entered by an operator, wherein the constraint phrase is utilized by the expert planning system when generating a bending plan.

The present invention is therefore directed towards an integrated sheet metal manufacturing and production system, comprising: an intelligent manufacturing system for developing a bend model of a sheet metal part to be produced; an expert planning system for developing and proposing a bending plan for producing the sheet metal part based on the bend model, wherein the expert planning system includes a plurality of expert modules; and a system for selectively activating the plurality of expert modules in order to adapt the expert planning system for different bending applications, whereby the expert planning system develops the bending plan based on the plurality of expert modules that are selectively activated.

According to the present invention, a method for providing an integrated sheet metal manufacturing and production system is also provided. The method may include the steps of: developing a bend model of a sheet metal part to be produced with an intelligent manufacturing system; developing and proposing a bending plan for producing the sheet metal part based on the bend model with an expert planning system that includes a plurality of expert modules; and selectively activating the plurality of expert modules in order to adapt the expert planning system for different bending applications, whereby the expert planning system develops the bending plan based on the plurality of expert modules that are selectively activated.

An integrated sheet metal manufacturing and production system is also provided, wherein the system comprises an intelligent manufacturing system for developing a bend model of a sheet metal part to be produced and an expert planning system for developing and proposing a bending plan for producing the sheet metal part based on the bend model. A constraint system is also provided for selectively constraining the bending plan developed by the expert planning system based on a constraint entered by an operator. The constraint system may include a constraint manager for developing a constraint phrase in accordance with the constraint entered by the operator. The constraint phrase may be utilized by the expert planning system when developing the bending plan. In addition, the constraint may comprise a bend sequence constraint entered by an operator, and the constraint manager may develop the constraint phrase based on the bend sequence constraint.

The present invention also encompasses a method for developing constraint phrases based on constraints entered by an operator. The method may comprises the steps of: developing a bend model of a sheet metal part to be produced; developing and proposing a bending plan for producing the sheet metal part based on the bend model; and selectively constraining the developed bending plan based on a constraint entered by an operator. The method may also include the steps of developing a constraint phrase in accordance with the constraint entered by the operator, wherein the constraint phrase may be utilized when developing the bending plan. In addition, the constraint may comprise a bend sequence constraint entered by an operator, and the constraint phrase may be adapted to the developed based on the bend sequence constraint.

The present invention is also directed to an integrated manufacturing system and method for interfacing an intelligent manufacturing system with an expert planning system. The system and method may comprise: developing a bend model of a sheet metal part to be produced with an intelligent manufacturing system; developing and proposing a bending plan for producing the sheet metal part based on the bend model with an expert planning system; and generating and transferring messages from the intelligent manufacturing system to the expert planning system with an interface module, whereby the expert planning system develops the bending plan based on the transferred messages. In accordance with the present invention, the messages may be generated by the interface module based on a Feature Exchange Language (FEL).

In addition, an apparatus and method for sheet metal production are provided that comprise: an intelligent manufacturing system for developing a bend model of a sheet metal part to be produced; an expert planning system for developing and proposing a bending plan for producing the sheet metal part based on the bend model; and a system for selectively activating the expert planning system for different bending applications, whereby an operator may independently develop a bending plan based on the bend model or selectively activate the expert planning system to develop the bending plan.

The above-listed and other objects, features, and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of illustrated embodiments of the present invention, in which like references represent similar parts throughout the several views of the drawings, and wherein:

FIGS. 2B and 2C illustrate, in block diagram form, a progressive sheet metal manufacturing facility, according to additional aspects and features of the present invention;

FIG. 23E illustrates an exemplary bend sequence table that may be used to indicate the bend sequence entered by the operator in accordance with the bend identification number system utilized in FIG. 23C; and FIG. 24 illustrates an example of an FEL planning message that may be sent from the planning expert to the motion expert of the expert planning system.

BRIEF DESCRIPTION OF THE APPENDICES

Figure 1:
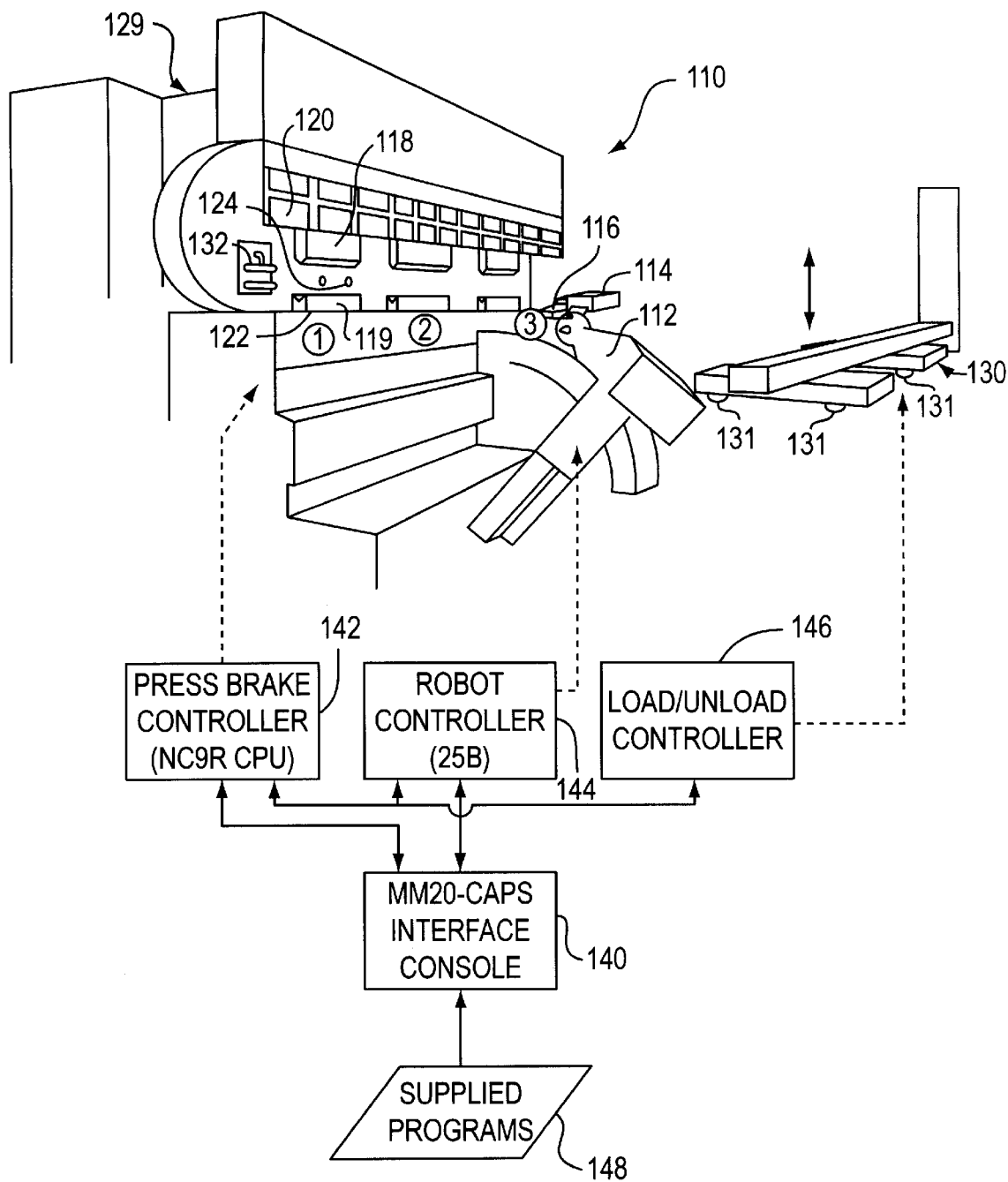
FIG. 1 illustrates an exemplary prior art bending workstation that includes robot-based machinery.

In order to further facilitate the detailed description of the present invention, reference is made to the noted plurality of appendices by way of non-limiting examples of features of the present invention, wherein:

Appendix A includes examples of the FEL messages that may be sent when executing the expert planning system to develop a bending plan for a robot-based workstation in accordance with constraints set by an operator;

Appendix B includes examples of the FEL messages that may be sent to the expert planning system when developing a bending plan for a robot-based workstation with no constraints entered by an operator;

Appendix C includes an exemplary configuration file that contains information regarding the status of the expert modules and various parameters;

Appendix D includes examples of the final bending plan information and FEL messages that may be generated by the expert planning system, and that may be stored in a "FIN" file;

Appendix E is an exemplary "EVB" file, that may include data relating to backgauge settings and press brake movements or operations without X-gauging information;

Appendix F is an exemplary "EVT" file, that may include tool setup data and backgauge data for setting the various tool stages;

Appendix G is an exemplary "EVX" file, that may include data relating to the proposed press brake movements and backgauge positions of a bending plan;

Appendix H is an exemplary "RB1" file, that may include FEL messages having data relating to robot movements with X-gauging information; and Appendix I is an exemplary "RB2" file, that may include FEL messages for defining robot movements without X-gauging information.

DETAILED DESCRIPTION OF THE INVENTION

According to an aspect of the present invention, an apparatus and method are provided for integrating an intelligent manufacturing system with an expert sheet metal planning and bending system. The intelligent manufacturing system may be adapted to manage and distribute design and manufacturing information throughout a factory, and may provide various features and processes for facilitating the design and production of components within the factory. Such features may include the ability to search and retrieve previous job information from a central database, so that previous job information (which may include design and manufacturing information of previously produced parts) may be used when generating a plan for developing a new part that has the same or similar features to that of a previously produced part. The intelligent manufacturing system may also provide various graphical user interfaces in order to facilitate the generation of a bending plan by an operator. As discussed below, the various features disclosed in U.S. patent application Ser. No. 08/690,084 and U.S. Provisional Application No. 60/016,958 may be used and implemented in the intelligent manufacturing system disclosed herein.

The expert system may include one or more expert modules for generating and executing a bending plan for producing bent sheet metal components. These expert modules may include expert systems or subsystems for determining an optimum bend sequence and tooling (including tool selection and tool stage layout) for the bending plan. In addition, for robot-based workstations, robot handling and motion experts may be provided for determining the robot motion paths and holding steps for executing the bending plan. A repositioning expert may also be provided for determining the sequences and operations associated with controlling a repositioning gripper and repositioning operations of the robot. The features and aspects described in U.S. patent application Ser. Nos. 08/386,369 and 08/338,115 may be implemented in such an expert sheet metal planning and bending system. A more detailed summary of the features of the expert system, as well as that of the intelligent manufacturing system to be integrated in the apparatus and method of the present invention, will be provided below.

The features of the present invention may be used in a wide variety of factory environments and settings and, more particularly, the invention may be implemented in factory environments wherein a series of production and manufacturing stages are effectuated at different locations. By way of non-limiting embodiments and examples, the present invention will be described herein with reference to the production of bent sheet metal components at, for example, a progressive sheet metal manufacturing facility that may include robotic or automated machinery at one or more workstations.

Figure 2A:
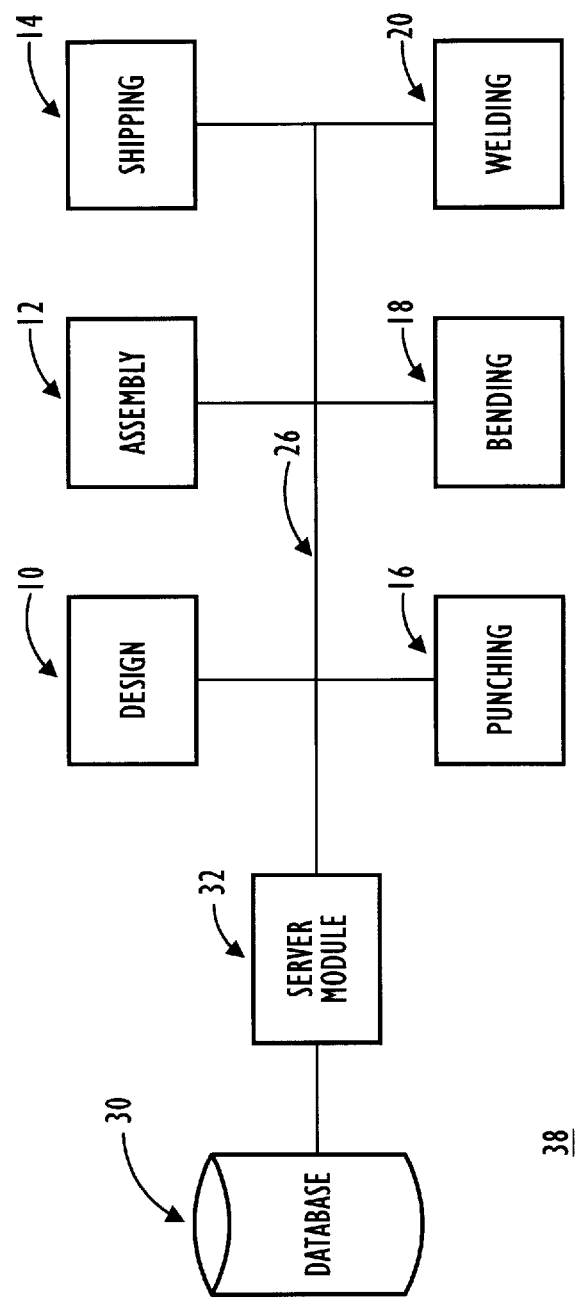
FIG. 2A illustrates, in block diagram form, a progressive sheet metal manufacturing facility, according to an aspect of the present invention.

Referring to FIG. 2A, a progressive sheet metal manufacturing facility 38 is generally illustrated in block diagram form, according to an embodiment of the present invention. As shown in FIG. 2A, the sheet metal manufacturing facility or factory 38 may include a plurality of locations 10, 12, 14 . . . 20 that are dispersed throughout the factory. These locations may comprise a design office 10, an assembly station 12, a shipping station 14, a punching station 16, a bending station 18 and a welding station 20. Although the sheet metal factory 38 in FIG. 2A is depicted as having only six discrete locations, the factory may of course include more than six discrete locations and may also include more than one location for each type of office or station illustrated in FIG. 2A. For example, depending upon the size of and production capacity requirements for the facility 38, more than one punching station 16, bending station 18 and/or welding station 20 may be provided. In addition, the factory 38 may include more than one design office 10, assembly station 12 or shipping station 14, and may also include other types of locations for facilitating the production and manufacturing of components, such as bent sheet metal components.

Each of the locations 10, 12, 14 . . . 20 within the factory 38 may be adapted and include equipment to execute one or more of the discrete production and manufacturing stages or processes associated with the production and manufacturing of the components. For example, the design office 10 may include an appropriate CAD/CAM system, to facilitate the development of the sheet metal part design based on a customer's specification. The CAD/CAM system may comprise one or more personal computers, a display unit, a printer and commercially available CAD/CAM software. By way of a non-limiting example, the CAD/CAM system of the design office 10 may include AUTOCAD or CADKEY, or an Amada AP40 or AP60 CAD/CAM system available from Amada America, Inc. (previously operating under the corporate name of U.S. Amada Ltd.), Buena Park, Calif. In addition, other commercially available CAD systems may be used, such as VELLUM, which is a Windows based CAD system available from Ashlar Inc. With the CAD/CAM software, the design programmer may develop a 2-D model and/or 3-D model of the sheet metal part based on the drawings and data provided in the customer's order. The design programmer may also generate control code based on the sheet metal part design in order to generate a part program for controlling, for example, CNC punch presses and/or cutting machinery to punch or cut the sheet metal component from stock material.

Punching station 16 and bending station 18 may each be provided with any combination of CNC and/or NC based machine tools. For example, punching station 16 may include one or more CNC and/or NC punches such as COMA series and/or PEGA series Amada turret punch presses or other commercially available CNC and/or NC punch presses. Further, bending station 18 may include one or more CNC and/or NC press brakes, such as RG series Amada press brakes or other commercially available multiple-axis, gauging press brakes. Fully automated or robot assisted machinery, such as the Amada CELLROBO MINI and the Amada PROMECAM, may also be provided at these locations. For robots to be controlled according to the aspects of the present invention, it is preferred that the Amada BM100 robot workstation be utilized. Further, welding station 20 may be provided with appropriate welding machinery in order to effectuate any required welding to the sheet metal component. Punching station 16, bending station 18 and welding station 20 may be located at various areas on the factory floor of the facility 38 and also include machinery that is operated by skilled operators (e.g., punch press operators, bending operators, etc.). The required punching and bending operations, and any necessary welding operations, may be performed at these locations during the production process. These operations may be performed by a human operator and/or by robot assisted machinery based on the needs of the factory and the level of automation that is required and/or provided.

As further shown in FIG. 2A, the progressive sheet metal facility 38 may also include an assembly station 12 and a shipping station 14. Assembly station 12 and shipping station 14 may include the necessary packaging, routing and/or transportation equipment to facilitate the assembly and shipping of the manufacturing components to the customer. The assembly and shipping of the components may be performed or controlled manually by factory personnel and also may be machine automated and/or machine assisted. In addition, assembly station 12 and shipping station 14 may be physically located near the factory floor (e.g., in close proximity to punching station 16, bending station 18 and/or welding station 20) or within a separate facility or area of the sheet metal factory 38.

As noted above, the present invention integrates an intelligent manufacturing system with an expert sheet metal planning and bending system. The intelligent manufacturing system may be responsible for the management and distribution of critical design and manufacturing information by electronically storing and distributing the same. The intelligent manufacturing system may replace or at least supplement the traditional paper job set-up or worksheet with an electronic job sheet that can be accessed instantaneously from any location of the factory. The intelligent manufacturing system may also organize the storage of the design and manufacturing information related to previous jobs and provide searching capabilities so that previous job information relating to similar or identical sheet metal parts may be accessed and retrieved from any location within the factory. In addition, in accordance with an aspect of the present invention, the various expert modules of the expert sheet metal planning and bending system may be implemented at a server module 32 and may be accessed from any station 10, 12, 14 . . . 20 within the facility 38. As described below, by sending query requests or messages and information to server module 32, stations 10, 12, 14 . . . 20 may access the various expert modules to receive bending plan information, including, for example, bend sequence and tooling information, for producing a particular part.

For these purposes, a communications network 26 may be provided that interconnects a server module 32 and a database 30 to each of the plurality of locations 10, 12, 14 . . . 20 within the sheet metal facility 38. Each of the locations 10, 12, 14 . . . 20 may include station modules that interface with communications network 26 and database 30. Communications network 26 may comprise any network or combination of networks capable of transmitting data and information to and from the locations 10, 12, 14 . . . 20 and the server module 32 and database 30. Such transmission may be achieved electronically, optically, by RF transmission and/or by infrared transmission. By way of non-limiting examples, communication network 26 may be implemented by a local area network (LAN), Ethernet and/or an equivalent network structure. In addition, communication network 26 may be implemented as an Intranet and/or through the use of the Internet. Information and query messages may be sent across communications network 26 in accordance with any one of a variety of transmission protocols, including Transmission Control Protocol/Internet Protocol (TCP/IP). Each of the locations 10, 12, 14 . . . 20 may also include station modules having network terminating equipment (such as a computer, mini computer or workstation) and/or peripheral devices (such as a display monitor or screen, printers, CD-ROMs, and/or modems) to transmit and receive information over communications network 26. The network terminating equipment and peripheral devices may include hardware and appropriate software or programmed logic for interfacing with communications network 26 and for providing the various features and aspects of the present invention, as more fully discussed below. If a computer is provided at the factory location, the computer may be a stand-alone, personal computer or a general purpose computer that is part of an interface device of the equipment or machinery provided at the location. For example, the computer may be an IBM compatible personal computer or may be a computer that is part of an interface/control system of the machinery, such as an Amada AMNC system.

Server module 32 and database 30 are also connected to communications network 26. Server module 32 may comprise network terminating equipment such as a personal computer, mini computer or mainframe, with suitable hardware and software for interfacing with communications network 26. Server module 32 may also include software or firmware for implementing the various features of the invention, such as those described in greater detail hereinafter. Further, according to an aspect of the present invention, server module 32 may also include database 30 for storing the design and manufacturing information associated with each customer's order, as well as other part and bending plan information. Database 30 may be implemented by any commercially available database with sufficient memory capacity for storing the design and manufacturing information of the factories customers and storing other data, tables and/or programs. For example, database 30 may comprise a SCSI memory disk with four GB or more of available memory space. The design and manufacturing information that is stored in database 30 may be accessed and distributed to the various locations 10, 12, 14 . . . 20 within the sheet metal facility 38 via communications network 26. Various data formats, such as structured query language (SQL), may be used for accessing and storing data to database 30. In addition, information that is stored in database 30 may be backed up or stored on a wide variety of storage medium, such as magnetic tape, optical disk or floppy disks. Server module 32 and database 30 may be connected to communications network 26 at a separate area or location within the factory 38, such as that shown in FIG. 2A, or at a location that is within or in close proximity to one of the predefined stations (e.g., within design office 10). Although the embodiment of FIG. 2A depicts database 30 as being part of server module 32 and interfacing with communications network 26 via the server module, database 30 may of course be physically located separately from server module 32 and connected to communications network 26 via network database module, such as that shown in FIG. 2B.

By way of a non-limiting example, and in accordance with a preferred embodiment of the present invention, server module 32 and each of the locations 10, 12, 14 . . . 20 may comprise a personal computer, such as an IBM compatible computer with a 100–200 MHz central processor unit (CPU), including a Pentium or an equivalent microprocessor, at least 32 MB of memory and a high resolution display screen, such as any commercially available SVGA monitor with 800×600 resolution. Server module 32 and locations 10, 12, 14 . . . 20 may also include a joy stick or mouse device and a Sound Blaster or compatible sound and game port adapter card for interfacing and controlling the display of information. Operating system software may also be provided to support communications. For example, server module 32 may be provided with Microsoft Windows New Technology (NT) or Windows 95 operating system software (both of which are available from Microsoft Corporation, Redman, Wash.), and each of the locations 10, 12, 14 . . . 20 may include Microsoft Windows 95 operating system software. In addition, server module 32 and locations 10, 12, 14 . . . 20 may be adapted to support multiple languages (such as English, Japanese, etc.) and full support for an Object Linking and Embedding (OLE) server, such as an OLE2 server, may be provided.

Various database languages and management systems may also be used for creating, maintaining and viewing information stored in database 30. Database language such as Structured Query Language (SQL) may be used for defining, manipulating and controlling data in database 30. For example, SQL server (which is a product that is commercially available from Microsoft Corporation) may be utilized to implement the present invention. In addition, the invention may be provided with an Open Database Connectivity (ODBC) compatible driver to facilitate access of information from database 30 over communications network 26. More information concerning ODBC may be found, for example, in the Microsoft Open Database Connectivity Software Development Kit Programmers Reference Manual.

Figure 2B:
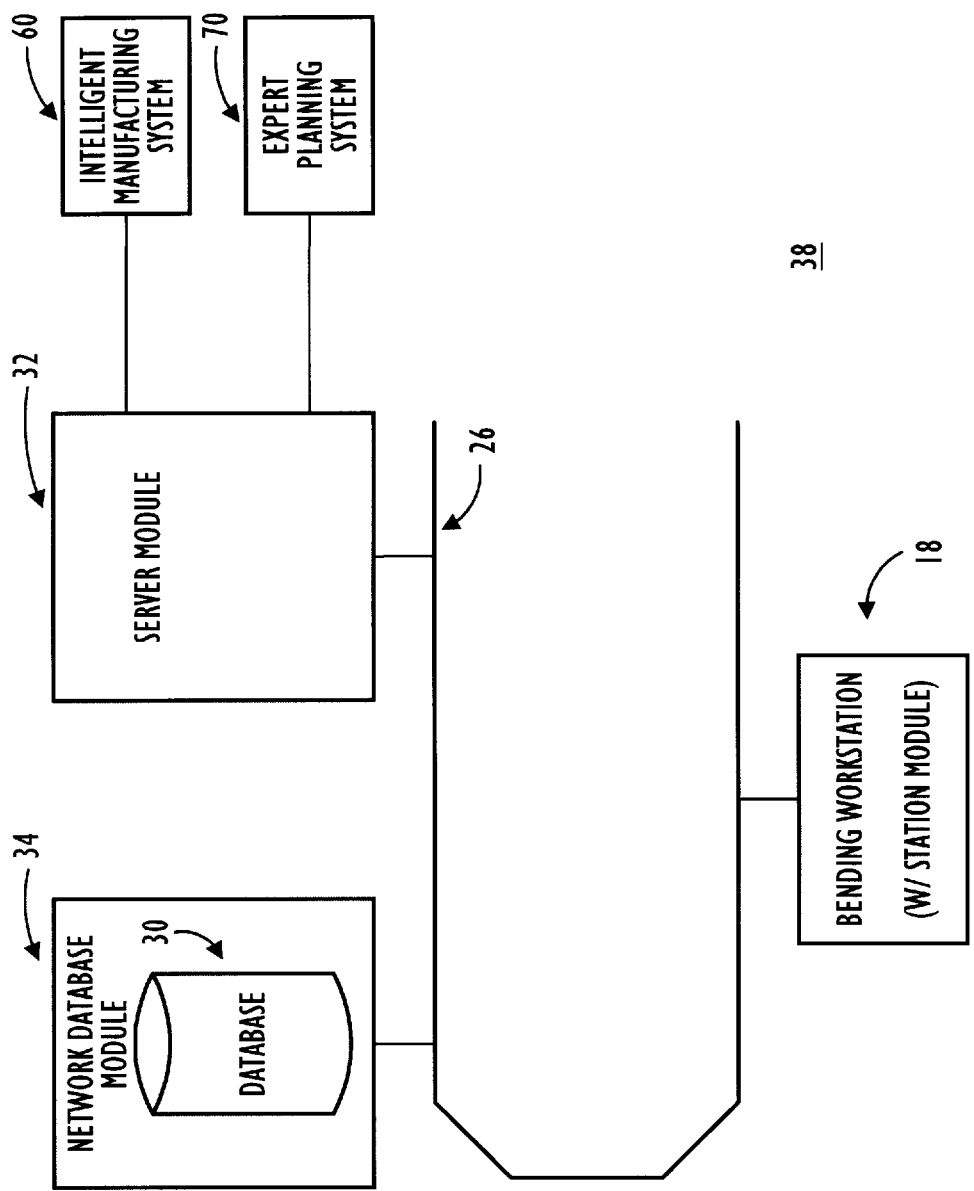

FIG. 2B illustrates, in block diagram form, a progressive sheet metal manufacturing facility constructed according to another embodiment of the present invention. In the embodiment of FIG. 2B, the database 30 and server module 32 are provided separately, with the database 30 being connected to communications network 26 via a network database module 34. As discussed above, the present invention is not limited to this arrangement and the database 30 and server module 32 may be provided together (as shown, e.g., in FIG. 2A), with the functionality of the network database module 34 for providing access to the database being incorporated in the server module.

According to an aspect of the present invention, the integration of the intelligent manufacturing system and expert planning system is achieved, in part, by implementing the main functions and processes of these systems through two separate applications (60 and 70) in server module 32 (see, for example, FIG. 2B). An interface module or application (not shown) may also be provided at server module 32 for facilitating the transfer of messages and information between the two applications, and between the station modules and the server module. The interface application may be a separate module/application, or may be integrated (e.g., as one or more sub-modules) within the intelligent manufacturing system application 60 and/or the expert planning system application 70. Each of the applications may be implemented through software and may be executable on a computer-based platform at server module 32. As further discussed below, server module 32 may be provided with operating system software, such as Windows NT, that permits multi-tasking and multi-processing of simultaneously running applications. In addition, the various applications may be developed using a high level programming language, such as C++, and object oriented programming techniques. In addition, executable client applications may be provided at each of the station modules of locations 10, 12, 14 . . . 20 to perform various operations relating to the intelligent manufacturing system and expert planning system. For example, stations 10, 12, 14 . . . 20 may access part information from database 30 and execute various other features relating to the intelligent manufacturing system when developing a bending plan for a new job request. Each of the stations 10, 12, 14 . . . 20 may also selectively access the expert modules implemented at server module 32 to receive expert planning and bending plan information.

Referring now to FIG. 2C, an exemplary implementation of the present invention, through the use of various hardware and software components, will be provided. In FIG. 2C, an exemplary station module 36 is illustrated that may be located at bending station 18. Although not depicted in the example of FIG. 1B, similar station modules 36, with similar or different machinery, may also be provided at the other locations within the facility 38.

As shown in FIG. 2C, each of the modules (i.e., server module 32, network database module 34, and station module 36) may be connected to communications network 26 via a network interface card or port 42. The network interface card 42 may be vendor specific and be selected based on the type of communications network that is selected. Each of the modules 32, 34 and 36 may also include network software or programmed logic for interfacing with the communications network 26. The communications network 26 may be an Ethernet with any of a number of commercially available cable types, such as 10 Base/T (twisted pair), 10 Base/2 (coax), or 10 Base/5 (thick cable), with the cable type being selected based on the size of facility 38 and the amount or length of the cable required. Further, as described above, communications network 26 may be implemented by one or more networks, and may be implemented as an Intranet and/or through the use of the Internet. Information and query messages may be sent across communications network 26 in accordance with any one of a variety of transmission protocols, including Transmission Control Protocol/Internet Protocol (TCP/IP).

In FIG. 2C, server module 32 may comprise a personal computer 40 with display monitor or CRT 44 and input/output devices 46, which may include a keyboard, mouse and/or joystick. The network interface card 42 may be plugged into an available expansion slot or port of the personal computer 40. In addition, personal computer 40 may comprise an IBM compatible computer with 100–200 Mhz operating speed and a Pentium or Pentium Pro microprocessor. Personal computer 40 may also include, for example, 32 MB or more of available main memory and 1.2 GB or more of available random access memory (RAM). Display 44 may include a high resolution display screen, such as any commercially available SVGA monitor with, for example, 800×600 resolution. To support the various graphics and information that may be displayed on display 44, personal computer 40 may also include any commercially available graphics card such as a PCI graphics card. Further, computer 40 may include a Sound Blaster or compatible sound and game port adapter card and input/output devices 46 may include a keyboard, joystick and/or mouse device.

In order to implement the various features of the invention, server module 32 may be configured with software and various software packages. For example, server module 32 may be provided with operating system software, such as Microsoft Windows NT (Version 4.0). Further, in order to provide the server module specific functionality and features of the invention, server module 32 may include software or programmed logic implemented routines. As discussed in greater detail below, these routines may be developed using a high level programming language, such as C++, and object oriented programming techniques. Server module 32 may also include or interface with CAD or CAD/CAM software, such as VELLUM or Amada AP40 or AP60 software, to enter and/or develop original 2-D and 3-D drawings based on a customer's specifications. For this reason, server module may be located in the design office 10 of the manufacturing facility 38. In order to access data from database 30, server module 32 may also include an OBDC driver, such as Microsoft ODBC driver, and may use SQL as a standard for accessing data. An OLE server, such as OLE2 server, may also be provided to link the data.

In the embodiment of FIG. 2C, database 30 is provided separate from server module 32 and is connected to communications network 26 via network database module 34. As indicated above, database 30 may comprise a SCSI disk with appropriate memory space (e.g., 1–4 GB), which may be selected based on the size of the factory 38 and the amount of part and bending plan information to be stored in the database. Network database module 34 may include a personal computer 40, such as an IBM compatible computer with a Pentium microprocessor, and an expansion slot fitted with network interface card 42 for interfacing with communications network 26. Database 30 may be connected to personal computer 40 via a data bus and personal computer 40 may include standard display and input/output devices (not shown in FIG. 2C), such as a display monitor or CRT and a keyboard.

In order to facilitate access to database 30 based on SQL, personal computer 40 of network database module 34 may be configured with a commercially available SQL server, such as a Microsoft SQL server or Oracle SQL server. An OLE server, such as OLE2 server, may also be provided to link the data. Personal computer 40 may also be configured with various operating software, such as DOS and Microsoft Windows NT (Version 4.0).

The embodiment of FIG. 2C also includes an exemplary implementation of one station module 36. In this embodiment, the station module 36 is implemented at bending station 18. Each station module may include a computer 48 with a display monitor or CRT 44 and input/output devices 46, which may include a joystick or mouse device. A network interface card 42 may be plugged into an available expansion slot or port of the computer 40. As discussed above, the computer of the station module 36 may be a stand-alone, personal computer or a general purpose computer that is part of an interface device of the equipment or machinery provided at the location. For example, computer 48 may comprise a free-standing, personal computer such as an IBM compatible computer with 100–200 Mhz operating speed and a Pentium or Pentium Pro microprocessor, or computer 48 may be a computer that is part of or built into an interface/control system of the machinery, such as an Amada AMNC system. Computer 48 may also include, for example, 32 MB or more of available main memory and 1.2 GB or more of available random access memory (RAM). Display 44 may include a high resolution display screen, such as any commercially available SVGA monitor with, for example, 800×600 resolution. To support the various graphics and information that may be displayed on display 44, computer 48 may also include any commercially available graphics card such as a PCI graphics card. Further, computer 48 may include a Sound Blaster or compatible sound and game port adapter and to support, for example, a joystick or mouse of the input/output devices 46.

In order to implement the various features of the invention, station module 36 may also be configured with software and various software packages. For example, station module 36 may be provided with operating system software, such as Microsoft Windows NT or Windows 95. Further, in order to provide the station module specific functionality and features of the invention, station module 36 may include software or programmed logic implemented routines. As discussed in greater detail below, these routines may be developed using a high level programming language, such as C++, and object oriented programming techniques. In order to access and link data, station module 36 may also include an OBDC driver, such as Microsoft ODBC driver, and an OLE server, such as OLE2 server. Similar to server module 32, station module may use SQL as a standard for accessing data from database 30.

If the station module 36 of bending station 18 is provided as a free-standing personal computer, then software may be provided to create bending code data (i.e., NC data) and to interface with the machinery 25 (e.g., a CNC or NC controlled press brake). For example, computer 48 may comprise be implemented as a personal computer and configured with software to interface with bending machinery 25 via an interface, such as a standard RS-232-C wire interface. This interface may be provided to permit the station module 36 to communicate with and send or receive bending code data to the bending machinery 25 via the interface. The implementation of the interface is vendor specific and will depend on the data format and machine instruction set used for the bending machinery 25. All data that is sent from the station module 36 to the bending machinery 25 should thus be formatted based on the machine instruction set that is defined for the machinery. The computer 48 of station module 36 may also be provided with any commercially available CNC or NC software for generating bending code data, in order to simulate the functionality that is normally provided by a built-in computer of CNC or NC systems (such as a Amada AMNC) for such machinery. In addition, if bending machinery 25 includes automated equipment, such as a robotic manipulator, a material loader/unloader, etc., computer 48 may include and provide sequencing and control functions (implemented by hardware, software and/or programmed logic) for executing the final bending plan and controlling the various operations of bending machinery 25. Bending machinery 25 may also include an interface architecture (not shown) for interfacing with the sequencing and control modules of computer 48 with the various equipment and sensors of bending machinery 25. The sequencing and control of bending machinery may, of course, implemented through any suitable combination of hardware and software, and the techniques, processes and devices disclosed, for example, in U.S. patent application Ser. No. 08/386,369 may be utilized or adapted for this purpose.

As discussed above, the intelligent manufacturing system may be adapted to manage and distribute design and manufacturing information throughout the factory 38, and may provide various features and processes for facilitating the design and production of components within the factory. Such features may include the ability to search and retrieve previous job information from a central database, and the ability to develop a bending plan (including selecting a bend sequence and determining tooling) through the use of various graphical user interfaces, as further discussed below with reference to FIGS. 3–5. The expert system may include one or more expert modules for generating and executing a bending plan for producing bent sheet metal components. These expert modules may include expert systems or subsystems for determining an optimum bend sequence and tooling (including tool selection and tool stage layout) for the bending plan. In addition, for robot-based workstations, robot handling and motion experts may be provided for determining the robot motion paths and holding steps for executing the bending plan. A repositioning expert may also be provided for determining the sequences and operations associated with controlling a repositioning gripper and the repositioning operations of the robot. Through the use of communications network 26, the various expert modules implemented at server module 32 may be selectively accessed from the station modules provided throughout the factory 38. A more detailed discussion of the expert planning system, and its relationship with the intelligent manufacturing system and other features of the invention, is provided below with reference to FIGS. 6–24.

Figure 3:
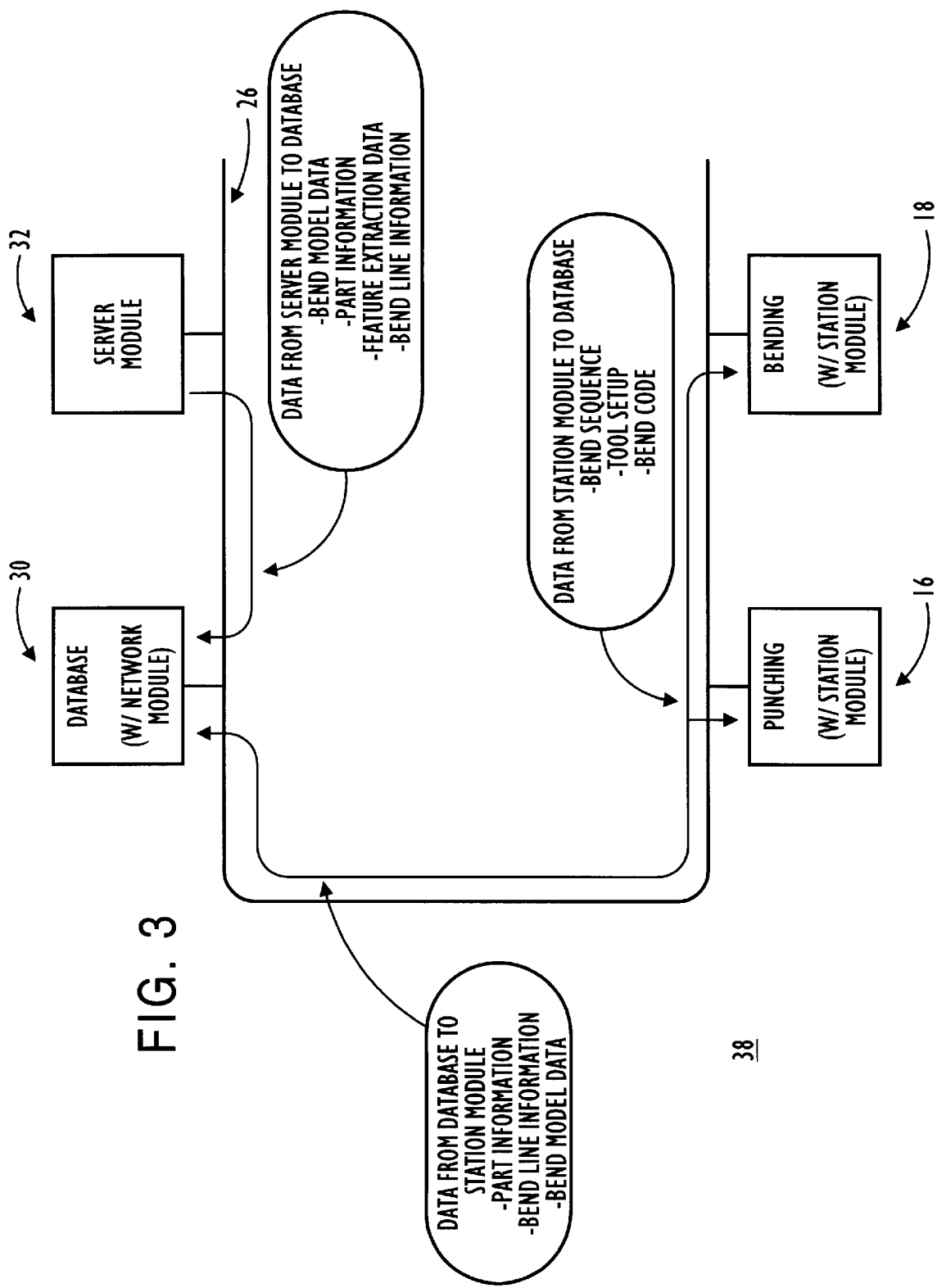
FIG. 3 illustrates an exemplary embodiment of the respective data flows between the server module, database and various network locations that are related to the intelligent manufacturing system.
Figure 4:
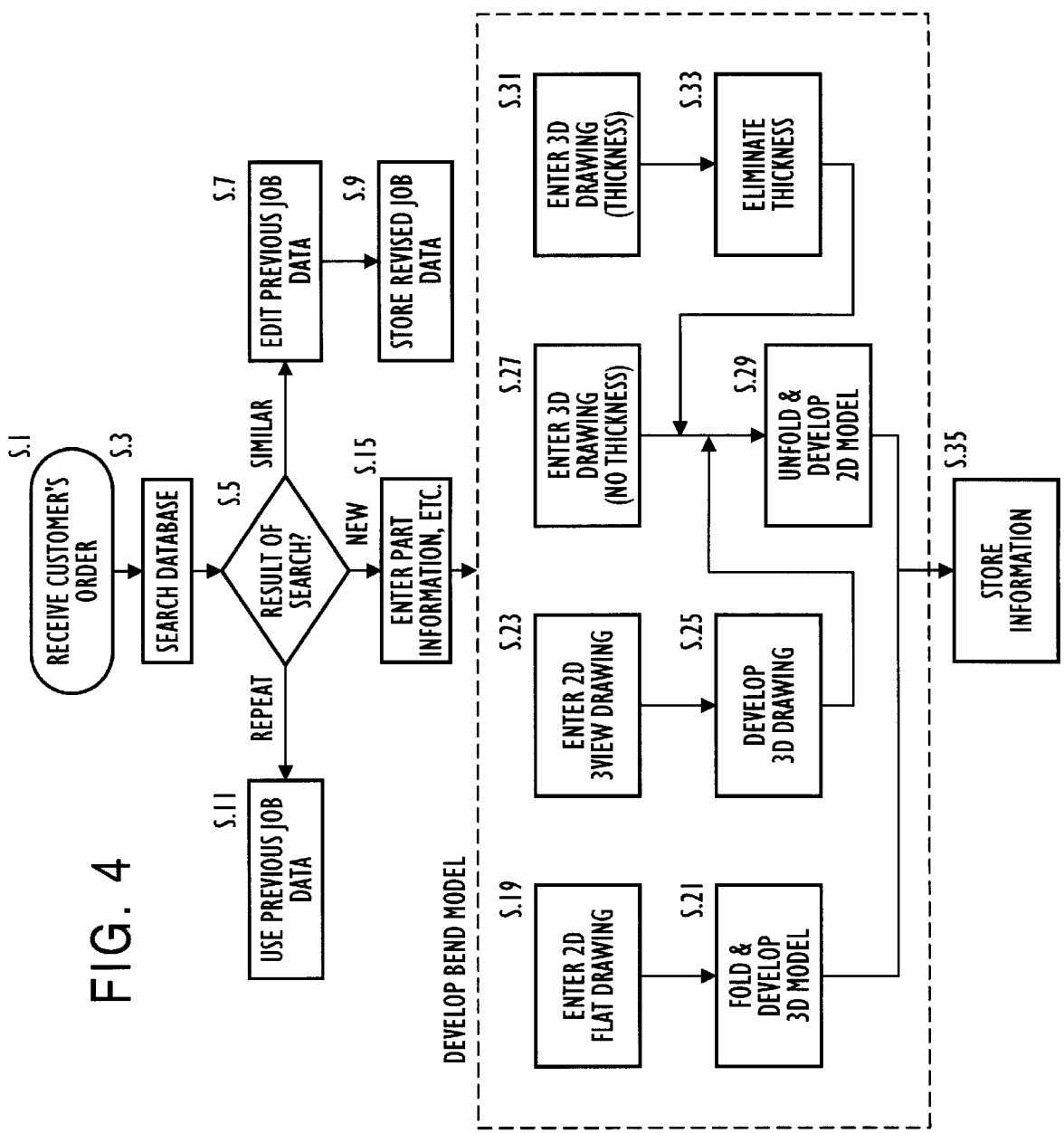
FIG. 4 is an exemplary flow chart of the basic processes and operations performed by the server module when the intelligent manufacturing system application is executed.
Figure 5:
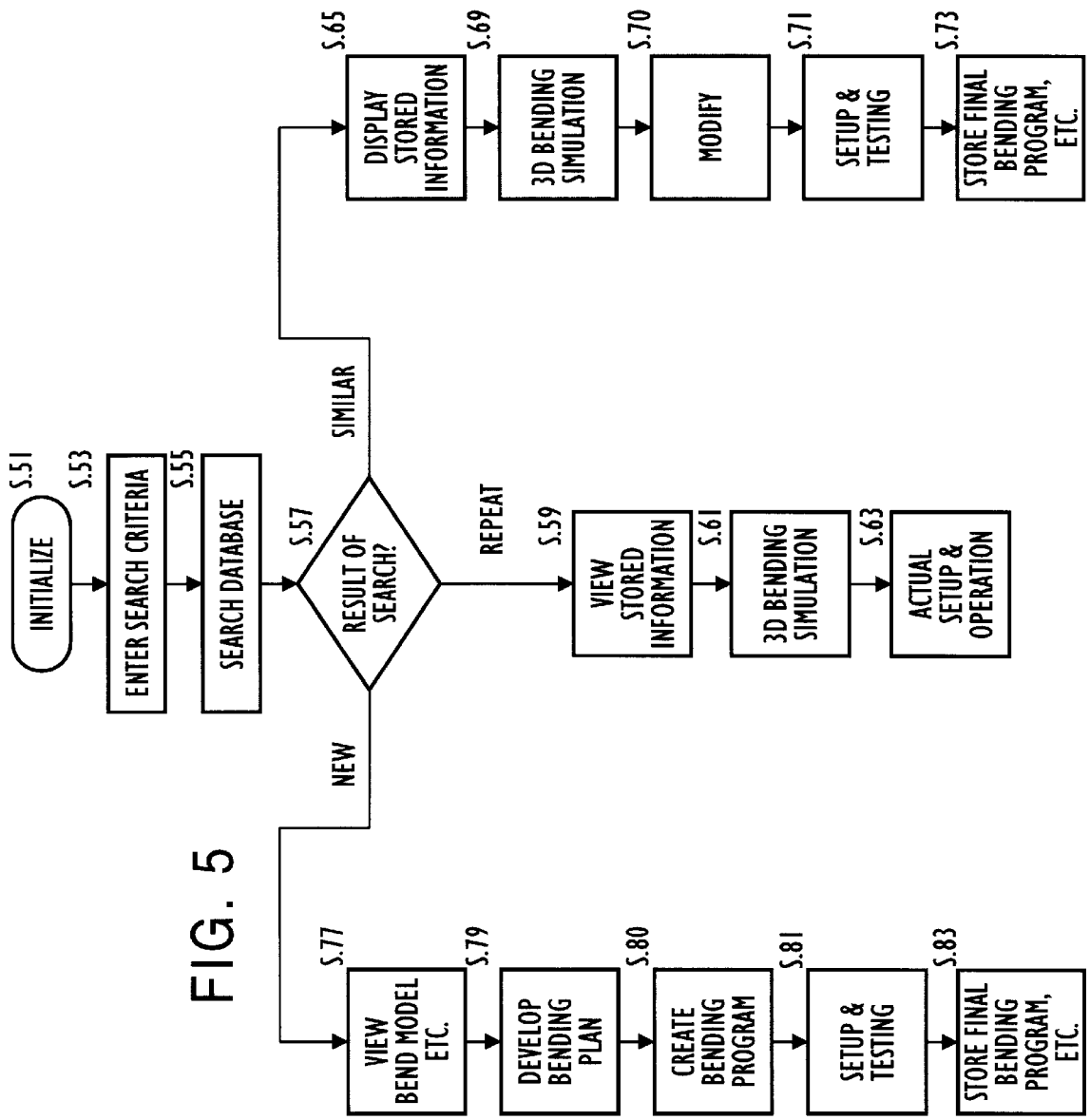
FIG. 5 is an exemplary flow chart of the processes and operations related to the intelligent manufacturing system that may be performed by, for example, a station module located at a bending station.

Referring now to FIGS. 3–5, a description of the various features of the intelligent manufacturing system that may be implemented in the present invention will be provided. As indicated above, the various features and aspects of U.S. patent application No. 08/690,084, which was filed based on the priority of U.S. Provisional Application No. 60/016,958, may be adapted and utilized in the apparatus and method of the present invention. Other features and aspects may also be provided and incorporated within the intelligent manufacturing system, as will be more readily appreciated from the description that follows.

FIG. 3 illustrates an exemplary embodiment of the respective data flows between server module 32, database 30 and the various network locations that are related to the intelligent manufacturing system of the invention. For purposes of illustration, server module 32 and database 30 (integrated with network database module 34) are each shown in FIG. 3 as being separately and directly connected to communications network 26, with the data flow between these elements being carried out across the communications network. Of course, as will be appreciated by those skilled in the art, a wide variety of data flow arrangements may be provided between these elements; and, if database 30 is arranged to be directly connected to server module 32, then the data and information can be directly transferred from the server module to the database without use of communications network 26. In addition, for purposes of facilitating the description herein, the illustration of communications network 26 in FIG. 3 has been simplified and only punching station 16 and bending station 18 are shown in the drawing. Nonetheless, it will be appreciated that the data flow to and from locations 10, 12, 14 . . . 20 (as well as any other location or area that may be present in the factory) may be carried out in a similar manner to that described for punching station 16 and bending station 18.

The design and manufacturing information associated with each customer's order may be organized and stored in database 30. When a customer's order is initially received, basic product and design information may be entered at server module 32 and then transferred and stored to database 30. As discussed above, server module 32 may include any suitable means for entering the data, such as a personal computer with a keyboard, etc. If a personal computer is utilized at server module 32, software may be provided to generate menu driven screens to facilitate the entry of the data by factory personnel. The data entry program may be, for example, a Microsoft Windows based application with help and/or menu screens, etc. By way of a non-limiting example, the data that is entered and/or developed at server module 32 and transferred to database 30 may include part information, bend model data, feature extraction data, and bend line information, as generally illustrated in FIG. 3.

The part information may comprise, for example, a part or order reference number, the customer's name, a brief description of the part, the batch size or quantity, and scheduled delivery date. The bend model data may include, for example, part geometry and manufacturing data, such as the overall dimensions of the part (e.g., width, height, depth), and part material information such as the material type (e.g., steel, stainless steel, or aluminum), thickness and tensile strength. Further, feature extraction data may be manually entered and/or automatically generated to identify the key features of the part and to facilitate similar part searches and other searches of the database. The feature extraction data may be stored in a separate data file in database 30, or may be stored with the bend model data and other job information for each part. The feature extraction data may comprise, for example, features of the part such as the number of surfaces or faces, the number or types of bends present (e.g., a positive bend between two faces or a negative bend between two faces), the relationships between the faces and/or the number of holes or other types of openings in the part. Such data may be represented and organized in a feature based part matrix and/or a sequence of search keys. Lastly, bend line information may be entered at server module 32 for storage in database 30. The bend line information may comprise, for example, pertinent bend line information for each bend in the part, including the bend angle, the bend length, the inside radius (IR) of the bend, the amount of deduction, and the bend direction (e.g., front or back).

In order to transmit to and receive data from database 30 over communications network 26, each of the locations 10, 12, 14 . . . 20 may comprise a station module (such as station module 36 described above) that is connected to the communications network. In FIG. 3, punching station 16 and bending station 18 are generally illustrated in block diagram form with a station module. As discussed above, the station module may comprise, for example, software or control logic and a stand-alone personal computer or a general purpose computer that is part of the equipment or machinery provided at the location. For each customer's order, the design and manufacturing information (including the part information, bend line information, and bend model data) may be accessed and retrieved by entering, for example, a predetermined reference number or code. The reference number or code may be entered manually (e.g., by keyboard or digital input pad) or by scanning a bar code with a bar code reader or scanner provided at the station module. In addition, in accordance with an aspect of the present invention, previous job data may be accessed and retrieved from database 30 from any location 10, 12, 14 . . . 20 within the factory 38 by performing a similar part search. As discussed more fully in the detailed description that follows, a similar part search may be conducted based on the feature extraction data or search keys stored in database 30 so that previous job information relating to identical or similar part(s) can be retrieved and utilized to reduce the overall manufacturing time of future jobs.

The design and manufacturing information that is retrieved from database 30 may be used by the shop floor operators to develop and test the bending plan. For example, a bending operator at bending station 18 may access and retrieve the part information, bend line information and bend model data from database 30 in order to determine the necessary tooling and the optimum bend sequence for the sheet metal part. In accordance with an aspect of the present invention, an ODBC driver may be provided to permit each station module to interface database 30 and display information stored in the database. In addition, server module 32 or the network database module of database 30 may comprise a SQL server to facilitate the access and retrieval of data stored in the database. Once the bending code has been programmed based on the final bending plan, the bending code along with the bend sequence and tool setup information may be sent from station module of bending station 18 to database 30 over communications network 30, as generally shown in FIG. 3. This information may then be stored along with the other design and manufacturing information associated with that job.

Other information may also be stored in database 30. For example, the 2-D and/or 3-D image representation of the part may be stored with the bend model data for the part. The 2-D or 3-D image representation may be developed at design station 10 or another location with a CAD/CAM system and transferred to database 30 via the station module of the design station (or another appropriate location) and through the communications network 26. Alternatively, the 2-D or 3-D image may be developed at server module 32, by utilizing or interfacing with an appropriate CAD/CAM system or modeling software and performing a series of functions or operations, as will be discussed more fully below.

Referring now to FIGS. 4 and 5, a detailed description of the processes and operations that may be programmed and performed by server module 32 and the station modules of each of the locations 10, 12, 14 . . . 20 will be provided. FIGS. 4 and 5 are flow charts of the basic logic flow that may be performed by server module 32 and the station modules of each of the locations 10, 12, 14 . . . 20 within the sheet metal manufacturing facility 38. While FIG. 5 is directed to the processes and operations that would typically be performed at, for example, bending station 18, it will be appreciated that other processes and steps may be performed depending upon the operations performed at each particular location within the facility 38. The processes and operations discussed below may be implemented by software and by using any one of a wide variety of programming languages and techniques. For example, in accordance with an aspect of the present invention, the processes and operations described below with reference to the accompanying drawings may be implemented by using a high level programming language such as C++ and using object oriented programming techniques. Further, by way of a non-limiting example, VISUAL C++ may be utilized, which is a version of the C++ programming language written by Microsoft Corporation for Windows based applications.

FIG. 4 is a flow chart of the basic processes and operations performed by server module 32 when the intelligent manufacturing system application is executed. FIG. 4 illustrates the basic logic flow of the processes and operations performed by the software or programmed logic of server module 32. Server module 32 may include a Windows based application with tool bar icons and help and/or menu screens to assist an operator or user in selecting and executing the various processes and operations of the server module. The process begins at step S.1, when a customer's order is received at the sheet metal manufacturing facility 38. The customer's order will normally include the necessary product and design information so that the component may be manufactured by the factory 38. This information may include, for example, the geometric dimensions of the part, the material required for the part, and other design information. Based on the information received from the customer, server module 32 may perform a search of previous job information stored in database 30, as illustrated in step S.3. The job information stored in database 30 may be searched based on a wide variety of search criteria. For example, information may be searched based on a predetermined reference or job number or a similar part search may be performed based on certain design features of the part, so that previous job information relating to an identical or similar part can be retrieved and utilized for the current job. A more detailed description of a similar parts search that may be utilized is provided in U.S. patent application Ser. No. 08/690,084 and in U.S. Provisional Application No. 60/016,958.

At step S.5, the results of the search of the database are analyzed to determine whether the current customer's order relates to a new part, a part that is similar to a previous job, or a repeat of a previous job. If an identical match is found (e.g., the same part or reference number is located) and the present customer's order is a complete repeat of a previous job performed at the factory, then no further modifications to the job information is necessary and the previous job information may be accessed from database 30 and used to carry out the present customer's order, as shown at step S.11. The search of the database may provide the part or reference number and/or file name of the previous job so that the job information may be accessed from the database by an operator at the server module 32 or any of the station modules. If only the part or reference number is provided, then a translation table may be provided so that the file name of the previous job information may be determined and accessed based on the entry of the part reference or job number by an operator. Thus, an operator at, for example, server module 32 may access the job information and the 2-D and 3-D modeling information from database 30 to analyze the geometry of the part and confirm that it is similar to that of the repeat order. If the order is confirmed to be a repeat order, then a bending operator located at the station module of bending station 18 may also access the previous job information and utilize the manufacturing information, including the bending code data and tool setup information, to bend and produce the part. The use of such stored expert knowledge thus enables repeat orders to be manufactured more efficiently and without the need to reproduce previously entered and developed job information.

If, however, it is determined at step S.5 that the current customer's order is similar to a previous job or the same as a previous job but requires modification of, for example, the job or reference number or batch size, etc., then at step S.7 the previous job data located by the search may be retrieved from database 30, and edited and modified by an operator at server module 32. An editing function may be provided to allow editing and modification of previous job data to create new job data that may be stored in database 30 for the present customer's order. The amount of editing required will depend upon the amount of similarity that exists between the previous job and the current job. The amount of editing may encompass simply modifying the reference or job number or batch size, and/or may involve more extensive modifications such as editing the dimensions of the part and the defined bend sequence. After the previous job information has been edited, the revised job information may then be stored in database 30 at step S.9. The revised job information may be stored under a new reference or job number. In addition, various database management functions (such as copy, delete, save, rename, etc.) may be provided to permit the previous job information to be maintained in database 30 or to permit the previous job information to be erased or overwritten upon entry of a special command.

If it is determined that there is no similar or identical match to the current job and, thus, that the present customer's order relates to a new job, then logic flow proceeds to step S.15, as shown in FIG. 4. Since, in this case, the current job relates to a new job it will be necessary to independently develop and enter the design and manufacturing information. Menu and/or help screens may be provided by the server module 32 to assist the operator in entering all of the necessary job information. In accordance with an aspect of the intelligent manufacturing system, an operator at server module 32 may create a new file by first entering the basic part information for the new job. The part information may comprise, for example, a reference or job number, the customer's name, a brief description of the part, the required batch size or quantity for the job, and the scheduled delivery date. The feature extraction data or search keys may also be entered at step S.15, or this data may be automatically developed or extracted concurrently with the development of the bend model data. Other data or information may also be entered at step S.15, or entered after or during the entry of the bend model data, such as the bend line information which may comprise, for example, the bend angle, radius and length for each bend line in the part. After step S.15, logic flow proceeds so that the bend model data may be developed and entered at server module 32 by an operator, as illustrated in FIG. 4.

The development and entry of the bend model data may depend upon the original drawings and information provided from the customer. The customer's order may include, for example, a 2-D, single view flat drawing of the part to be manufactured and/or a 2-D, three view (e.g., including top, front and side views) drawing of the part. Occasionally, the customer may also provide a 3-D, wire frame drawing of the part, with or without the thickness of the material of the part being indicated in the drawing. The bend model data that is stored may include both the unfolded (i.e., the 2-D flat representation) and the folded (i.e., the 3-D representation) information for the part to be manufactured. Thus, if only a 2-D flat drawing is provided by the customer, it will be necessary to develop a 3-D drawing of the part by applying, for example, a folding algorithm or process to the 2-D drawing. Alternatively, if only a 3-D drawing of the part is provided, then it will be necessary to develop a 2-D flat drawing by applying, for example, an unfolding algorithm or process to the 3-D drawing. In accordance with another feature of the intelligent manufacturing system, the 2-D and 3-D models that are saved in the bend model may be developed and represented without the sheet material thickness (i.e., with no thickness). This is possible due to the unique symmetry of all sheet metal parts. Providing and representing the 2-D and 3-D drawings with no thickness provides modeling and simulation views of the part that can be more easily interpreted and understood by the design programmer, the bending operator and other users. Removing the thickness information also shortens and improves the processing time required by the server module and station modules when performing and executing the various features of the intelligent manufacturing system. A more detailed description of such features, as well as the folding and unfolding algorithms that may be utilized in the present invention, is provided in U.S. patent application Ser. No. 08/690,084 and in U.S. Provisional Application No. 60/016,958.

FIG. 4 shows the general processes and operations performed when developing the bend model data. The various types of drawings that may be received or developed based on the customer's order and that may be entered to develop the bend model data are generally shows at steps S.19, S.23, S.27 and S.31. A tool icon bar and menu and/or help screens may be provided by the server module 32 to assist the operator in selecting and executing each of these steps. The processing of these drawings to develop the 2-D and 3-D models of the part for the bend model will depend on what type of drawings are initially provided. These drawings may be manually entered or developed at server module 32, or they may be downloaded from a tape or disk. Server module 32 may, for example, interface with a CAD/CAM system located at, for example, design office 10, or server module 32 may include a stand alone CAD/CAM system. Further, the 2-D and 3-D drawings may be saved as DXF or IGES files and imported to server module 32.

If a 2-D, single view flat drawing is provided, then processing to develop the bend model may begin at step S.19, as shown in FIG. 4. At step S.19, the 2-D, flat drawing that was received or developed may be entered at server module 32. Other bend model data, such the overall dimensions of the part (e.g., width, height, depth), and part material information may also be enter at step S.19. Thereafter, a folding algorithm or process may be utilized to develop a 3-D model (with no material thickness) based on the original 2-D single view drawing, as generally shown at step S.21. An example of the processes and operations that may be performed to develop a 3-D model from a 2-D, flat drawing is provided in U.S. patent application Ser. No. 08/690,084 and in U.S. Provisional Application No. 60/016, 958.

If a 3-D, wire frame drawing (with no material thickness) of the part is received or developed, the drawing information may be entered at step S.27. In addition, other bend model data, such the overall dimensions of the part (e.g., width, height, depth), and part material information may be entered at step S.27. Thereafter, an unfolding algorithm or process may be executed at server module 32 in order to develop a 2-D model of the part, as shown at step S.29. An example of the processes and operations that may be performed to develop a 2-D model from a 3-D drawing (with no thickness) is provided in U.S. patent application Ser. No. 08/690,084 and in U.S. Provisional Application No. 60/016, 958.

The 2-D and 3-D model representations of the part may be stored as part of the bend model for that part. In addition, as noted above, during the development and entry of the 2-D and 3-D models, other bend model data may be entered (such as the part material information and other manufacturing information) so that it may be stored with the bend model data in database 30. Object-oriented programming techniques may be utilized to define and structure the bend model of the part. The various features and data structure arrangements disclosed in, for example, U.S. patent application Ser. No. 08/690,084 and in U.S. Provisional Application No. 60/016,958 may be implemented for organizing and storing the bend model of the part.

As shown in FIG. 4, if a simple 3-D drawing (with no material thickness) of the component is not originally developed or received, additional processing may be necessary in order to develop a 3-D model of the part (with no thickness), before executing the necessary unfolding algorithm or processes to develop the final 2-D model. Steps S.23, S.25, S.31 and S.33 generally show the additional processing and operations that may be performed by server module 32 before executing an unfolding algorithm and developing the 2-D model at step S.29.

For example, if a 2-D, three-view drawing of the part is originally provided or developed, then at step S.23 the drawing may be entered at or imported to server module 32. Further, other bend model data, such as the overall dimensions of the part (e.g., width, height, depth), and part material information may also be enter at step S.23. Thereafter, at step S.25, a simple 3-D, flat drawing of the part may be developed based on the 2-D, three-view drawing that was entered. The developed 3-D drawing may then be used to develop the 2-D model at step S.29, as shown in FIG. 4. An example of the processes and operations that may be performed to develop a 3-D model from a 2-D, three view drawing is provided in U.S. patent application Ser. No. 08/690,084 and in U.S. Provisional Application No. 60/016, 958.

If, however, a 3-D drawing with material thickness is originally received or developed, then the drawing information may be entered at step S.31 for further processing before applying the unfolding algorithm. Other bend model data, such the overall dimensions of the part (e.g., width, height, depth), and part material information may also be enter at step S.31. Thereafter, at step S.33, an eliminate thickness procedure may be executed to eliminate the thickness in the 3-D drawing. In accordance with an aspect of the invention, server module 32 may prompt the operator or user to indicate the thickness in the drawing and to indicate which surfaces (e.g., the outside or inside) should be retained when executing the eliminate thickness procedure. An example of an eliminate thickness procedure that may be utilized in the present invention is provided in U.S. patent application Ser. No. 08/690,084 and in U.S. Provisional Application No. 60/016,958. After the thickness in the 3-D drawing has been eliminated at step S.33, logic flow will proceed to step S.29, where the revised 3-D model with no thickness may be utilized and an appropriate unfolding algorithm or process may be applied to develop the final 2-D model. An example of an unfolding process and the various processes and operations that may be performed to develop a 2-D model from a 3-D drawing is also provided in U.S. patent application Ser. No. 08/690,084 and in U.S. Provisional Application No. 60/016,958.

As shown in FIG. 4, after all of the relevant information has been developed and entered, the part information, bend model information and other data associated with the customer's order may be transferred from server module 32 and stored in database 30 at step S.35. The data stored in database 30 may include feature extraction or search data that may be utilized when performing database searches. The feature extraction or search data may include data that is indicative of the basic or key features of the part associated with each job, so that searches of the database may be performed to locate job information and stored expert knowledge relating to the same or similar parts. The data and information entered at server module 32 may be sent directly to database 30 or transferred over communications network 26, as shown, for example, in FIG. 4.

FIG. 5 is a flow chart of the basic processes and operations of the intelligent manufacturing system performed by each of the station modules that may be provided at the locations 10, 12, 14 . . . 20 of the sheet metal manufacturing facility 38. For purposes of illustration, FIG. 5 provides an example of basic logic flow of the processes and operations that may be performed by a station module located at, for example, bending station 18. As will be appreciated by those skilled in the art based on the teachings herein, the logic flow illustrated in FIG. 5 may of course be modified for each station module depending upon the nature of the operations and processes to be performed at each of the locations. Further, as with server module 32, the processes and operations of the station module described below may be implemented by software or programmed logic. In addition, the station module may include a Windows based application with tool bar icons or help and/or menu screens to facilitate an operator or user in selecting and executing the various processes and operations of the station module. Such help and/or menu screens may also be provided to facilitate the entry or transfer of data at the station module.

As shown in FIG. 5, after initializing the station module at step S.51, an operator may input one or more database search criteria or key terms at step S.53. The search criteria may be entered to locate previous job information or job information relating to a new or current job that is stored in database 30. The operator may input, for example, a predetermined reference number or code in order to retrieve particular job information from database 30. For example, a bar code may be provided on a routing sheet or may be affixed to the punched stock material and scanned by a bar code reader at the station module to access the information. Alternatively, the reference code or number could be entered manually through a keyboard or digital input pad at the station module. A translation table may be provided so that the file name of the previous job information may be determined based on the entry of the part reference or job number by an operator. In addition, search criteria or keys may be entered to perform a similar part search for previously stored job information. Such a search may be performed based upon the various design features or feature extraction data of the part. A description of a similar part search that may be implemented in the intelligent manufacturing system is provided in U.S. patent application Ser. No. 08/690,084 and in U.S. Provisional Application No. 60/016,958.

After the search criteria has been entered at step S.53, the station module may execute a search of the database 30 at step S.55 via communications network 26 and network database module 34. The results of the search may then be sent back to the station module and analyzed at step S.57 in order to determine whether the operator or user has requested information relating to a new job or a similar previous job, or whether the request relates to the complete repeat of a previous job.

If an identical match is found (e.g., the same part or reference number is located) and it is determined that a previous job is to be repeated, then the stored design and manufacturing information relating to the job may be transferred from database 30 to the station module, where it may be displayed for viewing by the operator, as generally shown at step S.59. The station module may include one or more menu display screens or directories to permit the operator to select and display the various information retrieved from database 30. The operator may review the displayed information and run various simulations, such as a 3-D bending simulation at step S.61, to view the various stages in the bending sequence and to understand the geometry of the part for that job. The operator may also review other information such as the required tooling and any other special instructions or messages that may have been recorded with the job information. After confirming the job information, the operator can then set-up the bending or other required machinery and operate the machinery to produce the specified sheet metal components. The job information that is retrieved from database 30 may include the final bending plan data, including the bending code to control the machinery at, for example, bending station 18. The set-up and actual operation of the machinery may thus be carried out by the operator, as generally shown at step S.63 in FIG. 5.

If no identical or similar job information is located and it is determined that the information relates to a new job (i.e., only preliminary job information has been entered at the server module 32 and complete job information has not yet been developed), then the partial part information and bend model data may be downloaded from database 30 and sent to the station module where it may be viewed by the operator at step S.77. Since the information requested relates to a new job, it will be necessary for the operator to develop and enter a bending plan, including the required tooling and bending sequence. Thus, at step S.79, with the information provided at the station module, the bending operator may develop and define the bending sequence and tooling selection for the new job. Robot motion planning and repositioning may also be developed and programmed by the operator. A graphical user interface (GUI) and other features may be provided at the station module to facilitate the bending operator in developing the bending plan. The GUI may be provided to help the operator develop a bending plan by, for example, displaying a proposed bending sequence, displaying tooling options, automatically checking for potential collisions between the part and tool (s), and simulating each of the intermediate steps in a proposed bend sequence. In addition, as discussed bas discussed below, an operator may also activate the expert planning system application to receive expert planning information relating to the production of the part, including bend sequence and tooling information, and robot motion and repositioning planning. The various features of the expert planning system are provided herein with reference to FIGS. 6–24.

After developing and entering the bending plan at the server module, the operator may program the bending sequence at step S.80 to generate the bending code (i.e., the CNC or NC code for executing the bend sequence with the bending machinery). The bending code may be directly entered at the server module or imported to the server module by interfacing with, for example, a CNC or NC controller of the bending machinery. Thereafter, the operator may set-up and test the bending plan at the bending workstation at step S.81. When all of the necessary testing and any necessary modifications to the bending plan have been completed, the final bending data may be entered and saved to database 30 at step S.83. The final bending data may include the bend sequence and tool set-up information, as well as the bending program and/or robot motion control information. This information may be sent from the station module of, for example, bending station 18 to database 30 so that it may be saved with the other design and manufacturing information associated with the new job.

If it is determined at step S.57 in FIG. 5 that the information relates to a similar part of a previous job or the same part of a previous job but having, for example, a different reference or job number or batch size, etc., then logic flow may proceed to step S.65. At step S.65, the previous job information may be retrieved from database 30 and displayed at the bending station 18. The bending operator or user may then view the data to determine which changes to the data will be necessary for the similar part. Once again, the station module may generate a series of menu display screens or directories to enable the operator to select which information to display and the manner in which the information is to be displayed or modified. For example, at step S.69, the station module may provide a 3-D bending simulation based on the retrieved information in order to facilitate the operator's development of a bending plan for the similar part. After reviewing the previous job information, the operator may modify the tooling and bending information, as well as the bending program, at step S.70. Other job information, such as the dimensions of the part, the reference number or batch size, may also be modified and edited at step S.70. The various features of the expert planning system, discussed below with reference to FIGS. 6–24, may also be utilized to finalize or edit the bending plan. Thereafter, at step S.71, actual tooling set-up and testing may be performed by the operator on the shop floor in order to test the modified bending plan. Upon completion of testing and any further modifications to the bending plan, the operator may enter at step S.73 the final bending data and store the same in database 30 under a new reference or job number. As noted above, the previous job information may be maintained in database 30 along with the other stored job files. Further, various database management functions may be provided for storing, deleting, renaming, etc. the files stored in the database.

As discussed above, the intelligent manufacturing system of the present invention may include a variety of features, such as those disclosed in U.S. patent application Ser. No. 08/690,084 and in U.S. Provisional Application No. 60/016, 958. For example, various graphical user interfaces may be provided to assist an operator in manually selecting and determining a bend sequence and tooling for a part. Such interfaces may enable an operator, through the use of one or more display screen images, to enter a bend sequence by sequentially selecting the bendlines of a rendered image of the part and/or to select tooling based on icons representing various tools (e.g., punches, dies, die rails, etc.) that are available. Object oriented programming techniques may also be used to organize and store the bend model data (e.g., based on class structures or libraries) and the bend operations to be performed on the part as a complete bend model file in the database. The part may be represented in both 2-D and 3-D coordinate space and the intelligent manufacturing system may enable an operator to selectively display, zoom, rotate and pan the 2-D and/or 3-D images of the part. The details of such features, as well as other features, are provided in U.S. patent application Ser. No. 08/690,084 and in U.S. Provisional Application No. 60/016,958, as indicated above.

Referring now to FIGS. 6–24, a description of the various features of the expert planning system, and its interaction with the intelligent manufacturing system will be provided. As indicated above, the various features and aspects of U.S. patent application Ser. Nos. 08/338,115 and 08/386,369 may be adapted and utilized in the apparatus and method of the present invention. Other features and aspects may also be provided and incorporated within the expert planning system, as will be more readily appreciated from the description that follows.

Figure 6:
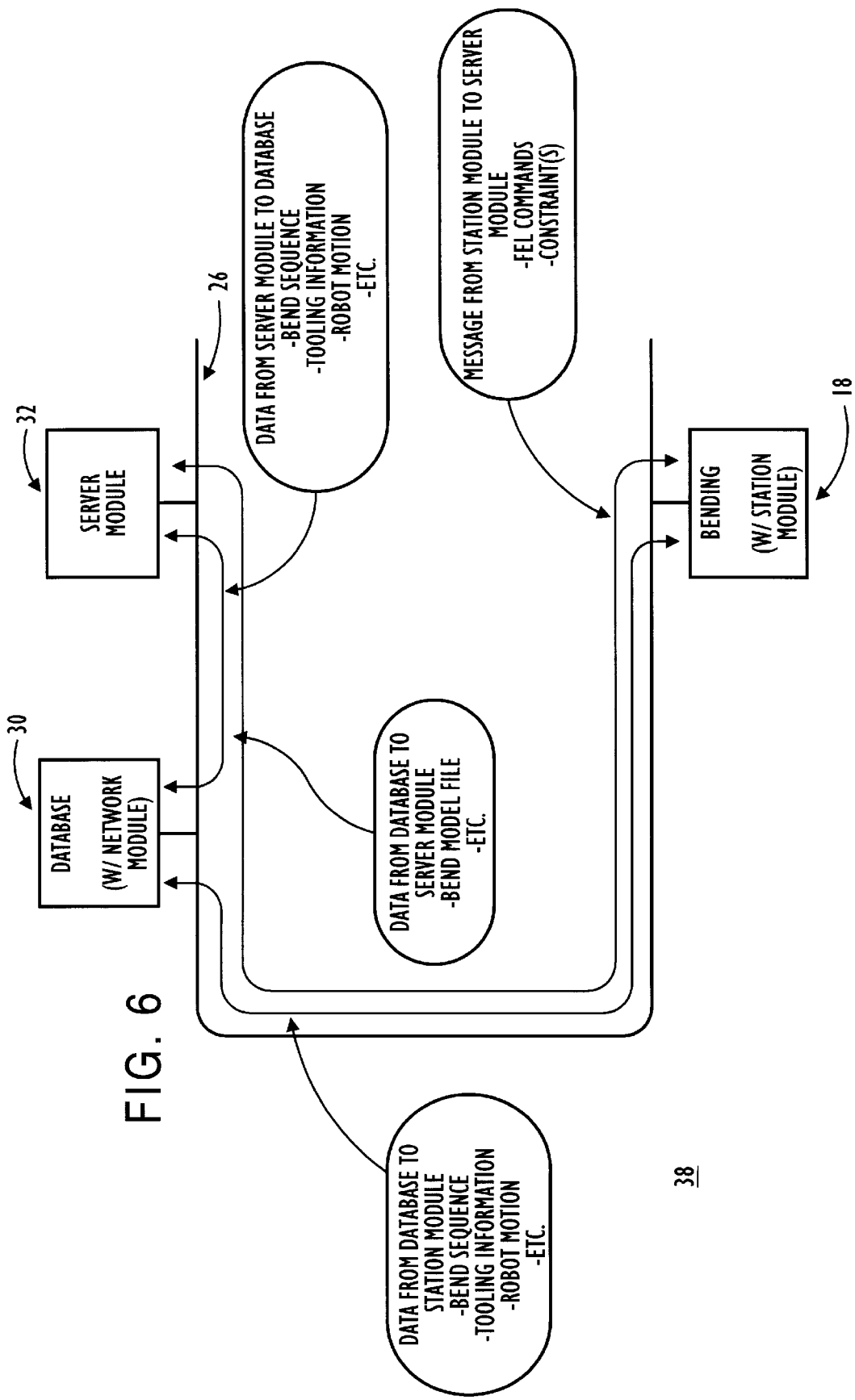
FIG. 6 illustrates an exemplary embodiment of the respective data and message flows between the various network locations and modules relating to the expert planning system.

FIG. 6 illustrates an exemplary embodiment of the respective data and message flows between the various network locations and modules relating to the expert planning system of the present invention. For purposes of facilitating the description herein, the illustration of communications network 26 in FIG. 6 has been simplified and only database 30, server module 32, and bending station 18 are shown in the drawing. Nonetheless, it will be appreciated that the data flow to and from other locations and station modules of facility 38 may be carried out in a similar manner to that described below.

The expert planning system of the present invention permits a bending operator or programmer to selectively activate the expert modules of the expert planning system in order to receive expert information regarding, for example, bend sequence selection, tooling selection, and robot motion planning. According to an aspect of the present invention, an operator is also permitted to set various constraints (such as a complete or partial bend sequence, or one or more tool selections) that will be used by the expert planning system when generating a bending plan. Various other features are also provided in order to enable an operator to review the results of the expert planning system and to determine whether to save the resultant information in the database and to use the same when executing a bending plan. Such features are discussed below with reference to, for example, FIGS. 8–11 and 12–20.

In accordance with an aspect of the invention, the main functions and processes to be performed by the expert planning system are implemented within server module 32. Server module 32 may be provided at any location within factory 38, including, for example, design office 10, and the functions and processes of the expert planning system may be implemented by software running on a computer-based platform provided at server module 32. Such features may be provided at each of the locations 10, 12, 14, . . . 20 throughout the sheet metal facility 38, or a client-server relationship may be implemented in facility 38 wherein each of the locations (e.g., clients) are provided with an interface to send data and messages over communications network 26 to server module 32 in order to access and activate the expert planning system implemented therein. Other configurations, such as a host-terminal configuration, may also be provided in order to implement the various features and aspects of the present invention. Further, if communications network 26 is implemented through the use of an Intranet or the Internet, server module 32 may be accessed locally or remotely from a plurality of geographically dispersed locations to access and activate the expert planning system.

As noted above, FIG. 6 is an exemplary illustration of the various transfers of data and messages between server module 32, database 30 and location 18 (which in the illustrated embodiment is implemented as a bending workstation with a station module). For purposes of illustration, the embodiment of FIG. 6 is based on a client-server relationship in which the expert planning system is implemented within server module 32 and each of the locations (including bending workstation 18) is adapted to access the expert planning system provided at server module 32 via communications network 26. When the expert planning system of server module 32 is initialized and activated, the bend model file representing the geometry and/or topology of the part is downloaded from database 30 and read by the expert planning system. The bend model of the part may be developed by a CAD or CAD/CAM system and may be stored in database 30 when a customer's order is received. The bend model may also be developed through the various features and aspects of the intelligent manufacturing system, such as those discussed above with respect to FIG. 4, and may also include both design and manufacturing information relating to the part.

After the bend model file has been read by the expert planning system, the various expert modules implemented at server module 32 may be executed in order to determine and generate a bending plan. The expert planning system may be used by an operator when, for example, unsatisfactory results have been obtained from the similar parts search of the intelligent manufacturing system, or whenever assistance is needed in developing a bending plan for a new part. As discussed below with reference to FIG. 7, the expert planning system may include various expert modules for determining a bending sequence, for selecting tooling (including the selection of the punch and die tools and the tool stage layout), and for planning robot motion. The expert modules may also determine robot grasping and repositioning. After a bending plan has been generated, the expert information may be transferred from the server module 32 to database 30 via communications network 26 so that the information may be stored in the bend model file related to the sheet metal part to be produced. Alternatively, the bending plan information may be stored in one or more files to permit easier access and retrieval of the various types of information related to the generated bending plan.

Utilization of the expert planning system may also be achieved from the various locations 10, 12, 14, . . . 20 provided throughout the facility 38. For example, bending workstation 18 may transmit one or more messages (for example, FEL messages) to server module 32 over communications network 26. These messages may include FEL commands indicating which expert modules are to be activated and may also include constraint phrases or data indicating various constraints to be used by the expert planning system. The messages that are sent over communications network 26 may be sent in accordance with the protocol of the communication network(s) that is/(are) utilized to implement network 26 (e.g., Ethernet Protocol or TCP/IP). When these messages and/or constraint data is received at server module 32, they may be transferred to the expert planning system and, when the expert planning system is activated, the messages may be interpreted/read and the appropriate bend model file may be read from database 30 so that bending plan information may be generated based on the same. The resultant expert information that is generated, i.e., the determined bend sequence, tooling, robot motion, etc., may then be stored in database 30 to update the bend model file. When the actual final bending plan is to be executed, the bending plan information may be downloaded from the database 30 to, for example, bending workstation 18, in order to perform the necessary bending operations on the sheet metal component. Alternatively, the final bending information may be accessed and sent from server module 32 to the bending workstation 18 when the plan is to be executed. Further, as indicated above, the station module of bending workstation 18 may include a planner and sequencer for controlling the various machinery at the bending workstation based on the bending plan information.

Figure 7:
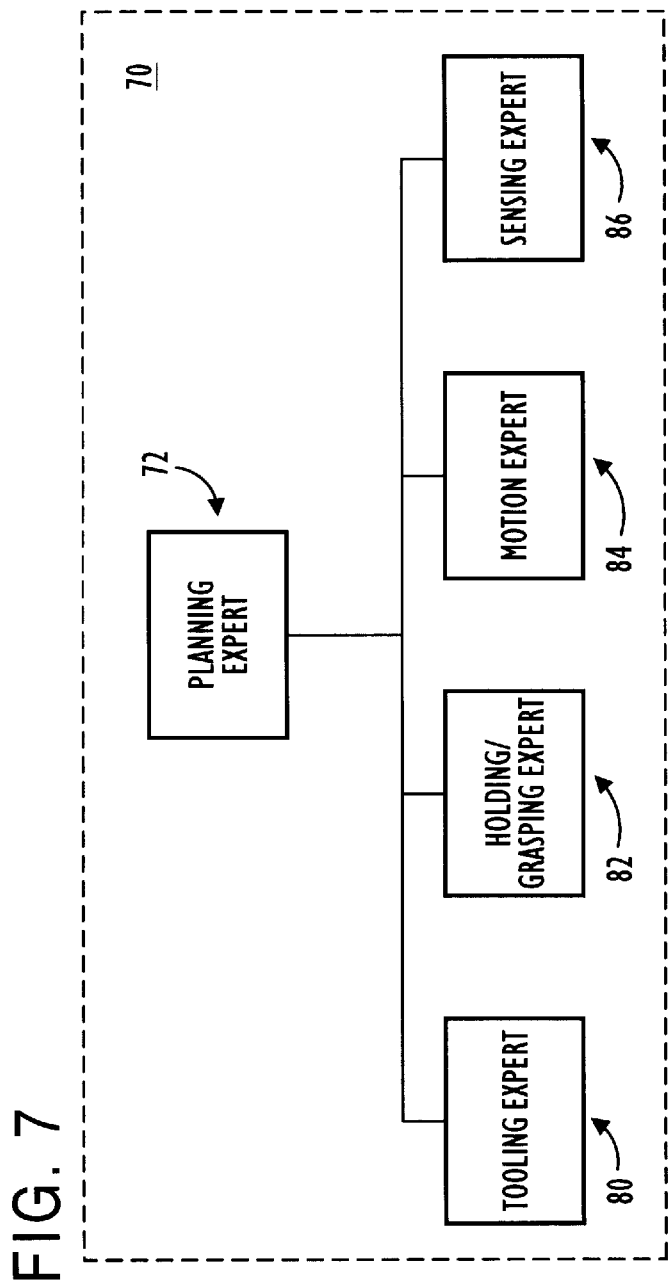
FIG. 7 illustrates, in block diagram form, an example of the various expert modules or systems that may be provided in the expert planning system.

FIG. 7 illustrates an example of the various expert modules or systems that may be provided in the expert planning system 70. As indicated above, intelligent manufacturing system 60 and expert planning system 70 may be implemented as executable software applications at server module 32 (see, for example, FIG. 2B). As shown in FIG. 7, expert planning system 70 may include a planning expert 72, a tooling expert 80, a holding/grasping expert 82, and a motion expert 84. As described in further detail below, a sensing expert 86 may also be provided. Planning expert 72 operates in cooperation with tooling expert 80, grasping expert 82, motion expert 84 and any other experts (e.g., sensing expert 86) to produce a plan for part production by, for example, bending workstation 18. Planning expert 72 may perform functions such as proposing a particular bend in a hypothetical bend sequence, and determining what initial steps must be performed by the system in order to execute such a bend having a position within the hypothetical bend sequence. In determining the consequences of the proposed bend, planning expert 72 may query tooling expert 80 as to what tooling would be needed to execute the proposed bend, and query holding expert 82 as to how the workpiece can be held while performing the proposed bend. Planning expert 72 may also query motion expert 84 as to whether and to what extent the robot (which is holding the workpiece) can be manipulated to assist in the making of the bend. If a sensing expert is provided, planning expert 72 might query sensing expert 86 as to whether a particular sensor-based control strategy is needed in order to facilitate the execution of the proposed bend by the workstation and the cost associated with a particular sensor-based control strategy. Planning expert 72 may be configured to continually propose bends from a first bend consecutively to a last bend in a complete bend sequence, thus resulting in a complete set of bends to perform the final workpiece. Once a successful bend sequence has been generated in this manner, planning expert 72 may be configured to generate a final plan (which includes a general list of steps and accompanying information needed to control execution of the various hardware elements and machinery of the workstation), and to forward the plan to database 30 and/or to the sequencer and controller of, for example, the bending workstation.

In operation, planning expert 72 initially analyzes the designed part by reading the appropriate bend model file from database 30 and proposes a bend sequence to be performed by the bending workstation. Planning expert 72 may utilize a state-space search method in order to determine an efficient sequence of bend operations that can be utilized by the bending workstation. Planning expert 72 may converse and query tooling expert 80, holding expert 82 and motion expert 84 in order to obtain the information it needs to make its decisions.

Tooling expert 80 may respond to queries made by planning expert 72, and provide information to planning expert 72 such as which tools will be needed for a particular bend operation or bend sequence. In addition, tooling expert 80 may inform planning expert 72 of the arrangement of tools within the workstation. Tooling expert 80, in conjunction with planning expert 72, will attempt to design a set-up of tooling so that the fewest number of stages/toolings are utilized to make a particular part, i.e., to execute a complete bend sequence for making the part.

Holding expert 82 may make holding-related determinations, such as whether the robot can hold the workpiece while a particular bend, specified by the planning expert 72 is being performed. Holding/grasping expert 82 may also determine the location at which the robot should hold the workpiece so that the workpiece may be maneuvered through a series of bends, without collision, and without the need to change the robot's grasp on the workpiece. In addition, holding expert 82 may determine the position at which the repositioning gripper should hold the workpiece when the robot's grasp is being changed, and where the suction cups of the loader/unloader (L/UL) should be placed during unloading and loading of the workpiece.

In addition, motion expert 84 is responsible for generating a motion plan, i.e., the manner in which the robot should be maneuvered in order to move the workpiece through various spaces and along various routes as needed to execute the bends. As a result, a collision-free robot motion path may be determined in order to control handling of the workpiece by the robot when performing the various bending operations.

Planning expert 72 and the respective experts noted above may be modular to communicate with each other in a query-based manner. For example, before deciding to include a particular bend as part of the bend sequence, planning expert 72 may query tooling expert 80 as to whether there are sufficient tools to handle the bend. Planning expert 72 will then await a response from tooling expert 80. Tooling expert 80 will recognize the query from planning expert 72, and will return with a response, e.g., indicating that there are sufficient tools to handle that particular bend noted by planning expert 72. By way of example, planning expert 72 may also ask holding or grasping expert 82 if the robot arm gripper can remain holding onto the workpiece during a particular bend operation without repositioning its grasp of the workpiece. Holding expert 82 will then respond to the query made by planning expert 72, and planning expert 72 will then utilize the information to perform its next determination.

Each of the modules of expert planning system 70 may utilize one of more functions provided by a geometric modeling library (not shown) in order to model the relative interactions and positions of each of the hardware components and machinery of the system as may be needed in making their determinations. The various features and aspects of U.S. patent application Ser. No. 08/386,369, as well as that provided in U.S. patent application Ser. No. 08/338,115, may be utilized to implement the various features of the expert planning system. It is noted that while the disclosures thereof illustrate a Unix-based system, the various features therein may be readily converted and imported to a PC-based, Windows NT application that is executable on a computer-based platform of server module 32. Various other features may also be provided in the expert planning system, such as those noted below.

Planning expert 72 of the embodiment shown in FIG. 7 may perform three main functions. First, planning expert 72 may generate a bend sequence, including the accompanying operations associated with each bend. Planning expert 72 may also query various other expert modules as to the consequences of the bend sequence as it is generated, and as to further plan details or subplans needed to accomplish the generated bend sequence. Finally, planning expert 72 may also compile all gathered or generated information in order to form an overall bending plan. Such a plan may specify the steps needed to execute the bend sequence by a control system which controls the operations of the various machinery at the sheet metal bending workstation. In addition, each of the experts (i.e., tooling expert 80, grasping expert 82, motion expert 84, etc.) of the illustrated expert planning system 70 may perform three main functions when requested by planning expert 72. They each may determine an incremental cost for performing an individual step within the bend sequence, and they may each develop proposed or intermediate plan information. In addition, each of the experts may communicate the incremental cost and plan information to the planning expert 72. The proposed/intermediate plan information may include two types of information: definite information and indefinite information. For example, at a certain point in time during planning, holding expert 82 will know which regions of the workpiece may be grasped by the robot gripper to perform a given bend within a bend sequence (the grasp regions being definite), but will not yet know the exact grasp location (the precise grasp location being indefinite). A temporary (indefinite) grasp location will be assigned by the holding expert 82, which can be verified at a later time. As noted above, planning expert 72 will query each expert as to the consequences of a bend sequence as it is generated.

The consequences of the bend sequence may be represented in terms of cost. The cost of the bend sequence as it is generated may be determined as a function of one or more of the following: the amount of time that it takes to perform a particular operation within the bend sequence; the extent to which an operation within the bend sequence will effect the accuracy of the operation and the quality of the resultant workpiece; whether or not there are any safety concerns associated with performing a particular operation at a particular point in a bend sequence; and whether there are any heuristics which, if taken into account, would suggest performing one operation instead of another at a particular point in the bend sequence.

Planning expert 72 may also query each of the experts for information such as what tool profile should be utilized to perform certain bends of the bend sequence, what stage segments will be needed to perform a given stage which will be needed to perform a bend, and where can/should the robot gripper grasp the workpiece in performing one or more bends of the bend sequence. In addition, planning expert 72 may query the experts as to when a repositioning of the workpiece should be performed in the bend sequence, and how should the robot and the workpiece be moved in order to execute various operations throughout the sequence, such as a bend, repositioning, workstation loading, and/or workstation unloading.

As discussed below, if a bending workstation does not include robotic controllers and bending operations are to be performed by a human operated press brake, then an operator may selectively activate various expert modules to provide only, for example, bend sequence and tooling information. In such a case, planning expert 72 would only query tooling expert 80, and holding or grasping expert 82 and motion expert 84 would not be utilized since robot motion and grasping information is not required. By sending a query-based message to server module 32, bending workstation 18 can indicate which experts are to be utilized for a particular job.

As noted above, the planning expert 72 of FIG. 7 may utilize various techniques and processes. For example, as disclosed in U.S. patent application Ser. No. 08/386,369, various sheet metal bending heuristics may be taken into account by the planning expert 72 when determining and generating a bend sequence. These heuristics may include, for example, bending internal tabs early, forming bends along the outermost bendlines before bends along inner bendlines, performing shorter bends before longer bends, and performing co-linear bends simultaneously. A state-space search algorithm may also be utilized by planning expert 72 in order to analyze the implications of performing various bends in a prescribed order. By assigning costs to each proposed bend, geometric reasoning may be utilized (e.g., to determine the physical implications of a particular bend) by modelling the machine and the resultant workpiece as they relate to each other during the execution of each bend. The state-space search algorithm may include an A* algorithm, such as disclosed, for example, by Nils J. Nilsson in "Problem-Solving Methods in Artificial Intelligence", McGraw-Hill Book Co., 1971, pp. 43–67, the content of which is expressly incorporated herein by reference in its entirety. Cost assessments may also be performed by planning expert 72 when generating a bend sequence. In addition, expert planning system 70 may generate a gross motion plan and a fine motion plan as disclosed, for example, in U.S. patent application Ser. No. 08/338,115.

Depending upon the geometric features associated with the part to be formed, there may be bend-related operations which cannot be performed at certain points in the operations sequence being planned. These bend-related operations can be constrained to (or excluded from) certain locations in the bend sequence by using a mechanism referred to as a "constraint". A feature extraction module (not shown) may be provided to automatically label geometric features from geometric models produced by a CAD system or appropriate design system, and the geometric feature labels can be used to form legal phrases (e.g., constraint phrases) in an interface communication language, such as FEL. A more detailed description of FEL is provided below.

Constraints may be defined by using a data structure that allows a particular arrangement of bend operations to be specified, in varying degrees of flexibility. For example, for a multi-sided part (see, for example, FIG. 23C), the following constraint phrase or statement can be used to specify the order in which bends 1, 2, 3 and 4 are to be performed:

(constraints ((1 2 3 4)).

This statement signifies that the first bend must be performed before the second, which must be performed before the third, which must be performed before the fourth. Further, since there are no operators included in the statement, there may not be any other bend operations performed before, between or after any of the bends 1–4.

If the bend 2 must be performed before bend 3, but there are no other constraints on the arrangement of the bend operations in the bend sequence, the following constraint statement may be used:

(constraints ((*2*3*)).

The operator "*" may act as a "wild card", and allows either no bend operations or any number of bend operations to be performed at its location in the bend sequence. Further, the type of bend operations which may be performed at the location of the wild card operator can be among any of the remaining bend operations not specified in the constraint statement. In addition, such a wild card operator may be provided to indicate, for example, that repositioning of the robot gripper may be performed at the position of the wild card operator.

Another wild card operator that may be provided is "?", which may signify that exactly one bend operation, among those not specified in the constraint statement, must be performed at its location in the bend sequence. Thus, if precisely one bend operation must be performed before bend 2, such as in the part illustrated in FIG. 23C, but there is no limitation on the number or type of bend operations following bend 2 (except that they may not include bend 2), the following constraint statement can be used:

(constraint ((?2*)).

The constraint statements may also include grouping operators which request that certain bend operations be grouped together with no limitation on the order of the bend operations within the group. For example, the following constraint statement requires that bends 2 and 3 be before bend 4 in the bend sequence, and that bends 2 and 3 be grouped together with no bend operations therebetween:

(constraints ((*{2 3}*4*))).

More than one constraint expression can be included within a constraint statement. For example, the following constraint statement includes the above grouping constraint expression, as well as an additional constraint expression which further specifies that bend 1 must be before bend 4 without any additional limitations as to the inclusion and arrangement of the other operations with respect to bends 1 and 4:

(constraints ((*{2 3}*4*) (*1*4*))).

There can be any number of bend operations within a group, and groups can be nested in order to specify that there is no requirement that a plurality of groups be in a specific order. For example, the following expression specifies that bends 1 and 2 must be next to each other in the bend sequence, and bends 3 and 4 must be next to each other in the bend sequence. However, there are no other constraints as to the inclusion and arrangement of other bend operations due to this constraint expression:

(*{{1 2}*{3 4}}*).

Some additional example constraint expressions may include (*7), which means that bend operation 7 must be performed as the last bend operation in the sequence, and (*7?), which means that the bend 7 must be performed as the second to last bend operation in the sequence.

The types of operators that can be used to define constraints may be expanded to include boolean operators such as NOT, OR, and AND. For example, a constraint which uses a NOT operator could be (*NOT 7), which would mean that the seventh bend operation could not be the last operation of the sequence.

There is no limit to the types of constraints that can be specified, and any entity within the expert planning system 70, including the various experts, as well as a human operator of the expert planning system, can define constraints. These constraints may relate to a desired bend sequence of tooling selection, and can be entered by a human operator at, for example, bending workstation 18. In addition, a constraint manager may be provided, e.g., within the intelligent manufacturing system 60 or the expert planning system 70 in order to automatically develop the constraint phrases based on a bend sequence (either complete or partial) or tool selection entered by the human operator, and in order to help maintain the consistency of constraints and resolve conflicts that arise between constraints.

A more detailed description of an example of a constraint manager for automatically generating constraint phrases based on the entry of bend-related constraints by a human operator will be provided below with reference to, for example, FIGS. 21–23. As discussed below, a human operator may enter a partial or complete bend sequence that will be utilized as a constraint by the expert planning system. Tooling may also be selected by a human operator so as to constrain tool selection by the expert planning system. The constraint manager may generate constraint phrases based on, for example, a bend sequence entered by an operator. In such a case, the constraint manager may analyze the geometric features and bends of the part so as to group, where appropriate, detected co-linear bends and Z-bends and to generate a constraint phrase based on the entered bend sequence so that the same may be utilized by the expert planning system 70.

In order to determine if there is a conflict between constraint expressions, the constraint manager may include an algorithm which checks for the presence of common operations within a given pair of constraint expressions. If there is a common operation among the constraint expressions, they may then be merged together in order to determine if they conflict. Various constraint expressions may be analyzed, including a human input constraint, a machine constraint that is dictated by the limitations of the machines and tooling, a part constraint that is dictated by the features of the part, and optimization constraints which are created in order to speed up the search for a bend sequence. If, for example, the constraint (*1*2*) was merged with the constraint in (*2*3*), the resulting merged constraint expression would be (*1*2*3*). If the constraint (*1*2*) was merged with the conflicting expression such as (*2*1*), a null would be the result, thereby indicating that the constraint expressions conflict with each other.

As noted above, planning expert 72 may utilize a state-space search algorithm. In a state-space search algorithm, a solution is obtained by applying operators to state-descriptions until an expression described as a goal state is obtained. In performing a state-space search method, a start node is associated with an initial state-description, and successors of the start node are calculated using operators that are applicable to the state-description associated with the node. By calculating all of the successors of the node, the node is thereby expanded.

Pointers are set up from each successor node back to its parent node. Pointers may later be used to indicate a solution path back to the start node, when a goal node is finally found.

The successor nodes are checked to see if they are goal nodes by checking the associated state-descriptions corresponding to the successor nodes to see if they describe the goal state. If a goal node has not yet been found, the process of expanding the nodes, and setting up corresponding pointers, continues. When a goal node is found, the pointers are traced back to the start node to produce a solution path. The state-description operators associated with the arcs of the path are then assembled into a solution sequence.

The above-described steps form a state-space search algorithm. Variations of the above-described algorithm may be defined by the order in which the nodes are to be expanded. If the nodes are expanded in an order in which they are generated, the search method is called a breadth-first method. If the most recently generated nodes are expanded first, the method is called a depth-first method. Breadth-first and depth-first methods are blind-search algorithms, since the order in which the nodes are expanded is unaffected by the location of the goal node.

Heuristic information about the overall nature of the graph and the general direction of the goal can be utilized to modify the search process. Such information can be used to help direct the search toward the goal, in an attempt to expand the most promising nodes first. One type of heuristic search method is described, for example, by Nils J. Nilsson in "Problem-Solving Method in Artificial Intelligence", previously noted above.

Blind-search algorithms, such as breadth-first or depth-first algorithms, are exhaustive in their approach to find a solution path to a goal node. In application, it is often impractical and time-consuming to use such methods, because the search will expand an excessive number of nodes before a solution path is found. Such an exhaustive expansion of nodes consumes more computer memory in order to store the information associated with each node and more time to calculate, for example, node expansions and points. Accordingly, efficient alternatives to blind-search methods are preferred. Heuristics may be applied to help focus the search, based upon special information that is available about the problem being represented by the graph. One way to focus the search is to reduce the number of successors of each expanded node. Another way to focus a search is to modify the order in which the nodes are expanded so that the search can expand outwardly to nodes that appear to be most promising. Search algorithms which modify the ordering of node-expansion are called ordered search algorithms. Ordered search algorithms use an evaluation function to rank the nodes that are candidates for expansion to determine the node which is most likely to be on the best path to the goal node. In operation of the ordered search algorithm an f value is determined at each node $n_i$ available for expansion, where f is an estimate of the cost of a minimal cost path from the start node to the goal node constrained to go through node $n_i$. Each succeeding node having the smallest f value is then selected in sequence for expansion.

An exemplary state-space search algorithm that may be applied by planning expert 72 of the present invention is provided in U.S. patent application Ser. No. 08/386,369. Various other processes and methods may be implemented by the expert planning system 70 in order to determine an optimum bend sequence, as well as tooling and robot motion information. In addition, gross motion and fine motion schemes may be utilized for proposing and determining robot motion paths. For this purpose, the techniques and processes disclosed for planning and controlling robot motion in U.S. patent application Ser. No. 08/338,115 may be utilized.

In order to facilitate the transfer of messages and information between the various systems and between each of the modules of the expert planning system, a query-based language called FEL may be used. FEL was originally developed by David Alan Bourne in 1988, and has since been further refined. For more detailed information regarding FEL generally, reference should be made to the several user guides provided by the Robotics Institute at Carnegie Mellon University including: "Feature Exchange Language Programmer's Guide." David Alan Bourne, Duane T. Williams (Jan. 14, 1994); "Using the Feature Exchange Language in the next Generation Controller," David Alan Bourne, Duane T. Williams, CMU-RI-TR-90-19; and "The Operational Feature Exchange Language," David Alan Bourne, Jeff Baird, Paul Erion, and Duane T. Williams, CMU-RI-TR-90-06. The contents of each of these FEL documents are hereby expressly incorporated by reference herein in their entireties.

FIG. 24 illustrates an exemplary FEL planning message 185 which may be sent from planning expert 72, as indicated by expression 186, to motion expert 84, as indicated by expression 188. FEL planning message 185 comprises a query command sent from planning expert 72 to motion expert 84, which provides preliminary information to motion expert 84 so that it may satisfy the query. An initial parameter setting portion 150 of message 185 is provided immediately after a main verb/command "GET" 152, and includes expressions "TYPE MESSAGE" 187, "FROM PLANNING" 186, "TO MOVING" 188, and "STATE REQUEST" 189. The expression "TYPE COST" 154 is provided immediately after setting portion 150, and signifies that a request is being made for the motion expert to tell the planning expert how much a particular operation will cost. The next expression "BENDS . . . " 156 queries how expensive it will be to perform bend number 3, after having done bend number 6. The numbers 7 and 1 represent a face of the workpiece that will be inserted into the die space of the bending workstation for bends 6 and 3, respectively.

A next expression "AVERAGE_COST 2.321" 158 informs the motion expert that this is the average cost (k-cost) for motion per bend for the bends that have previously been done based upon cost values previously assigned by the motion expert. In this case, the average cost is 2.321 seconds per bend previously performed. A next expression "FLANGE_BEFORE_BEND" 160 indicates the height (in millimeters) of the tallest flange of concern to be used by the motion expert to make clearance determinations. Expression "FLANGE_AFTER_BEND" 162 similarly indicates the height (in millimeters) of the tallest flange of concern which will exist after the bend is performed (indicated in FIG. 18 as 17.5 millimeters). A next expression "ROBOT_LOC" 164 informs the motion expert where the part is by specifying the location of the robot (as it was left upon completion of the previous bend). A last expression in the planning message 185, "BENDMAP" 166, indicates the respective tool stages for the previous bend and presently proposed bend and where the workpiece should be with respect to the stage for each bend. The first set of values may relate to the previous bend. The first value 168 represents that the location information is given for bend number 6, and a second value 170 indicates the stage at which bend number 6 was performed, which in this case is stage number 1. Several coordinates are listed to the right of the first and second values 168, 170. The first coordinate value "257." represents the position of the left edge of the part with respect to the left edge of the stage, and the second coordinate value "−257" represents the position of the left edge of the part with respect to the stage. The value "350.7" represents the position of the right edge of the part with respect to the stage. The final value "320." represents the position of the stage along the die rail with respect to the left edge of the die rail. Each of the above-noted values may be represented in terms of a predetermined unit of measure (e.g., mm or cm).

Figure 19:
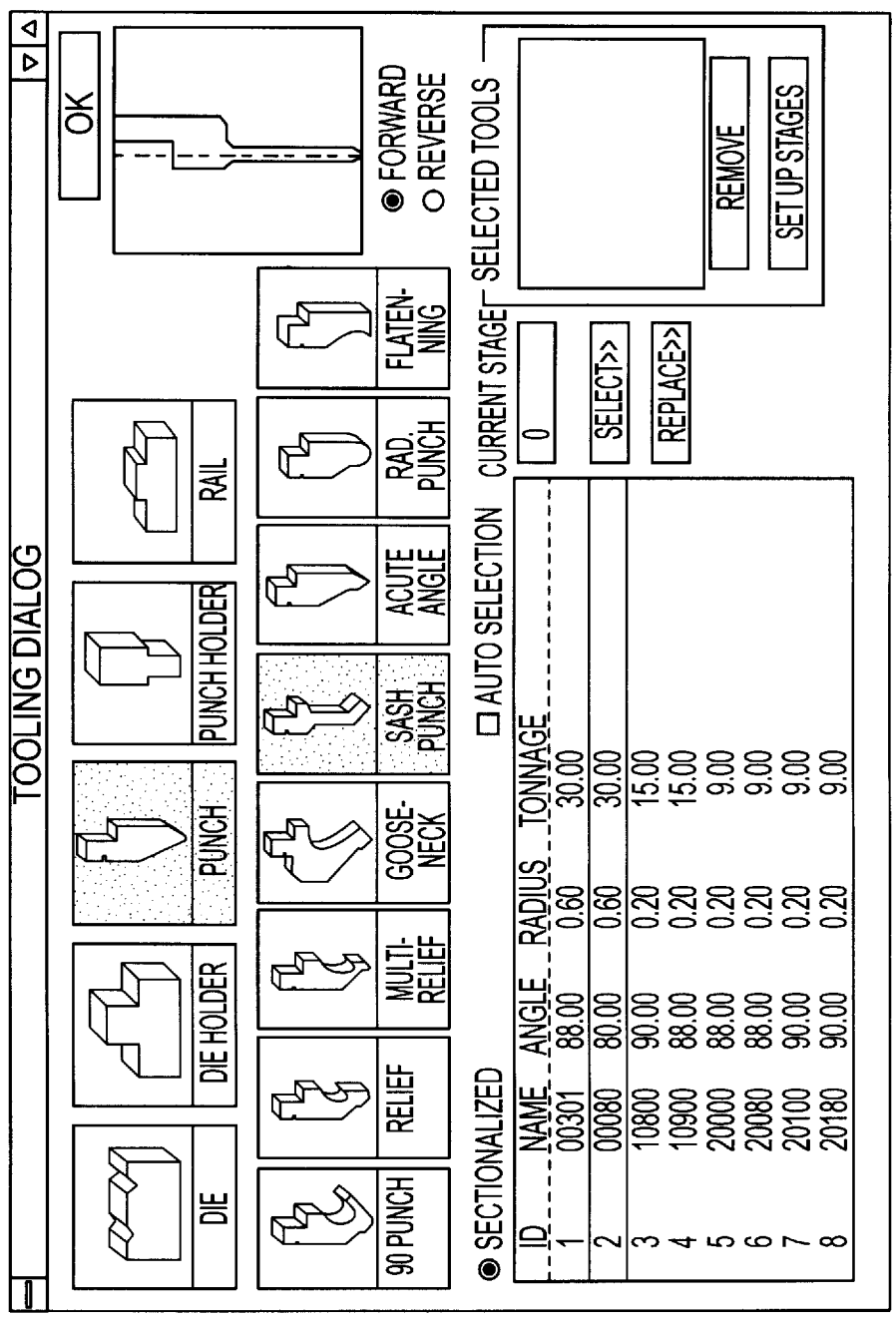
FIG. 19 is an exemplary a tooling dialog window display that enables an operator to select and indicate a desired tool to be utilized as a tooling constraint.

The second set of values in the "BENDMAP" message of FIG. 19 may relate to the presently proposed bend. The first value 172 represents that the location information is given for bend number 3, and a second value 174 indicates the stage at which bend number 3 was performed, which in this case is stage number 1. Several coordinates are listed to the right of the first and second values 172, 174. The first coordinate value "70." represents the position of the left edge of the part with respect to the left edge of the stage, and the second coordinate value "70." represents the position of the left edge of the part with respect to the stage. The value "225." represents the position of the right edge of the part with respect to the stage. The final value "320." represents the position of the stage along the die rail with respect to the left edge of the die rail. As noted above, each of the coordinate values may be represented in terms of a predetermined unit of measure (e.g., mm or cm).

Generally speaking, the planning message 185 forwards all the information which the motion expert will need in order for it to generate a subplan for moving the workpiece from an initial position (where it is left after performance of a preceding bend) to a position ready for a proposed next bend.

A significant feature of the query-based interface structure between the planning expert and various sub-expert modules is that when the planning expert forwards a query to an expert module, it informs the expert module of all background information that the expert module will need to respond to the query. Thus, the expert modules need not save information, but can simply respond to the planning expert and return all related information for the planning expert to save.

In configuring the planning expert system 70 illustrated in FIG. 7, each module including planning expert 72, and each of experts 80, 82, and 84, is sent a command to read its startup configuration file. An example of such a command could be as follows:

(READ ((TYPE FILE (NAME "CONFIG.S 2.FEL")))
((TYPE MESSAGE) (FROM PLANNING) (TO TOOLING) (NAME "CONFIG")))

After each module has read its startup configuration file, the system will be set so that planning expert 72 can use any specified number of experts, e.g., using a command such as the following:

(SET ((TYPE EXPERTS) (EXPERTS (TOOLING GRASPING MOVING))))

After the experts to be used by planning expert 72 are specified, the part design may then be read from the bend model file into each module as needed, and planning expert 72 may start the planning process.

The following table lists several commands that may be specified by planning expert 72 in participating in a dialogue with the other modules of the expert planning system, including the experts. Similar commands may also be sent between the intelligent manufacturing system and expert planning system applications and the server and station modules of the present invention, as further discussed below.

| FEL MODULE DIALOG COMMANDS | |
|---|---|
| SEARCH COMMANDS | |
| FINALIZE | - collect final plan info from each module |
| GET | - get cost information (and other data) for a bend |
| PLAN | - initialize a module for planning a part |
| USER COMMANDS | |
| QUIT | - cleantip and exita module |
| READ | - read files for planning |
| SET | - set various module options |
| SHOW | - show various module data to user |

The following table lists several commands that may be specified by planning expert 72 for execution by the controller and sequencer devices located at the station module or workstation. These FEL commands may be sent over communications network 26 to any of the locations 10, 12, 14 . . . 20 associated with the facility 38.

| FEL SEQUENCER COMMANDS | |
|---|---|
| PRINT MESSAGES | - print messages for BM100 operator for setup |
| PROGRAMS | - download programs to NC9R press controller and backgauge controller |
| STARTUP | - initialize state of press and robot |
| GET | - acquire part from various steps of the process |
| PUT | - load part into various steps of the process |

-continued

| FEL SEQUENCER COMMANDS | |
|---|---|
| MOVE | - move the robot through a series of points |
| BEND | - initiate bend sequence (backgauge and bending) |

The "READ" command may be used to instruct a module to read certain files needed for planning, the files being representative of the design to be produced, and to configure itself in accordance with the design. With use of the "SET" command, various module functions may be set, e.g., how to display information, how to interface with other modules, and so on. The "SHOW" user command may be utilized to show various module data to the user, e.g., the various nodes of the A* algorithm which represent the various costs or different bends within the proposed bend sequence.

Referring now to FIGS. 8–20, various features and aspects of the expert planning system of the present invention will be provided. The features of the expert planning system 70, as well as that of the intelligent manufacturing system 60, may be accessed and executed at server module 32 or remotely from any of the locations 10, 12, 14 . . . 20 provided throughout the sheet metal production facility 38. Depending upon where an operator executes the expert planning system, the various data and/or messages to be transferred between server module 32 and database 30 and each of the station modules will vary, as indicated above with reference to FIG. 6. In the embodiments described below, the expert planning system 70 and intelligent manufacturing system 60 are implemented as Window-based applications, with a server-client relationship existing between server module 32 and each of the locations 10, 12, 14 . . . 20 of the facility 38.

Figure 8:
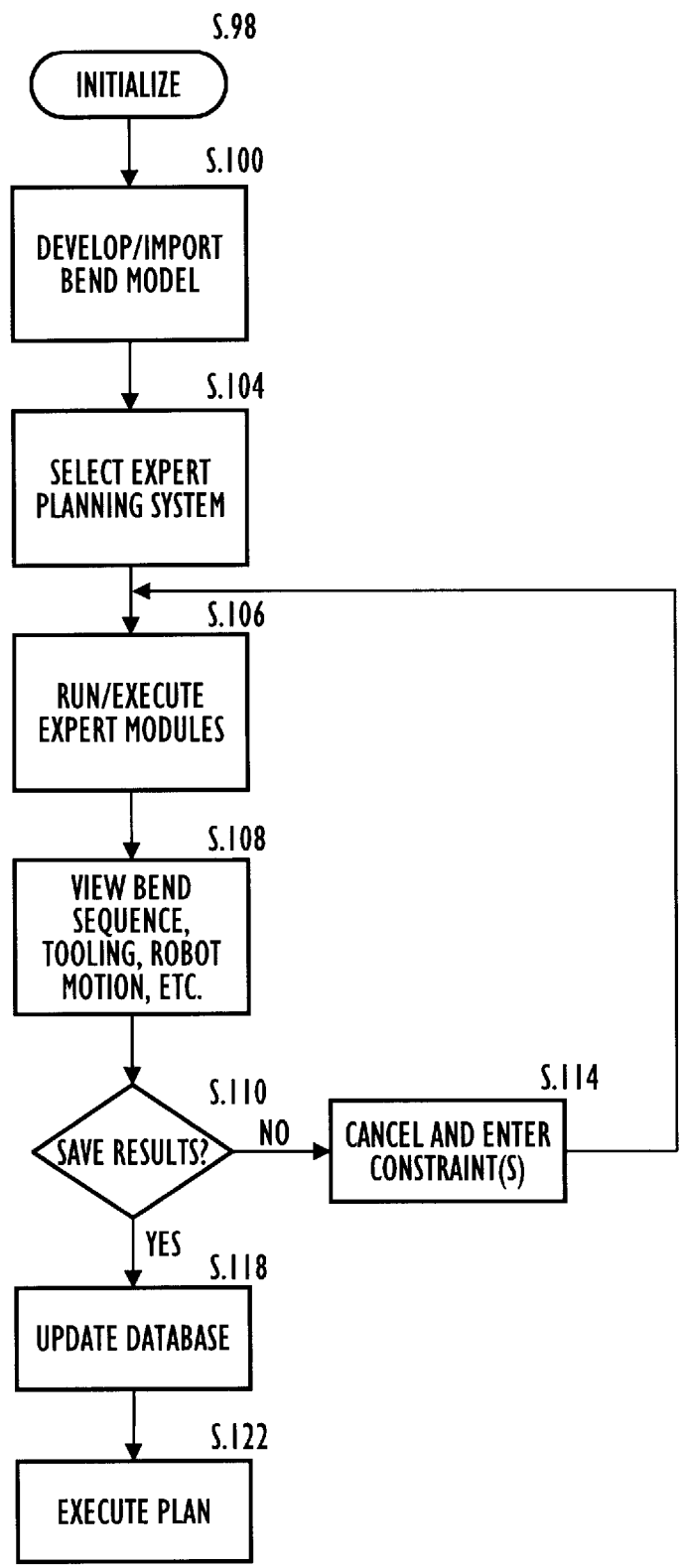
FIG. 8 illustrates an example of the various processes and operations that may be performed by an operator in order to develop a bending plan to produce a sheet metal component at a station having robot-based machinery.

FIG. 8 illustrates the various processes and operations that may be performed by an operator in order to develop a bending plan to produce a sheet metal component at a station having robot-based machinery. FIG. 8 and the accompanying drawings illustrate the various processes that may be carried out by the expert planning system 70, as well as its relation with the processes and operations performed by the intelligent manufacturing system 60.

After the server module 32 and the system applications have been initialized at step S.98, a bending operator may develop or import a bend model of a part at step S.100 based on a customer's specifications. As noted above, the customer may provide a 2-D and/or 3-D representation of the part which may be imported or an operator may develop a bend model of the part (with 2-D and/or 3-D representations of the part) with the intelligent manufacturing system according to the processes and operations described above with reference to, for example, FIG. 4. The bend model file, which may include a 3-D representation of the part such as that shown in FIG. 12, may be stored in database 30 for later access and retrieval from the expert planning system. As discussed above, other part and manufacturing information may also be stored with the bend model file.

Figure 12:
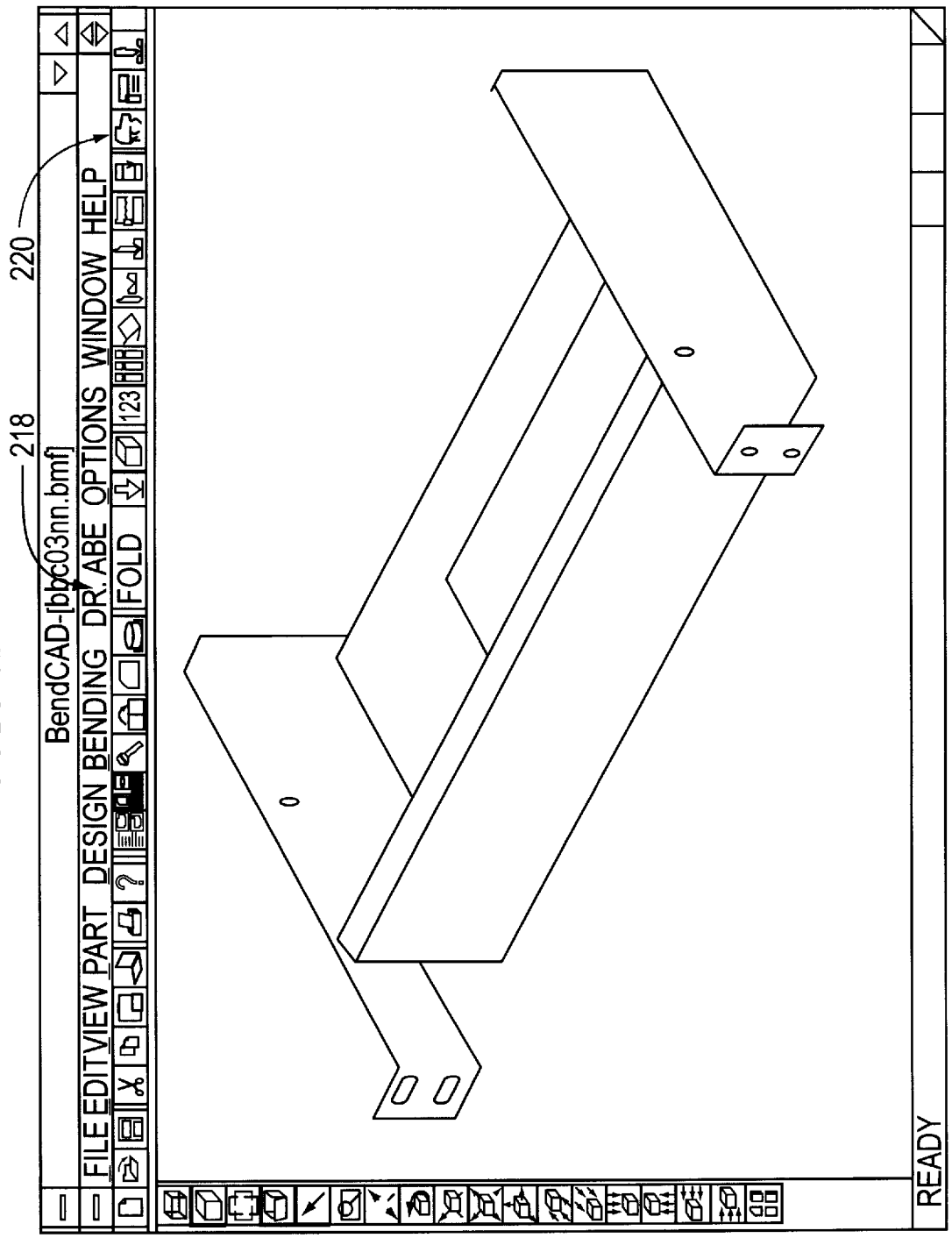
FIG. 12 is an exemplary intelligent manufacturing system window display, including a 3-D representation of a part to be produced.

After developing the bend model of part, an operator may select and activate the expert planning system at S.104 by entering a command or selecting an icon on a display screen of the server module or station module. In accordance with an aspect of the present invention, an operator may be permitted to select (from either server module 32 or the station module of one of the locations 10, 12, 14 . . . 20 ) the expert planning system from within the intelligent manufacturing system operating environment. For example, as shown in FIG. 12, the intelligent manufacturing system application (referred to as "BendCAD" in the drawings) may provide a Windows-based display screen that includes an action command 218 (e.g., "Dr. ABE") and/or an icon 220 (e.g., a man with a hat) to select and activate the expert planning system. When the expert planning system is selected, it may be activated at server module 32 and another Windows-based display screen, such as that shown in FIG. 13, may appear on the screen at the operator's location. This display screen may include a two-dimensional representation of the part with each of the bendlines being indicated by an identification number (e.g., 1, 2, 3 . . . etc.). Various other information and function keys may also be displayed in the expert planning window display, such as those described in greater detail hereinafter.

Figure 13:
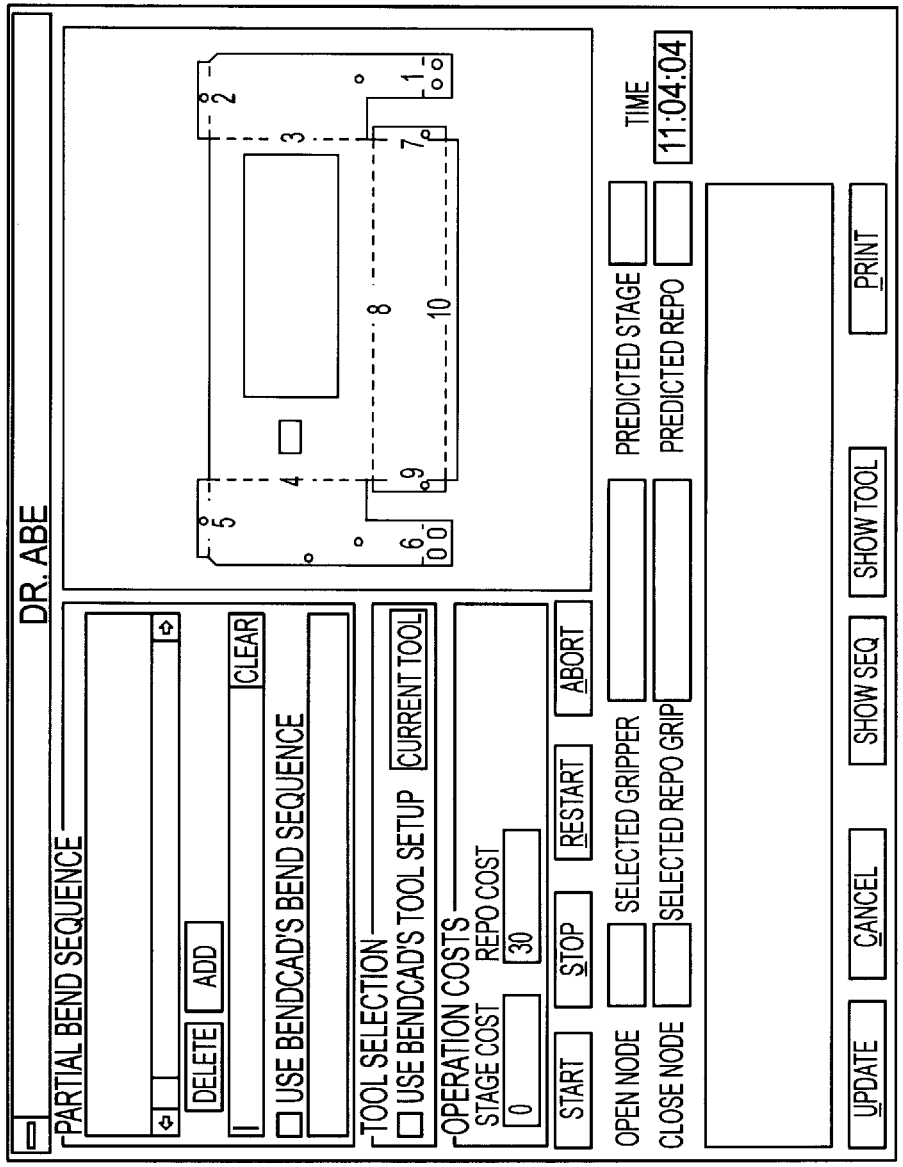
FIG. 13 is an exemplary expert planning system window display, including a 2-D representation of a part to be produced with the bend identification numbers indicated therein.

If an operator decides to run or execute the expert planning system in order to develop a bending plan, then at step S.106 the various expert modules of the expert planning system may be executed by entering a command or selecting a "START" function key or button on the display screen, such as that shown in FIG. 13. Running the expert planning system 70 will cause the related bend model file to be read from database 30 and a series of processes and steps to be performed by the expert modules in order to develop a proposed bending plan. The expert planning system 70 may be adapted to develop a bending plan in accordance with the features and aspects disclosed in U.S. patent application Ser. No. 08/386,369. For example, after reading the bend model data file, expert planning system 70 may develop and determine "obvious" constraints based on the geometry of the part and in accordance with one or more bend heuristics. Thereafter, by querying each of the expert modules, the various punch and die tools and robot grippers may be selected based on the geometric constraints. At the same time, the tooling and repositioning costs may be predicted or estimated. Then, a search process may be performed, for example, based on a state-space search algorithm, to determine the bend sequence and, at the same time, the actual tool stage layout and repositioning information may be developed. After performing such steps, the bend sequence and tool stage layout may be finalized, and then the robot motion and any required backgauge motion (e.g., for facilitating the set up of the tools in the press brake) may be developed. After finalizing the robot motion and any other required information, the expert planning system may finalize the bending plan data and send the same via, for example, FEL commands to the intelligent manufacturing system 60 and/or database 30 for subsequent storage. A more detailed description of the transfer of FEL messages between the intelligent manufacturing system and the expert planning system will be provided below.

Figure 14:
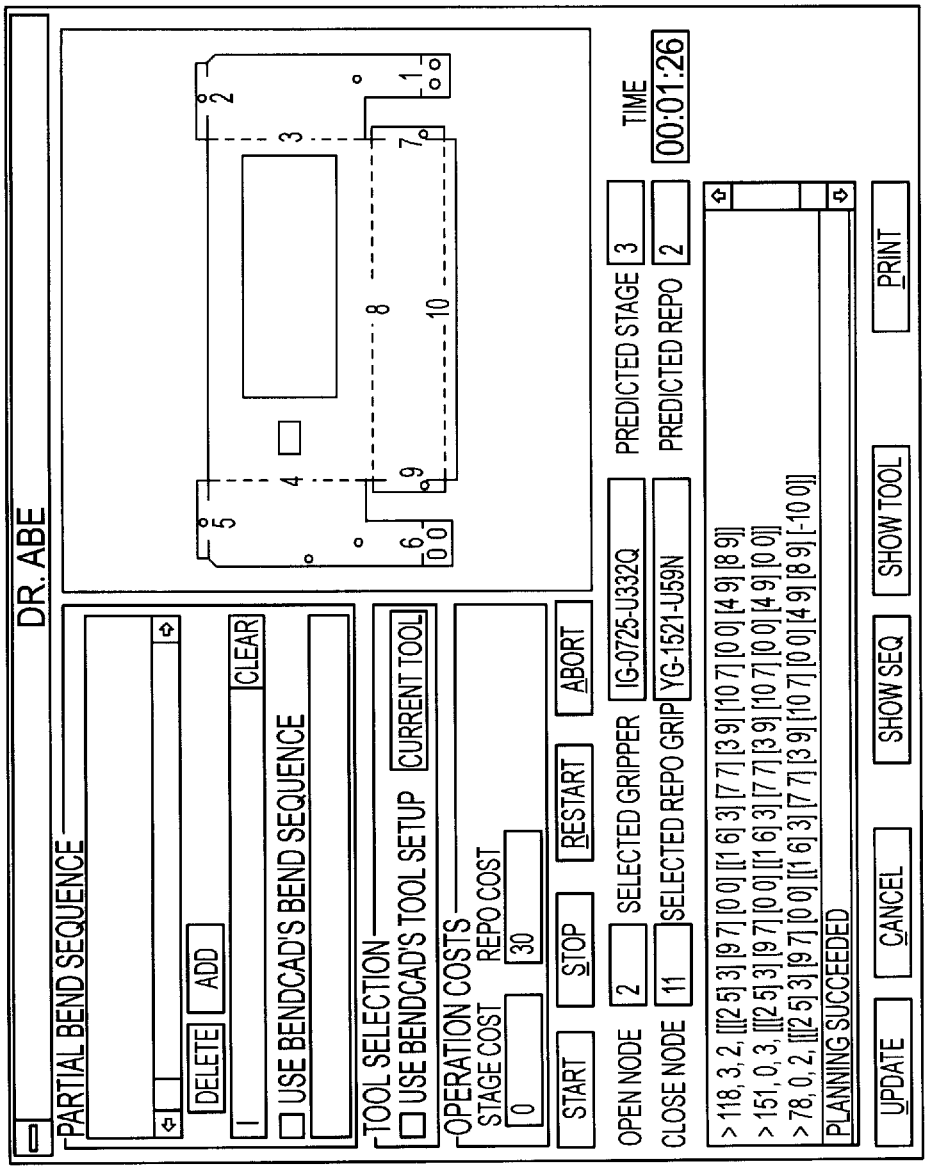
FIG. 14 is-another example of a expert planning system window display, wherein bending plan and status information relating to the execution of the expert system is displayed.
Figure 15:
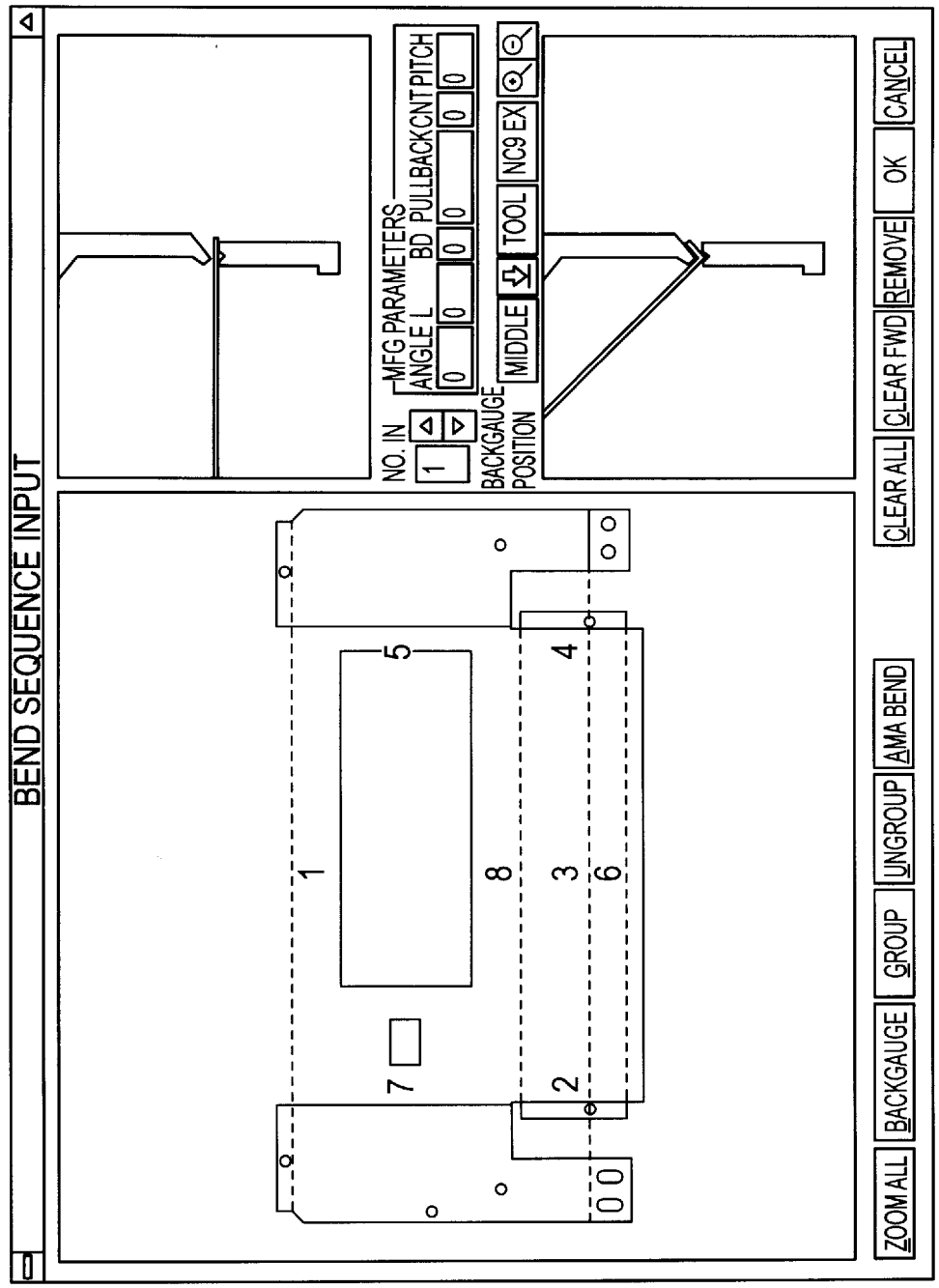
FIG. 15 illustrates an exemplary bend sequence input window display that may be provided to indicate a proposed bend sequence and/or to permit an operator to enter or modify a bend sequence.

As illustrated in FIG. 14, when the various expert modules are being executed, the expert planning system window display may actively indicate to the user the elapsed time of the execution run (e.g., within a "Time" information block), the status of each of the expert modules, and the status and search/solution paths of the state-space search process or other processes (e.g., within a large information window provided in the lower portion of the display in FIG. 14). Based on the status information, an operator may determine to stop, restart or abort the execution of the expert planning system by selecting the appropriate keys on the window display (e.g., function keys "STOP", "RESTART" and "ABORT"). These function keys may be selected by an operator whenever the expert planning system is executed.

In addition, as shown in FIG. 14, the window display may indicate the predicted stage cost and repositioning cost (see, e.g., the "Predicted Stage" and "Predicated Repo" information blocks), as well as the gripper and reposition gripper that has been selected by the expert planning system (see, e.g., the "Selected Gripper" and "Selected Repo Gripper" information blocks). This information may be displayed as each item is set or determined during execution of the expert planning system. In addition, other information may also be displayed when the expert planning system is executed. For example, the predefined operation cost to be associated with each tooling stage and each reposition of the gripper may be displayed and indicated to the operator (see, e.g., the "Stage Cost" and "Repo Cost" information blocks). The number of open nodes (e.g., nodes which may be possible to expand in the future) and the number of closed nodes (e.g., the number of nodes at infinity or having no possibility of expansion) related to the state-space search process may also be actively indicated (in real time) on the screen during the search (see, e.g., the "Open Node" and "Close Node" information blocks).

When the final proposed bending plan has been completed by the expert planning system, a message may be provided on the display screen (see, e.g., the "Planning succeeded" message shown in FIG. 14) to indicate to the operator that a solution and final bending plan has been determined by the expert planning system. Other messages may also be provided in order to indicate errors or when no solution has been determined by the expert planning system (e.g., "Error" or "No Solution Found").

At step S.108, the bending operator or programmer may view the proposed bending plan, including the bend sequence, tooling and robot motion selected by the expert planning system. For example, by returning to the intelligent manufacturing system application window and/or by selecting the appropriate icons or function commands, an operator may be permitted to view the results of the expert planning system execution. Various function commands and/or icons may be provided (either within the display screen for the intelligent manufacturing system or the expert planning system) to permit an operator to view the selected bend sequence or tools and tool stage layout. Function commands may also be provided to permit the operator to view simulation of the bending plan, including the proposed robot motion and repositioning. In accordance with an aspect of the present invention, the intelligent manufacturing system and expert planning system interface screens may be simultaneously displayed to the user (e.g., in a cascading or overlapping fashion) in order to permit an operator to select and operate various functions within each application.

As described above, an operator may view the resultant bend sequence, tooling, and robot motion determined by the expert planning system by selecting the appropriate icons or entering/selecting the appropriate function commands through the intelligent manufacturing system application window. Alternatively, as shown, for example in FIG. 14, separate action keys or buttons may also be provided on the expert planning system window display in order to permit an operator to more directly access and review the results of the planning system from the expert planning system window display. By way of a non-limiting example, a "Show Seq" command button may be provided (see, e.g., FIG. 14) so that an operator may view the bend sequence selected by the expert planning system. When the "Show Seq" command is selected, a bend sequence window such as that shown in FIG. 15 may be provided on the operator's screen to indicate the proposed bend sequence to the operator. When an operator highlights or selects each bend displayed within the bend sequence window, cross-sectional views of the workpiece and punch tools may be displayed to indicate the orientation of the workpiece and tools immediately before the selected bending step and the orientation immediately after the bending step (these cross-sectional images may be provided on the righthand side of the screen, as shown, e.g., in FIG. 15).

Figure 16:
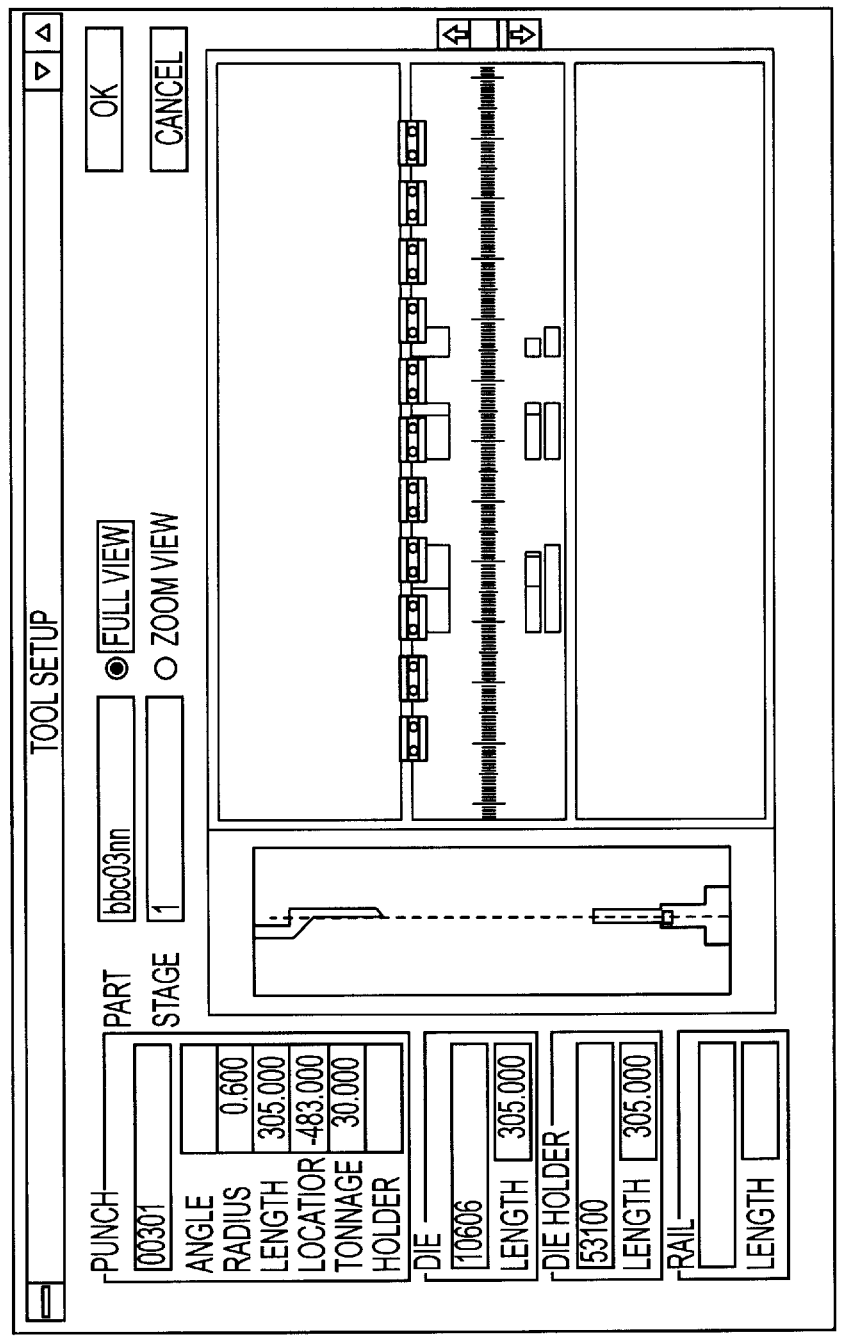
FIG. 16 is an exemplary tool setup window display that may be provided to indicate, for example, the proposed tools and tool stage layout selected by the expert planning system.

Further, by selecting a "Show Tool" command key on the expert planning system window display, a tool setup window display, such as that shown in FIG. 16, may be provided to the operator to indicate the tools and tool stage layout selected by the expert planning system. As shown in FIG. 16, the tool setup window display may provide a 2-D representation of the tool stage setup on the press brake and a cross-sectional view of the punch and die tools that are present at each stage on the press brake. These cross-sectional views of the tools may be successively displayed as each tool stage on the displayed press brake is selected on the screen by the operator. Once again, it is noted that the various display screens, including the bend sequence window display and the tool setup window display, may be simultaneously displayed with the other application displays to provide the operator with flexibility in moving from one screen or application to another.

Figure 17:
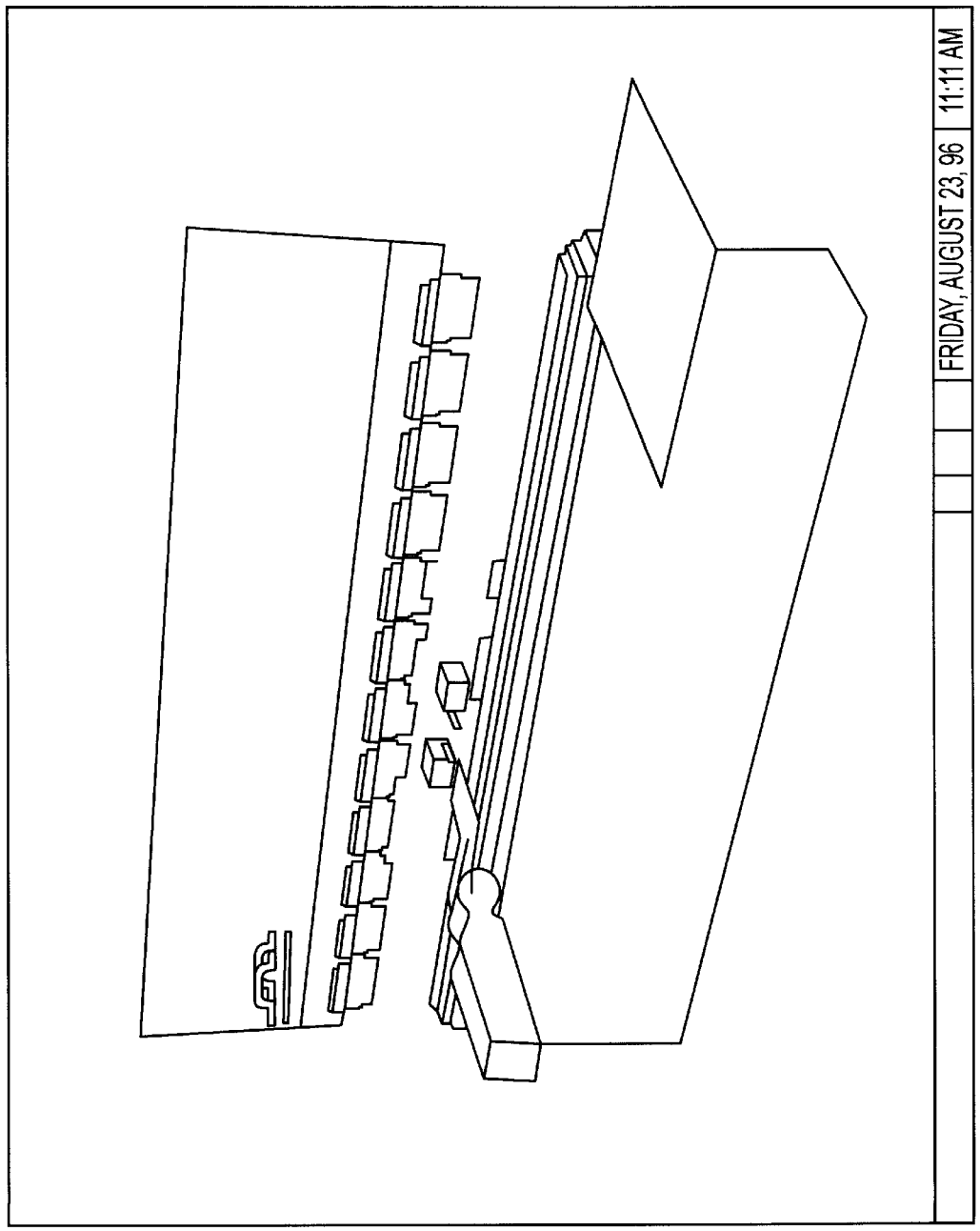
FIG. 17 illustrates an exemplary robot motion simulation window display that includes a 3-D representation of the press brake, the robot arm and gripper, and the repositioning gripper.

In addition, in order to confirm the robot motion selected by the expert planning system, a simulation of the bending operations and movement of the robot gripper, as well as the reposition gripper, may be provided to the user. FIG. 17 illustrates an exemplary robot motion simulation window that may be displayed in response to the entry of a function command or selection of an icon on one of the window displays. The robot simulation window may include a 3-D representation of the press brake, the robot arm and gripper, and the reposition gripper. Based on the entry of a command by an operator (e.g., by double clicking a mouse device or pressing a predetermined key on a keyboard), the entire bend sequence and robot motion determined by the operator may be dynamically indicated on the screen to simulate the motions of the various machinery in real time. The simulations may be provided for the complete bend sequence or in stages (e.g., in relation to each command entered by the operator) for actions related to each bend within the bend sequence. The display may also include a representation of the material loader/unloader and the interaction between the robot with the material handler and with the reposition gripper (if any repositioning is required). Moreover, the simulation window display may also include 3-D representations of the backgauge members and/or sensors which facilitate the robot in aligning the workpiece within the press brake. Simulation of the movements and actions between these members within the bend sequence may also be provided.

After reviewing the results of the bending plan determined by the expert planning system, an operator may determine, at step S.110 in FIG. 8, whether to save the results and to file the same with the related bend model file in database 30. If an operator is satisfied with the bending plan developed by the expert planning system, the operator may save the results and update the bend model data file at step S.118. The results may be saved by entering an appropriate command or selecting a displayed function key or button, such as the "Update" function key illustrated in FIG. 14, within any of the application windows, including the expert planning system window. Thereafter, the bending plan may be executed at step S.122 by downloading the final bending plan information from the database to, for example, the bending workstation 18 so that the machinery may be setup and controlled based on the determined bending plan.

In addition, the operator may print out a work setup sheet based on the final bending plan by selecting an appropriate action key (such as the "PRINT" key illustrated in FIG. 14), so that the sheet may be reviewed with others or distributed to various locations throughout the factory.

If an operator is not satisfied with the results of the expert planning system, then at step S.114 the results may be cancelled by entering an appropriate command or selecting a function key, such as the "CANCEL" function key illustrated in FIG. 14. The operator may then reexecute the expert planning system by, for example, entering one or more constraints or modifying the bend model file. As discussed in greater detail below, the operator may enter constraints to constrain and control the manner in which the expert planning system develops the bending plan. For example, an operator may indicate a desired bend sequence or indicate one or more bend steps which must be performed in a particular order or manner. In addition, particular tooling may be defined by the operator to limit the possible number of tooling selections made by the expert planning system. With this ability, operator may modify or adapt the expert planning system for particular applications and/or for a customer's specifications.

In accordance with another aspect of the present invention, the expert planning system may be utilized to develop a bending plan for a robot-based bending workstation in accordance with one or more constraints entered by an operator. As noted above, these constraints may comprise, for example, bend constraints as well as tooling selection constraints. A constraint manager may be provided to automatically generate constraint phrases and to resolve any conflicts in the constraints based on the information entered by the operator. The constraint manager may be provided as a separate executable module or as a subsystem within the intelligent manufacturing system at server module 32. The constraint phrases that are generated may be passed to the expert planning system when the various expert modules are executed. A more detailed discussion of the constraint manager and the manner in which the constraint phrases may be passed to the expert planning system by using, for example, FEL commands, is provided below with reference to FIGS. 21–23.

Figure 9:
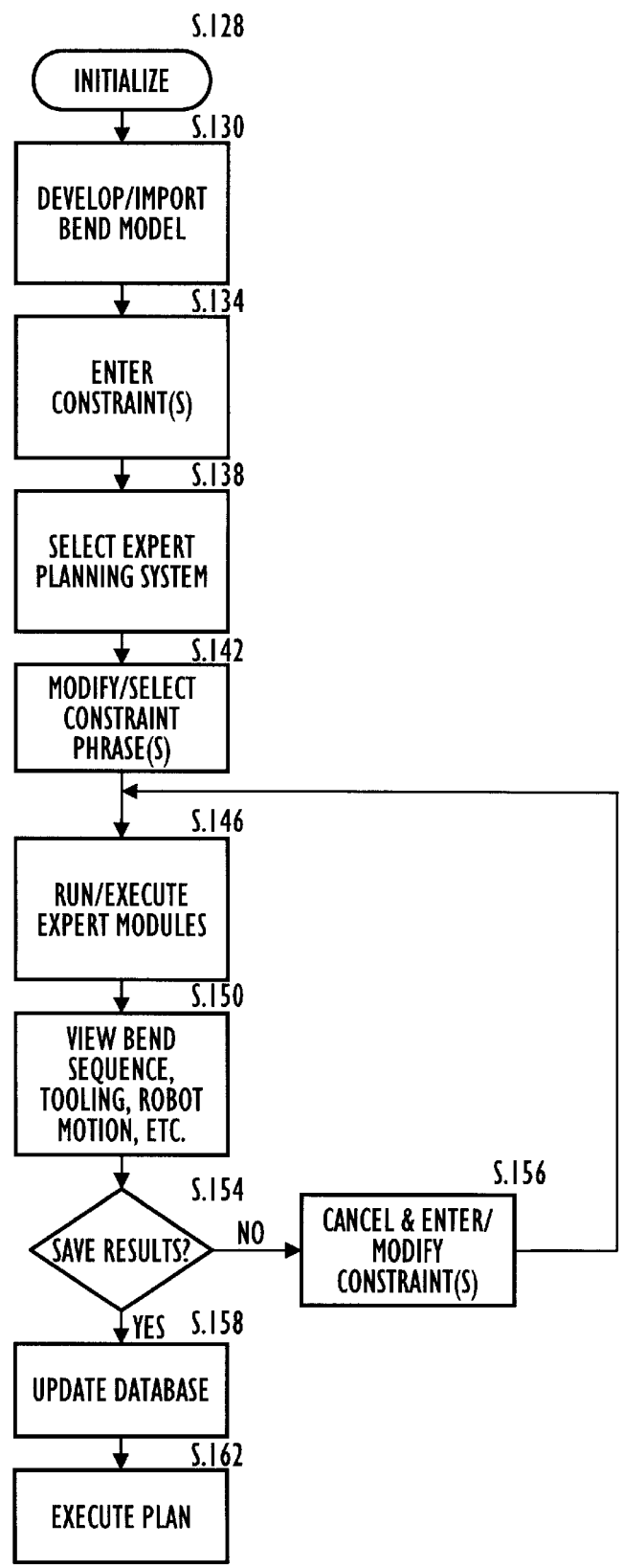
FIG. 9 is an exemplary flowchart of the various processes and operations that may be performed to develop a bending plan for a robot-based workstation with one or more operator-entered constraints.

Referring now to FIG. 9, and exemplary flowchart of the various processes and operations that may be performed to develop a bending plan for a robot-based workstation with one or more operator-entered constraints will be provided. The overall process is somewhat similar to that described above with reference to FIG. 8. That is, at step S.128, the system software and server module 32 are initialized and then a bend model of the part is developed or imported into the database 30 at step S.130. Once again, the various processes and operations described above with respect to the intelligent manufacturing system may be utilized to develop the bend model of the part, which may include both a 2-D and 3-D representation of the customer's part. Thereafter, at step S.134, an operator may enter one or more constraints to be utilized in the bending plan. A human operator may enter these constraints from within the intelligent manufacturing system operating environment. For example, from the intelligent manufacturing window display of FIG. 12, an operator may activate and display (e.g., by entering an appropriate command or selecting an icon) a bend sequence input window, such as that shown in FIG. 15, in order to enter the desired bend sequence for the part. Other constraint information may be entered separately or in combination with the bend sequence. For example, by selecting a tooling dialog window to be displayed, such as that shown in FIG. 19, an operator may select and indicate a desired punch or die tool to be utilized in the bending plan. Alternatively, by selecting the expert planning system and activating the same from within the intelligent manufacturing system window display, bend sequence and/or tooling constraint information may be entered directly through various dialog windows and function keys of the expert planning system window display (see, for example, the upper lefthand corner of the window display of FIG. 13).

Figure 18:
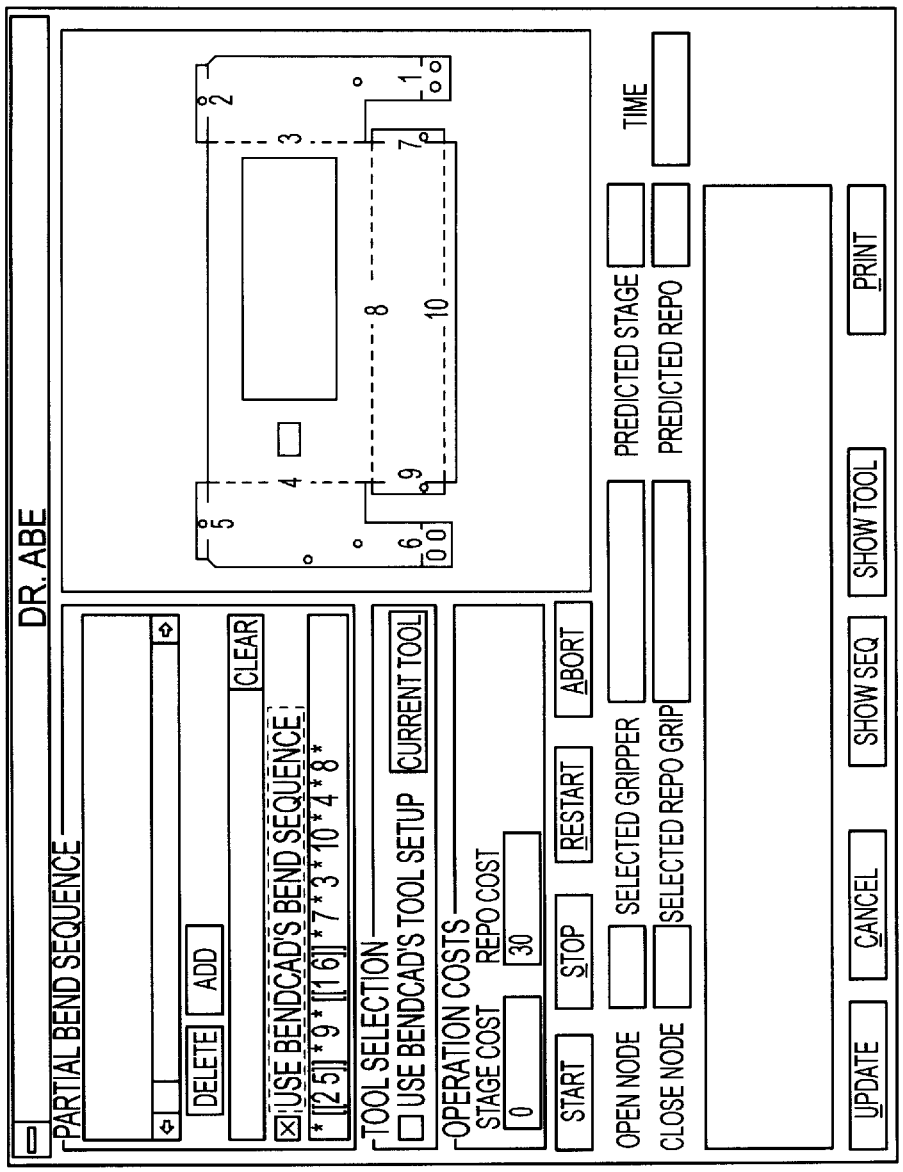
FIG. 18 illustrates another example of an expert planning system window display, wherein the window display includes a bend sequence constraint phrase.

If an operator has entered constraint information through the intelligent manufacturing system operating environment, then the expert planning system may be selected (e.g., by entering an appropriate command or selecting an icon) at step S.138 in order to activate the expert planning system. Assuming, for purposes of illustration, that an operator has only entered bend sequence constraint information, then the related constraint phrase developed by the constraint manager will be passed to the expert planning system and subsequently displayed to the operator. FIG. 18 illustrates an example of the expert planning system window display that includes a bend sequence constraint phrase (see, e.g., the information block entitled "Use BendCAD's Bend sequence"). In the illustration of FIG. 18, the constraint phrase that was developed by the constraint manager is the following:

$$*((2\ 5))*9*((1\ 6))*7*3*10*4*8*$$

The bend identification numbers used in the constraint phrase (e.g., 2, 5, 9, 1, 6, etc.) correspond to that indicated in the 2-D representation of the part that is displayed within the expert planning system window display. By analyzing the constraint phrase on the screen, an operator may determine to edit or modify the constraint phrase directly on the screen, or an operator may clear the constraint phrase that was developed and enter a different constraint phrase. As shown in FIG. 18, the expert planning system window display may include various action keys (e.g., "Delete", "Add", "Clear", etc.) to enter and/or modify the constraint phrase. After modifying the constraint phrase or being satisfied with the constraint phrase generated by the constraint manager, an operator may select the constraint phrase at step S.142 to indicate that the constraint phrase should be used by the expert planning system. The confirmation of the constraint phrase may be performed in a variety of ways, including entering a command or double clicking with a mouse on the constraint phrase displayed on the screen. As shown in FIG. 18, confirmation of the use of the bend sequence constraint phrase may be provided to the user by providing an "X" beside the displayed constraint phrase.

At step S.146, the operator may run or execute the expert modules of the expert planning system by entering or selecting an appropriate command (e.g., the "START" command of FIG. 18). The expert planning system will then generate a bending plan including a final bend sequence, tooling selection and stage layout, and robot motion, based on the constraint phrase or phrases entered by the user. The resultant final bending plan and selections made by the expert planning system may then be viewed by an operator at step S.150, in a similar manner to that described above. After reviewing and confirming the bend sequence, tooling and robot motion selected by the expert planning system, an operator may determine at step S.154 whether to save the results. If an operator determines to save the results, then at step S.158 the database may be updated with the final bending plan information so that the bending plan may thereafter be executed at step S.162. Once again, the final bending plan may be stored in database 30 as part of the bend model file relating to the part. If an operator is not satisfied with the results at step S.154, then at step S.156 the results may be cancelled and the operator may enter or modify the constraints to be utilized by the expert planning system; and, thereafter, the expert modules of the expert planning system may be reexecuted at step S.146. Further revisions and modifications may be made by the user until a satisfactory bending plan has been developed by the expert planning system.

Figure 10:
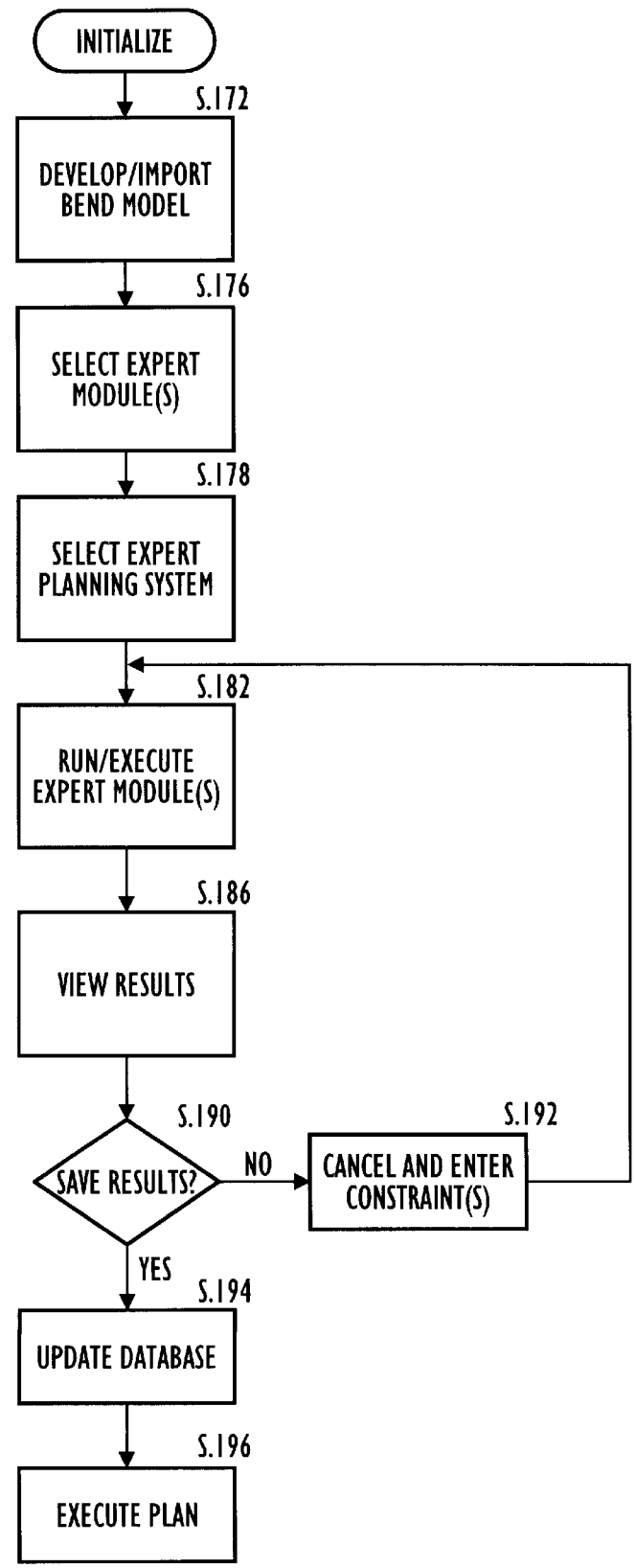
FIG. 10 illustrates an example of the logic flow of the various processes and operations that may be performed to develop a bending plan for a human-operated workstation.
Figure 11:
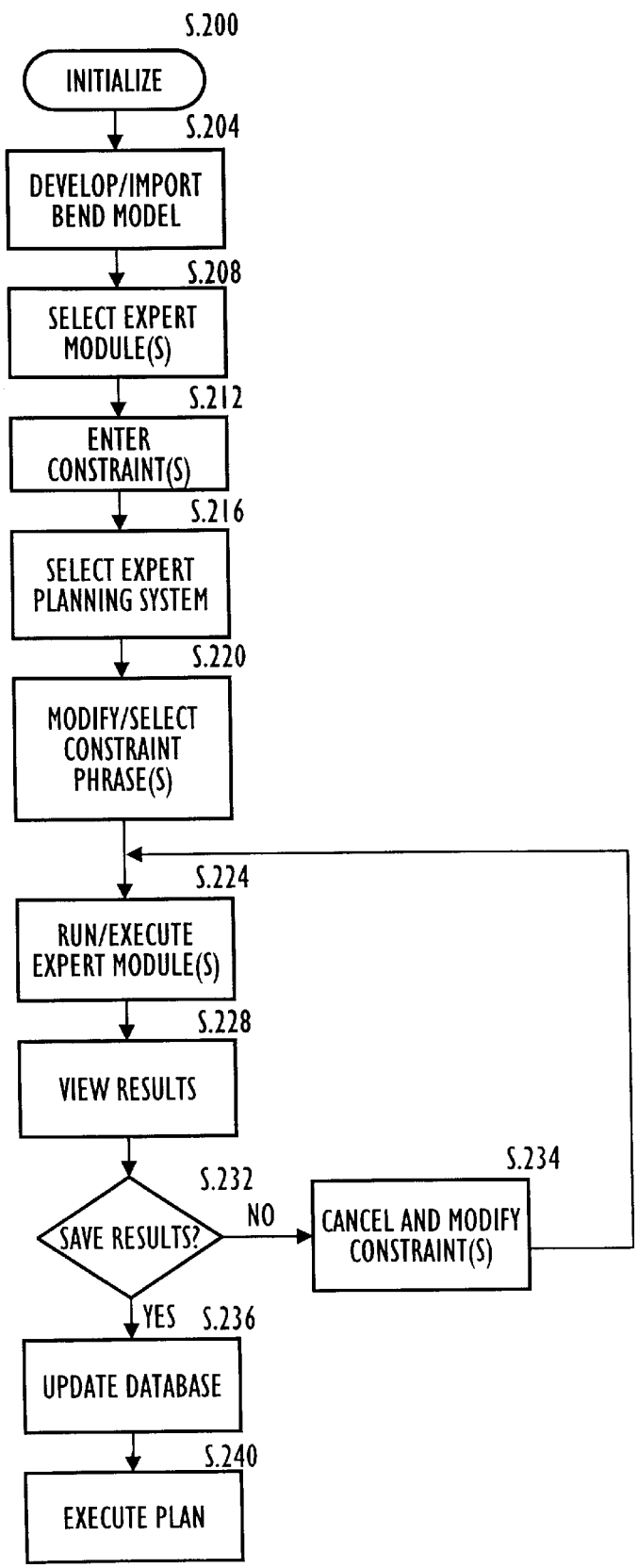
FIG. 11 illustrates an example of the logic flow of the various processes and operations that may be performed to develop a bending plan for a human-operated workstation with one or more operator-entered constraints.

The intelligent manufacturing system and expert planning system of the present invention may be selectively modified by an operator in order to adapt these systems for particular machinery and/or applications. In addition to using such systems with robot-based machinery, the intelligent manufacturing system and expert planning system may be adapted to provide intelligent and expert information for non-robot based bending operations. FIGS. 10 and 11 illustrate exemplary flowcharts of the processes and operations that may be carried out by an operator to develop a bending plan for manually-assisted bending operations that do not require robot motion or grasping information. FIG. 10 illustrates an example of the logic flow associated with such operations when no constraints are entered by an operator, and FIG. 11 illustrates another example for a similar situation but with operator-entered constraints on the bending plan.

As shown in FIG. 10, after initializing server module 32 and the applications at step S.168, the bend model of the part may be developed or imported at step S.172. The bend model of the part may be developed within the intelligent manufacturing system operating environment and the bend model may include a 3-D representation of the part, such as that shown in FIG. 12. Then, at step S.176, an operator may select which expert modules are to be executed. The selection of the expert modules may be achieved by editing a configuration or environment file, or through the use of a graphical user interface that assists the operator in selecting and indicating which expert modules are to be active. Based on the expert modules that have been selected, an FEL message may be sent to the expert planning system to indicate which expert modules are active. A more detailed discussion of the manner in which the expert modules may be selected and indicated to the expert planning system is provided below.

If an operator wishes to develop a bending plan for a non-robotic workstation, an operator may selectively indicate which experts are to be active (e.g., planning expert 72 and tooling expert 80) and which experts should be inactive (e.g., grasping expert 82 and motion expert 84) so that only the required information is generated by the expert planning system 70. Further, for both robotic and non-robotic applications, if an operator only wishes for the expert planning system to generate specific information (e.g., bend sequence or tooling information), then the specific expert modules that need to be active may be selected by the operator. The status of the expert modules may then be sent to the expert planning system when it is selected and activated by an operator at step S.178. The selection and activation of the expert planning system may be achieved by entering an appropriate action command (e.g., "Dr. ABE") or selecting an appropriate icon (e.g., a man with a hat) within the intelligent manufacturing system window display, as discussed above with reference to FIG. 12.

After the expert planning system has been selected, an operator may run or execute the selected expert modules at step S.182 by, for example, double clicking on the "START" command key of the expert planning system window display (see, for example, FIG. 13). During execution of the selected expert modules, information may be provided to the operator (e.g., including the current run time of the execution and the status of each of the selected expert modules). Based on the status information, an operator may determine to stop, restart or abort the execution of the expert module by selecting the appropriate keys on the window display (e.g., function keys "STOP", "RESTART" and "ABORT"). These function keys may be selected by an operator whenever the expert planning system is executed.

At step S.186, an operator may review the results of the expert planning system when it is indicated that all of the selected expert modules have completed execution. As described above, an operator may display a bend sequence window or tool stage layout window (see, for example, FIGS. 15 and 16) to view the bend sequence and/or tooling determined by the expert planning system. In addition, a simulation of the bending plan (without robot motion or handling of the sheet metal material) may also be activated and provided to the operator in a similar manner to that described above with respect to FIG. 17. In such a case, the robot arm and gripper may be eliminated from the 3-D screen simulation in FIG. 17, and the movements and position of the workpiece relative to the press brake may be indicated by floating the workpiece in free space or by showing handling of the workpiece by a 3-D representation of a human operator. After reviewing the results, the operator may determine at step S.190 whether to save the results or to cancel the same. If the operator determines to save the results, the "Update" function key may be selected so that the database 30 is updated and the bending plan information is stored with the related bend model file at step S.194. Thereafter, the bending plan and required bending operations may be executed at step S.196 by the operator at the workstation by downloading the bending plan information from database 30 or by distributing a printed job/work setup sheet to the workstation(s).

If the operator determines that the results are not satisfactory, then at step S.192 the results may be cancelled by selecting the "CANCEL" function key from the expert planning system window display, and the operator may then enter new constraints or modify the previously used constraints before reexecuting the selected expert modules at step S.182. Successive runs of the expert modules may be performed by an operator until a satisfactory bending plan is produced by the expert planning system. Once again, the various display screens of the present invention may be utilized by the operator to verify and confirm the bend sequence, tooling, etc. selected by the expert planning system.

FIG. 11 is an exemplary flowchart of the processes and operations that may be performed for developing a bending plan for a non-robotic workstation based on one or more constraints entered by an operator. Similar to the processes discussed above, the server module 32 and system applications may be initialized at step S.200 and then a bend model of the part may be developed or imported into the database 30 at step S.204 through, for example, the various features of the intelligent manufacturing system. At step S.208, the status of the various expert modules may be selected by an operator based on the machinery and bending operations to be performed at the workstation. For example, if a human operated press brake is provided at bending workstation 18, then the various expert modules relating to robot motion planning (e.g., holding/grasping expert 82 and motion expert 84) may be deactivated or unselected, and the other expert modules required for developing a bending plan (e.g., planning expert 72 and tooling expert 80) may be activated or selected by an operator. Due to the open architecture and modular design of expert planning system 70, an operator may be provided with the flexibility to adapt and modify the expert planning system to particular applications and bending environments. The selection of expert modules may be conveyed to the expert planning system by using FEL commands, as described in greater detail below.

After selecting the expert modules, one or more constraints may be entered, at step S.212, by the operator to constrain the expert planning system. These constraints may be based on a complete bend sequence entered by an operator or a partial bend sequence or constraints relating to one or more bends or group of bends. A bend sequence input window, such as that shown in FIG. 15, may be provided to assist an operator in entering such bend constraints. In addition, such bend sequence constraints may be entered directly through the expert planning system window display, as discussed above. In addition to entering bend related constraints, an operator may also enter tooling constraints by selecting particular tools to be used in the bending operation. The entry and selection of such tooling constraints may be performed through a tooling dialog window, such as that shown in FIG. 19, that is accessible by selecting an icon or entering an action command from within the intelligent manufacturing system window display.

As shown in FIG. 19, the tooling dialog window display may include icons representing tool types (e.g., dies, die holders, punches, punch holders and rails) as well as icons representing tool shapes that are related to a tool type selected by an operator. These icons may be successively displayed, with a table of available tools being ultimately displayed based on the operator's selection of a tool type and tool shape. In the example of FIG. 19, a "Punch" icon has been selected as a tool type, which in turn caused a plurality of tool type icons to be displayed on the screen that represent various punch tool types. Based on the selection of a "Sash Punch" icon by the operator, a resultant table of available sash punch tools are displayed in the lower information window. In the illustrated embodiment of FIG. 19, sectionalized tools (i.e., tools from an available tool library that relate to the selected tool type and that are manufactured in sections of different sizes so as to facilitate multiple tool stage layouts on a press brake) may be displayed in order to facilitate the selection of a tool. The tool may then be selected by highlighting or double clicking on the part listed in the table. Cross-sectional front and back views of the tool may also be displayed in the tooling dialog window, as shown in FIG. 19, in order to facilitate the selection of a tool constraint by the operator. An "Auto Selection" feature may also be provided in the tooling dialog window, to cause the number of tools displayed or listed in the displayed table to be automatically selected and limited based on the thickness of the part and the inside radius of the bend(s) to be performed.

Figure 20:
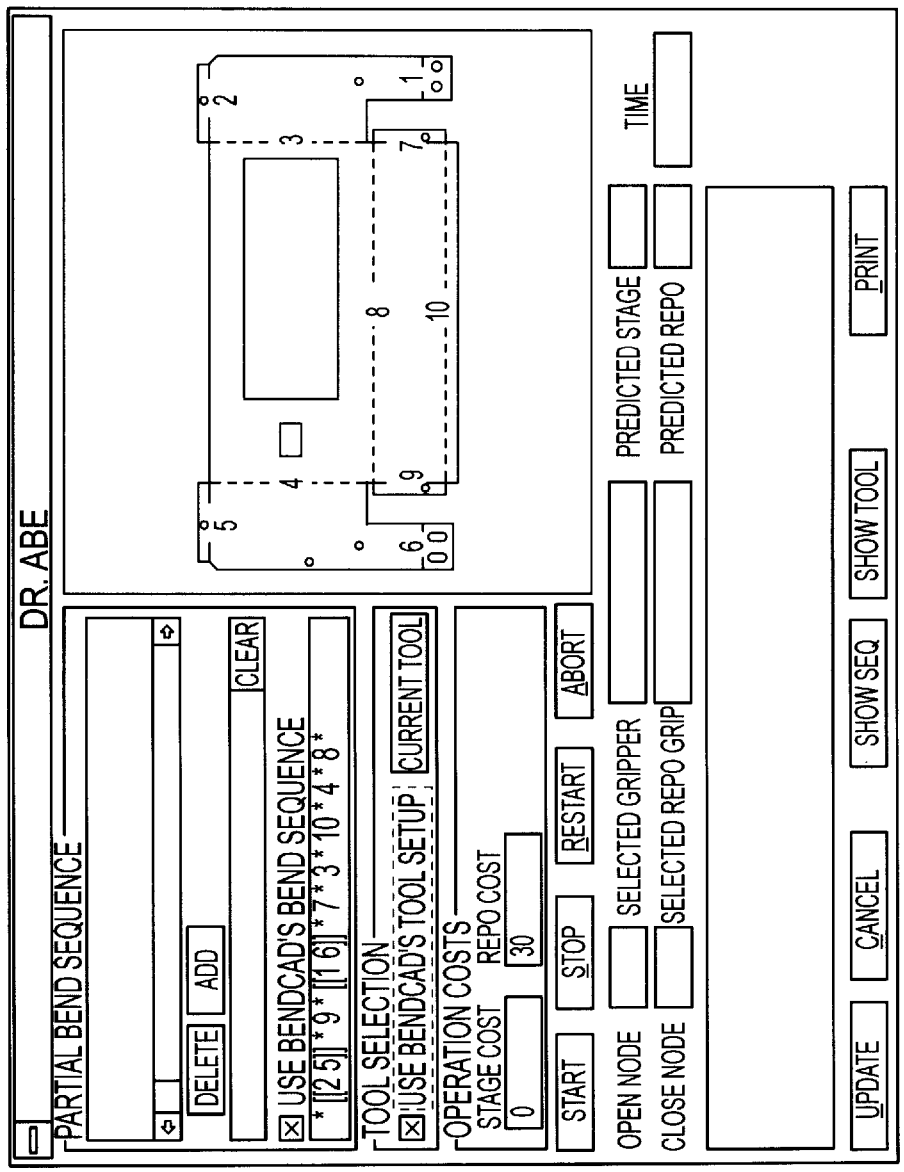
FIG. 20 is another example of an expert planning system window display, wherein the bend sequence and tool selection constraints have been selected and an "X" has been displayed to confirm these selections.

After selecting or entering the appropriate constraints, the expert planning system may be selected and activated by entering the appropriate function command (e.g., "Dr. ABE") or tool icon (e.g., a man with a hat) from the intelligent manufacturing system window display (see, for example, FIG. 12). When the expert planning system is selected at step S.216, the constraint phrase(s) may be developed by a constraint manager, as indicated above. The constraint phrase(s) relating to the bend sequence entered by the operator and/or the tooling constraint(s) selected by the operator may be transferred to the expert planning system or provided within a configuration or setup file to be read by the expert planning system when it is executed. It is preferred, however, that bend constraints be conveyed by constraint phrases and that tooling constraints being conveyed by tooling data indicating what tools have been selected. As discussed above, the expert planning system window display may indicate to the operator the constraint(s) that have been entered. An operator may modify and/or select the generated constraint phrase at step S.220 by entering an appropriate command or double clicking on the information. For example, as shown in FIG. 20, the bend sequence and tool selection constraints have been selected and an "X" has been displayed to confirm these selections (see, e.g., the "X" provided next to the window labeled "Use BendCAD's Bend Sequence" and the "XI" provided next to the window labeled "Use BendCAD's Tool SetUp").

Thereafter, the selected expert modules may be executed at step S.224 by pressing or selecting, for example, the "START" command of the expert planning system window display. The selected expert modules, such as planning expert 72 and tooling expert 80, will then develop a final bending plan based on the bend sequence and tool constraints entered by the user. As indicated above, the expert planning system window display may provide real time information to an operator to indicate the status of the selected expert modules and the run time of the operation. When the selected expert modules have completed execution, an indication may be provided to the operator that the planning has been completed (e.g., a message such as "Planning succeeded" may be provided) and an operator may view the results at step S.228. If no solution was found or a run time error was incurred, messages may also be displayed back to the operator to indicate the same. In addition, by monitoring the various status information provided in the window display, the operator may determine to stop, restart or abort the execution of the expert modules, as discussed above.

The results of a successful planning run may be viewed by an operator at step S.228 by selecting, for example, the "Show Seq" or "Show Tool" command buttons on the window display (see, e.g., FIG. 20) to view the proposed bend sequence and tool stage layout of the bending plan. In addition, simulation of the bending plan (without robot motion) may also be activated and provided to the operator in a similar manner to that described above with respect to FIG. 17. Once again, the robot arm and gripper may be eliminated from the 3-D screen simulation in FIG. 17, and the movements and position of the workpiece relative to the press brake may be indicated by floating the workpiece in free space or by showing handling of the workpiece by a 3-D representation of a human operator.

If an operator determines to save the results at step S.232, then the final bending plan determined by the expert planning system may be saved to the database at step S.236 by selecting, for example, the "Update" function button on the window display. Thereafter, as described above, at step S.240, the final bending plan may be executed at the bending workstation 18.

If an operator does not decide to save the results at step S.232, then at step S.234 the results may be cancelled and an operator may modify the constraints and/or enter new constraint information before reexecuting the expert planning system at step S.224. It is also possible at step S.234 to permit an operator to modify the selection of the expert modules to be executed so that more satisfactory results may be provided.

Figure 21:
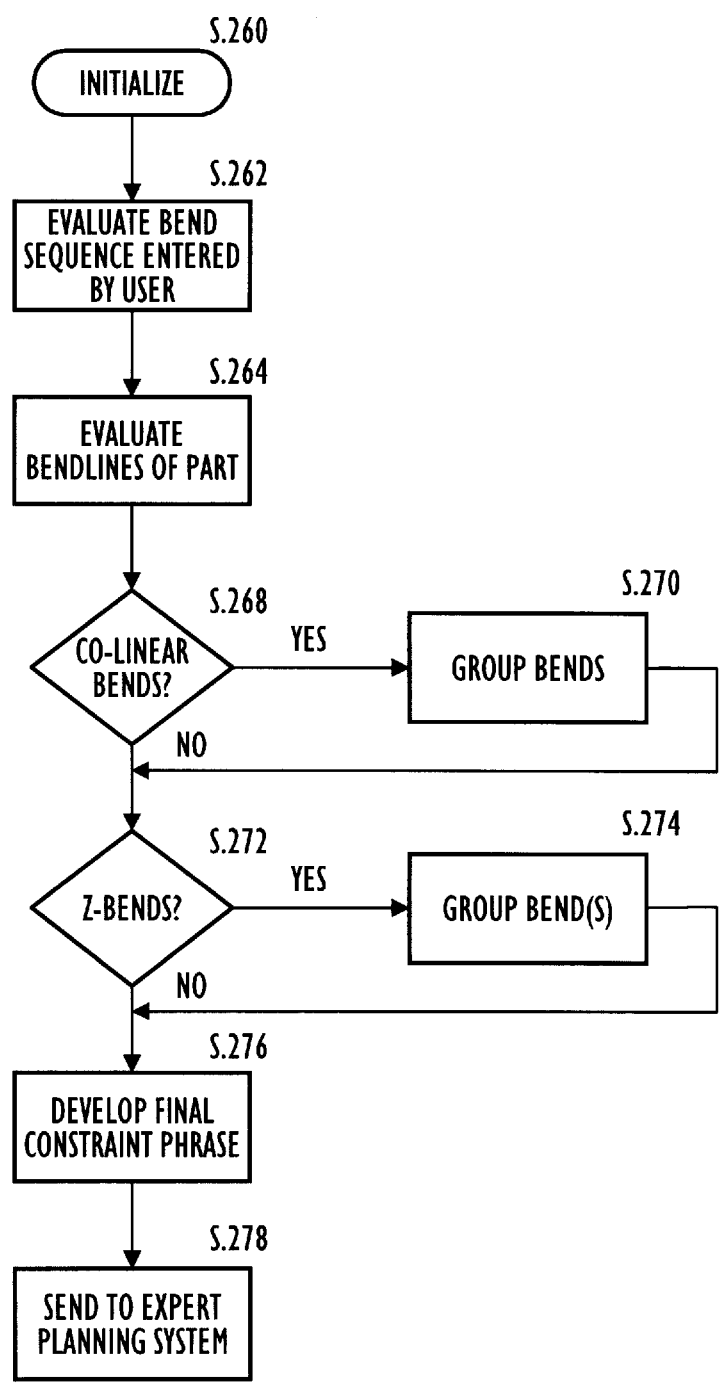
FIG. 21 illustrates, in accordance with an aspect of the present invention, the various processes and operations that may be formed by a constraint manager when developing a constraint phrase based on a constraint entered by an operator.

Referring now to FIGS. 21–23, various features and aspects related to the processes and operations that may be performed for generating the constraint phrases based on constraints entered by an operator will be provided. As noted above, a constraint manager may be provided in order to generate constraint phrases based on constraints entered by an operator. The constraint manager may also resolve conflicts between constraints, and may be responsible for providing various constraint information to the expert modules of the expert planning system. The constraint manager may be implemented as an independent, executable application or module within server module 32, or may be implemented as a sub-system or sub-module within the intelligent manufacturing system 60 or the expert planning system 70. The operations and processes of the constraint manager described below may be implemented through software by using a high level programming language, such as C++.

As shown in FIG. 21, the constraint manager may be initialized at step S.260 whenever the expert planning system is selected and activated by an operator. Alternatively, the initialization of the constraint manager may be performed whenever constraints are entered by an operator, either within the intelligent manufacturing system 60 or the expert planning system 70. For purposes of illustration, the embodiment of FIG. 21 indicates various steps and procedures that may be performed to develop constraint phrase based on a bend sequence entered by an operator from within the intelligent manufacturing system operation environment. However, constraint phrases may be developed for other constraints, such as tooling constraints. Such tooling constraint phrases may indicate tool selection and/or tool stage layout constraints entered by a human operator.

After selecting and entering the bend sequence, and activating the expert planning system, the constraint manager may be initialized at step S.260, and the bend sequence entered by the user may be evaluated at step S.262.

Figures 23A, 23B:
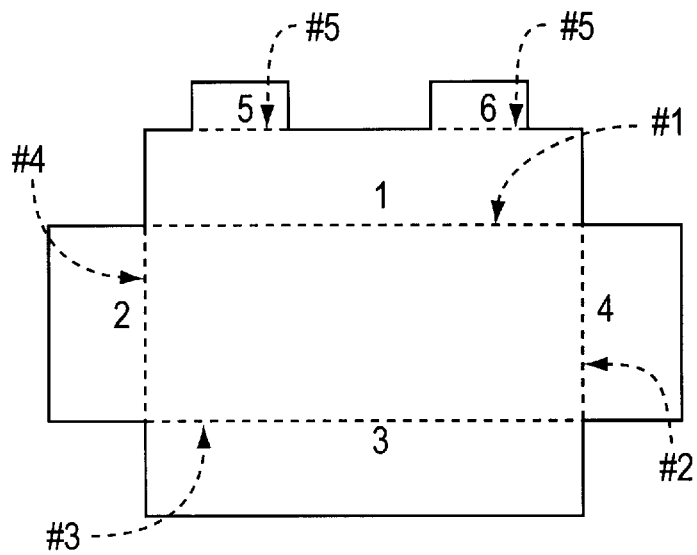
FIG. 23A illustrates an exemplary 2-D representation of a sheet metal part with bend identification numbers and bend sequence numbers.
FIG. 23B illustrates a bend sequence table, based on the exemplary part of FIG. 23A, that includes the identification number (ID1) of each bend and number (SEQ1) based on the number (SEQ1) based on the sequence entered by the operator.

As noted above, bend identification numbers may be associated with each of the bendlines of the part to identify each bend within the sequence. A bend sequence number may also be provided that is associated with each bend identification number based on the bend sequence entered by an operator. Assume, for example, that a multi-sided part such as that illustrated in FIG. 23A is provided with bend identification numbers 1, 2, 3, 4, 5 and 6. Through a graphical user interface or other appropriate means, an operator may indicate a desired bend sequence to be used as a constraint on the expert planning system. For example, a bend sequence input window such as that illustrated in FIG. 15 may be provided to permit an operator to enter a bend sequence. Such a bend sequence input window may include a 2-D representation of the part and the bendlines of the part. An operator may enter a desired bend sequence by selecting or highlighting each bendline (e.g., by double clicking with a mouse device) in the order of the desired bend sequence. Such an interface may also permit an operator to group bends together (such as co-linear bends), so that they are performed during the same bend operation.

In the illustrated embodiment of FIG. 23A, bend 1 is to be performed first, bend 2 is to be performed last, bend 3 is to be performed third, bend 4 is to be performed forth, and bends 5 and 6 are grouped together and are to be performed last. A bend sequence table such as that illustrated in FIG. 23B may be developed and provided so that the constraint manager may evaluate the bend sequence entered by the operator. The exemplary table of FIG. 23B includes the identification number (ID1) of each bend and its associated bend sequence number (SEQ1) based on the sequence entered by the operator. Such a table may be stored in memory, such as database 30, and may be associated with the bend model file of the part.

Based on the bend sequence entered by the user, the constraint manager may develop an initial constraint phrase at step S.262 by inserting an asterisk operator "*" between each bend identification number within the sequence. If bends within the sequence are grouped, then the related bend identification numbers may be grouped by using, for example, parenthesis and no asterisk operator "*" may be placed between the group bend identification numbers. As discussed above, the operator "*" may act as a wild card and allow either no bend operations or any number of bend operations to be performed at its location in the bend sequence, and the type of bend operations which may be performed at its location can be among any of the remaining bend operations not specified in the constraint statement. The operator "*" may also act as a wild card to permit any required repositioning of the robot or workpiece to be performed at the location of the "*" in the phrase. That is, if all of the bends are indicated within the constraint phrase, then the operator "*" may indicate that any required repositioning may be performed at its location. For the example illustrated in FIG. 23A, if bends 5 and 6 were not grouped by an operator and, instead, were indicated as being performed as the fifth and sixth bend operations within the sequence, then the constraint manager may generate an initial constraint phrase according to the following:

*1*4*3*2*5*6*.

The above initial constraint phrase indicates that bend 1 should be performed first, bend 4 should be performed second, bend 3 should be performed third, bend 2 should be performed fourth, bend 5 should be performed fifth, and bend 6 is to be performed last within the sequence. The initial constraint phrase also indicates, by inclusion of the operator "*", that repositioning or other operations may be performed between each of the bending operations or before the first bending operation or after the last bending operation. If the bend sequence that was entered by the operator includes bends that are grouped together (e.g., in the example of FIG. 23A, bends 5 and 6 may be grouped and defined with the same bend identification number 5), then any such bends may be grouped within the initial constraint phrase generated by the constraint manager by using parentheses or brackets.

In accordance with an aspect of the invention, the constraint manager may also evaluate the geometry of the part and the bendlines at step S.264 in order to further refine the constraint phrase according to one or more bend heuristics. For example, the constraint manager may analyze the various bendlines to locate co-linear bends and Z-bends, and to group such co-linear and/or Z-bends so that they are performed together. Co-linear bends relate to bends which lie along the same axis and which may be performed simultaneously during a bending operation. Z-bends relate to closely spaced bends that cannot be individually performed and that require a special set of Z-bend punch and die tools to perform the Z-bend operation. If co-linear bends or Z-bends are detected by the constraint manager, the associated bends may be grouped together and indicated as such within the constraint phrase by using, for example, parentheses or brackets.

Figure 22A:
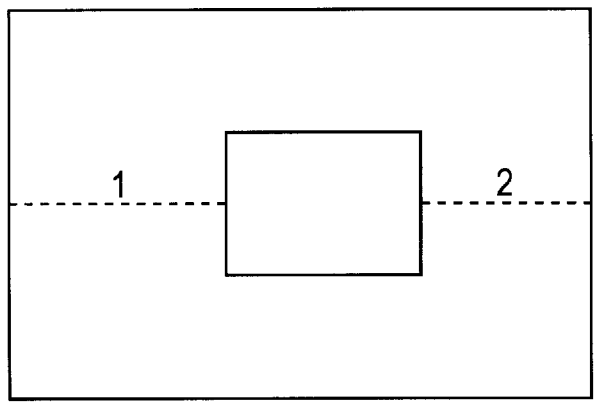
FIGS. 22A and 22B illustrate examples of co-linear bends.
Figure 22B:
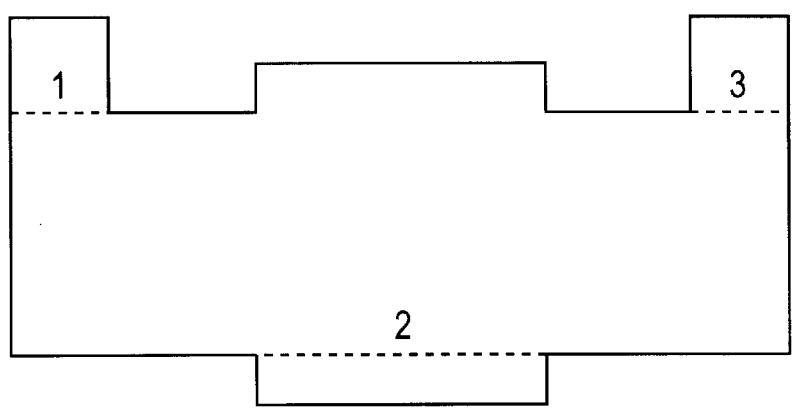

At step S.268, the constraint manager may check for co-linear bends in the part. Co-linear bends may be indicated in the part geometry or topology information within the bend model file or constraint manager may identify bendlines as relating to co-linear bends based on the existence of one or more bendlines along one common axis or line. They may also be indicated based on the bend sequence entered by an operator (e.g., one or more bend identification numbers having the same bend sequence number). For example, FIGS. 22A and 22B illustrate examples of co-linear bends. In FIG. 22A, bends 1 and 2 may be identified as co-linear bends, whereas in FIG. 22B bends 1 and 3 may be depicted as co-linear bends. If co-linear bends are detected, and these bends were not already grouped by an operator when the bend sequence was entered, then at step S.270 the bends may be grouped together by modifying the initial constraint phrase and grouping the bends with, for example, parentheses. In the embodiment of FIG. 23A, bends 5 and 6 are provided as co-linear bends. Thus, these bends may be grouped by modifying the initial constraint phrase as follows:

*1*4*3*2*((5 6)) *.

Figure 22C:
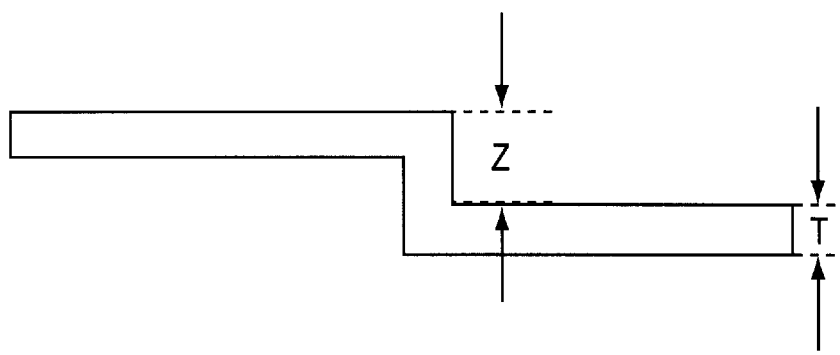
FIG. 22C illustrates an example of a Z-bend.

Thereafter, at step S.272, the constraint manager may analyze the bendlines and geometry of the part to detect the presence of any Z-bends. If any Z-bends are present, and these bends were not already grouped by an operator when the bend sequence was entered, then at step S.274, the bendlines associated with each Z-bend may be grouped by, for example, parentheses. FIG. 22C illustrates an exemplary Z-bend. The presence of a Z-bend may be determined at step S.272 based on the height of the Z-bend (Z), the thickness of the sheet metal part (T) and a predetermined coefficient (N). The coefficient N may be defined by a customer, and relates to the available types of Z-bend tools and the capabilities of the machinery at the facility 38. The presence of Z-bends may be detected based on the relationship of Z to N and T. The following equation may be utilized by the constraint manager to determine when Z-bends are present:

$Z \leq N \times T$.

When $Z \leq N \times T$, then the bendlines may be grouped together to signify a Z-bend, and if $Z \geq N \times T$, no Z-bend operation is required and the bends are not grouped. Once again, parentheses may be used to group the bends by the constraint manager and any extra "*" operators that exist between the grouped bends may be eliminated. The detection of the bends may also be carried out by analyzing the bend model file of the part, which may include feature relation data between the various bends in the part, indicating which bends are Z bends.

After performing steps S.268–S.274, the constraint manager may develop a final constraint phrase at step S.276. The final constraint phrase may then be saved in a file or sent to the expert planning system at step S.278 when the expert planning system is executed. As discussed below, FEL commands may be used to indicate to the expert planning system the constraints and constraint phrases to be utilized when developing a bending plan.

The bend identification numbers that are utilized to identify the different bends in the part should be consistent in both the intelligent manufacturing system and the expert planning system. If the intelligent manufacturing system application and the expert planning system application are developed on a similar platform, such as a PC-based Windows application environment, then a common convention may be used for storing the part information in the bend model file and for assigning the bend identification numbers to the various bendlines in the part. As a result, the bend identification numbers within the constraint phrase or phrases that are passed between the intelligent manufacturing system and the expert planning system may be properly and consistently interpreted by each of the systems. If, however, different platforms are used for implementing the intelligent manufacturing system and the expert planning system (e.g., a Windows-based application versus a Unix-based application), or if different conventions are used for storing the part design information and assigning the bend identification numbers, then it is possible that the bend identification numbers may be improperly interpreted with respect to the part when the constraint phrases are passed between the intelligent manufacturing system and the expert planning system. For example, if one of the systems (such as the intelligent manufacturing system) stores and analyzes the part design information according to data arrays and tables, and the other system (such as the expert planning system) stores and analyzes the part design information based on pointers and linked lists, then it is possible that such systems will assign different bend identification numbers to the bendlines of the part. If such differences are present, then one or more additional tables may be provided to assist the constraint manager in developing a constraint phrase that may be properly utilized by, for example, the expert planning system. In addition, or in the alternative, an intermediate data file representing the part (such an ASCII based file) may be utilized to convert bend identification numbers from one system to that of another.

Figures 23C, 23D:
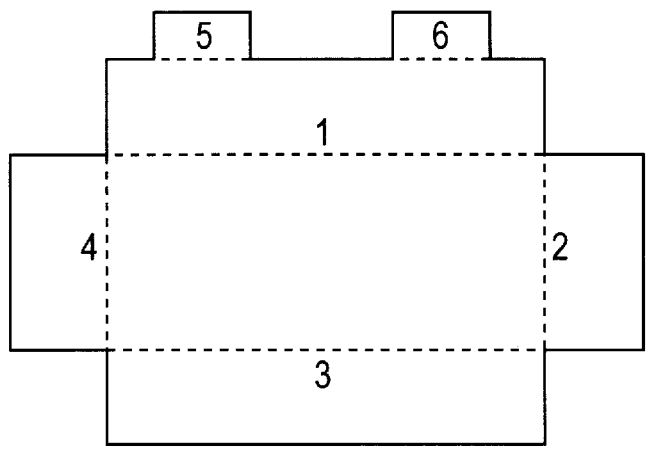
FIG. 23C illustrates another exemplary 2-D representation of a sheet metal part with bend identification numbers, wherein the bend identification numbers have been assigned by a different convention than that in FIG. 23A.
FIG. 23D illustrates an exemplary table that may be provided to translate or associate the first set of bend identification numbers (ID1) used in FIG. 23A with the second set of bend identification numbers (ID2) utilized in FIG. 23C.
Figure 23E:
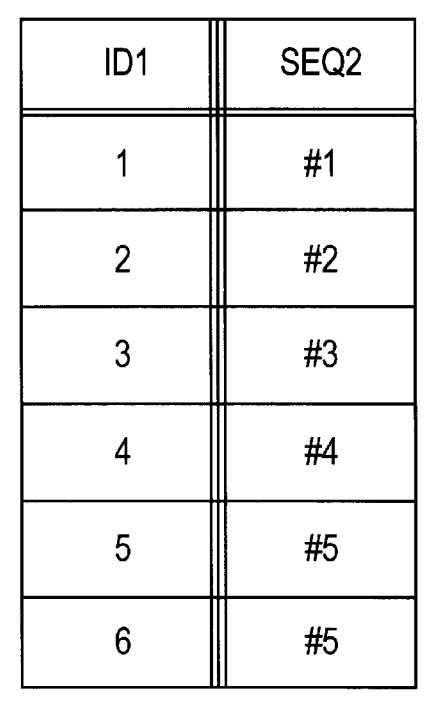

If, for example, the expert planning system utilizes a bend identification number representation or convention such as that shown in FIG. 23C for the same part shown in FIG. 23A that was generated by the intelligent manufacturing system, then tables such as that shown in FIGS. 23D and 23E may be utilized to develop a final constraint phrase for the expert planning system. The table in FIG. 23D is provided to translate or associate the first set of bend identification numbers (ID1) used in FIG. 23A with the second set of bend identification numbers (ID2) utilized in FIG. 23C. Such a matching identification table may be utilized to match or translate the bend identification numbers used, for example, in the intelligent manufacturing system to that used, for example, in the expert planning system. Based on the table in FIG. 23D and the sequence table provided in FIG. 23B, a final bend sequence table may be developed by the constraint manager, such as that shown in FIG. 23E. The table of FIG. 23E may be used to indicate the bend sequence entered by the operator in accordance with the bend identification number system utilized in FIG. 23C (e.g., that used by the expert planning system). With such tables, the constraint manager may generate the final translated constraint phrase for the exemplary part illustrated in the drawings:

*1*2*3*4*((5 6)) *.

The above-noted tables may also be used by the constraint manager or intelligent manufacturing system when interpreting bending plan information from the expert planning system that includes bend identification numbers that are assigned to the part based on a different assignment scheme or convention.

As discussed above, FEL messages may be used to transfer information between the intelligent manufacturing system and the expert planning system. These messages may indicate when all of the expert modules are to be executed, or when only selected expert modules are to be executed within the expert planning system. In addition, these messages may indicate the various constraint information phrases to be utilized during the development of the bending plan. Sockets may be used to pass messages and information between various modules and system applications. If the intelligent manufacturing system 60 and the expert planning system 70 are developed as PC-based Windows applications, then a Windows-based socket, such as Winsock Version 1.1 from Microsoft, may be utilized to pass messages between each system application based on a predetermined protocol (e.g., Internet Protocol (IP)). The FEL messages may also be sent from the various station modules to the server module along communications network 26 by using any of a number of appropriate protocols, including Ethernet Protocol and TCP/IP.

After the final bending plan has been generated by the expert planning system, FEL messages may also be used to send back the final bending plan information to the intelligent manufacturing system. The FEL messages may be interpreted by an interface module or the intelligent manufacturing system and the resultant bending plan information may be stripped or filtered from the FEL messages so that such information may be stored with the other information in the bend model file or in separate files.

The above-noted operations, which are discussed in greater detail below, may be handled by an interface module provided at server module 32. This interface module may be responsible for sending the appropriate FEL messages to the expert planning system 70 when it is initialized, and may also be responsible for interpreting the FEL messages that are sent back from the expert planning system to the intelligent manufacturing system 60. The interface module may be implemented as a separate executable application within server module 32 that cooperates and facilitates the transfer of messages between the intelligent manufacturing system application 60 and the expert planning system application 70, or such an interface module may be implemented as a sub-system or sub-module in the intelligent manufacturing system and/or the expert planning system. A high level programming language such as C++ may be utilized to implement the interface and the various processes and operations discussed below for handling and transferring the FEL commands.

manufacturing system or interface module. FEL messages may be sent to indicate the filename of the bend model of the part, as well as the filenames of the tool library and/or gripper library which contain information regarding the available tools and robot grippers for a particular workstation. The filenames of a machine data file and/or robot data file may also be provided which include data regarding the geometry and layout of the bending machinery and/or robot machinery at the workstation. The machine data file may also include setup data indicating the current or most previous setup of the bending machinery. Each of the above-noted files may be stored within, for example, database 30 or within a local storage device provided at server module 32.

Various FEL commands and messages may be used to transfer the data filenames to the expert planning system. These messages may include a setting portion, such as that discussed above with respect to FIG. 24, with a "TYPE PARAMS" FEL command. By way of a non-limiting example, the following FEL messages may be sent from the interface module or intelligent manufacturing system (i.e., "FROM INTERACTING") to the expert planning system (i.e., "TO PLANNING") to transfer the various filenames of the part (see "FILENAME"), tooling library (see "TOOLING_DATABASE"), gripper library (see "GRIPPER_DATABASE"), machine database (see "MACHINE_DATABASE"), and machine setup database (see "SETUP_DATABASE"):

```
(SET ((TYPEMESSAGE) (FROM INTERACTING) (TO PLANNING) (STATE
REQUEST))
    ((TYPE PARAMS)
    (FILENAME "c:\PC_ABE\BIN\FILE1")))
(SET ((TYPE MESSAGE) (FROM INTERACTING) (TO PLANNING) (STATE
REQUEST))
    ((TYPE PARAMS)
    (TOOLING_DATABASE "c:\pc_abe\database\tool.fel")))
(SET ((TYPE MESSAGE) (FROM INTERACTING) (TO PLANNING) (STATE
REQUEST))
    ((TYPE PARAMS)
    (GRIPPER_DATABASE "c:\pc_abe\database\grip.fel")))
(SET ((TYPE MESSAGE) (FROM INTERACTING) (TO PLANNING) (STATE
REQUEST))
    ((TYPE PARAMS)
    (MACHINE_DATABASE
"c:\pc_abe\database\machine_database.fbd3.fel")))
(SET ((TYPE MESSAGE) (FROM INTERACTING) (TO PLANNING) (STATE
REQUEST))
    ((TYPE PARAMS)
    (SETUP_DATABASE"c:\pc_abe\database\cursetup.fel")))
```

When the expert planning system application 70 is selected and activated by an operator, a series of FEL messages are sent to the expert planning system to initialize the same and to provide various information. When the expert modules of the expert planning system are to be utilized to generate a bending plan for a bending workstation, a plurality of parameters and data filenames may be sent to the expert planning system by the intelligent In addition, a "TYPE PART" FEL command may be used to indicate the type of bend model data file that is stored in memory. In this regard, an exemplary FEL message, such as that provided below, may be sent from the intelligent manufacturing system 60 (or interface module) to the expert planning system 70:

```
(PLAN ((TYPE MESSAGE) (FROM INTERACTING) (TO PLANNING) (STATE
REQUEST))
    ((TYPE PART)
    (MODEL "c:\pc_abe\bin  file1.pgf")))
```

As noted above, the FEL messages may also be sent to expert planning system 70 in order to initialize and set various parameters and/or variables. An FEL message such as "TYPE PARAMS" may be used to set or initialize various costs, including the repositioning cost ("REPO_COST") and the stage time cost ("STAGE_TIME_COST"). By way of a non-limiting example, the various FEL commands may be sent from the intelligent manufacturing system or interface module to the expert planning system to set various parameters and/or variables:

```
(SET ((TYPE MESSAGE) (FROM INTERACTING) (TO PLANNING) (STATE
REQUEST))
    ((TYPE PARAMS)
    (REPO_COST 30)
    (UNLOADING_COST 0)
    (UNLOADING_GRASP_FACE 0)))
(SET ((TYPE MESSAGE) (FROM INTERACTING) (TO PLANNING) (STATE
REQUEST))
    ((TYPE PARAMS)
    (STAGE_TIME_COST 0)
    (NO_UNLOAD_COST 0)
    (TOOLING NOT SPACE AVAIL_COST 0)))
(SET ((TYPE MESSAGE) (FROM INTERACTING) (TO PLANNING) (STATE
REQUEST))
    ((TYPE PARAMS)
    (QUANTITY 0))).
```

After sending the various FEL commands and messages to the expert planning system 70, any constraints that have been entered by the operator and which have been developed into constraint phrases by, for example, the constraint manager, may then be sent to the expert planning system. As discussed above, these constraints may be based on various constraints entered by an operator, including a bend sequence and tooling selection. Constraint phrases that have been developed based on a bend sequence or a partial bend sequence may be developed into a constraint phrase which is sent to the expert planning system by using FEL commands such as "TYPE OPTIONS" and "CONSTRAINTS". Further, any tooling constraints that have been set by the operator may be stored within the tool library or data file, the filename of which may be sent to the expert planning system by use of the "TYPE PARAMS" and "TOOLING_DATABASE" FEL messages, as described above. By way of a non-limiting example, the following FEL message may be sent to the expert planning system 70 by the intelligent manufacturing system 60 (or interface module) to indicate exemplary constraints that have been set by an operator:

urther examples of the various FEL messages that may be sent to the expert planning system 70 when it is initialized and executed are provided in Appendices A and B. Appendix A illustrates examples of the various FEL messages that may be sent when executing the expert planning system to develop a bending plan for a robot-based workstation in accordance with constraints set by an operator. Appendix B, on the other hand, illustrates example of the various FEL messages that may be sent to the expert planning system 70 when developing a bending plan for a robot-based workstation with no constraints entered by an operator.

As indicated above, the present invention permits an operator to selectively activate and deactivate the various expert modules in expert planning system 70 in order to accommodate various bending applications. In such a case, an operator may also select and indicate various bending constraints to be utilized by the selected or activated expert modules when developing the bending plan, as discussed above. The various FEL messages to be sent from the intelligent manufacturing system 60 (or the interface module) to the expert planning system 70 when particular expert modules have been activated is similar to that described above for the case in which all of the expert modules are utilized to develop a complete bending plan for a robot-based workstation. However, when particular expert modules are activated, and others are deactivated by an

```
(SET ((TYPE MESSAGE) (FROM INTERACTING) (TO PLANNING) (STATE
REQUEST))
    ((TYPE OPTIONS)
    (CONSTRAINTS (((*1*2) ((6 1)*2) (*1*2) (9*2) (*1*2) ((5
2)*2) (*1*2) (7*2) (*1*2) (3*2) (*1*2) (4*2) (*1*2) (10*2)
(*1*2) (8*2) (*1*2)))))).
```

The operators in the constraint phrases that are sent to the expert planning system 70 may be substituted or represented by other characters. For example, the operator "*" may be represented by, for example, a "-" character (such as in the example of Appendix A) or another appropriate character in the actual constraint phrase t hat is sent t o the expert planning system 70. When developing the bending plan, the various expert modules of the expert planning system 70 will use such constraint phrases and any tooling constraints when proposing and setting each of the bending plan parameters.

operator, different FEL messages may be sent to the expert planning system to indicate which expert modules are selected and active.

For example, an FEL command such as "TYPE EXPERTS" may be used to initialize the appropriate expert modules within the expert planning system. For example, the following command may be sent to the expert planning system 70 from the intelligent manufacturing system 60 (or interface module) to set and activate tooling expert 80, grasping expert 82 and motion expert 84 for developing the bending plan:

```
(SET ((TYPE EXPERTS)
      (EXPERTS (GRASPING MOVING TOOLING)))).
```

In contrast, for non-robotic based bending applications, an operator may deactivate the expert modules relating to robot motion and repositioning planning so that the following FEL message would be sent to the expert planning system 70:

```
(SET ((TYPE EXPERTS)
      (EXPERTS (TOOLING)))).
```

The FEL message would indicate to the expert planning system 70 and the planning expert 72 that only tooling expert module 80 is activate. Since planning expert 72 is responsible for querying each of the expert modules as well as determining a bend sequence and finalizing the bending plan, it is preferred that planning expert 72 always be activated whenever executing the expert planning system 70. If an operator only wishes to receive proposed tooling information from the expert planning system, then other means may be used to restrict or limit bend sequence planning by planning expert 72. For example, as noted above, an operator may constrain or specify the bend sequence of the bending plan generated by the expert planning system by entering a desired bend sequence as a constraint.

The selected status of the expert modules may be saved within a configuration file that includes not only the status of each of the expert modules but also various filenames and parameter values. Appendix C illustrates an exemplary configuration file that contains information regarding the status of the expert modules. When the expert planning system is initialized or activated, the intelligent manufacturing system 60 (or the interface module) may read the configuration file and determine the selected status of the expert modules (e.g., "ExpGrasping", "ExpTooling", "ExpMoving", etc.) and the set values for the various parameters (e.g., REPO-COST and STAGE_COST). FEL messages, such as "TYPE EXPERTS" and "EXPERTS", may then be developed and sent to the expert planning system to indicate the status of the various expert modules. In addition, FEL commands such as "TYPE PARAMS" may be used to send messages to the expert planning system to indicate the values of various parameters, as discussed above. In the exemplary embodiment of Appendix C, the various states of the expert modules are indicated by either a status command "True" which represents that the module is active or by a status command "False" which indicates that the expert is not active. For non-robotic based applications, the grasping expert 82 and motion expert 84 should be set to "False" in the configuration by the operator since no robot motion planning is required.

As discussed above, the configuration file may be directly amended by the operator, or a graphical user interface may be provided to facilitate an operator in selecting the status of each of the expert modules and to thereby amend the configuration file. Such an interface may be implemented as a graphical user interface that is provided at server module 32 or any of the station modules provided at locations 10, 12, 14 . . . 20 throughout the facility 38. Such a graphical user interface may indicate to an operator the current settings or status of the expert modules (e.g., active or inactive) and may permit the operator to change the status based on a particular bending application (e.g., a robot-based or non-robot based bending operation). Further, information regarding various bend workstations at the facility 38 may be stored so that the status of each of the expert modules may be automatically set when an operator enters the workstation environment in which the bending plan is to be applied. A list of machine setups or workstation environments may also be provided to the operator so that the expert modules may be set based on the operator's selection of a particular working environment. Various other features and aspect may also be provided to facilitate setting of the expert modules.

In accordance with another aspect of the present invention, FEL messages may also be returned from the expert planning system to the intelligent manufacturing system after completing and finalizing the bending plan. The FEL messages that are sent back to the intelligent manufacturing system 60 include the final bending plan information which is generated by the active expert modules and based on the constraints (if any) entered by an operator. This bending plan information may include the bend sequence, tool selection, tool stage layout, robot motion, repositioning and backgauge settings. A BendMap set of data may also be provided by the expert planning system to indicate: the relationship between the stage layout and the bend sequence for each bend; the location of each stage for each bend; the position of bendlines relative to the tool stage (e.g., in terms of the distance from the left edge and/or right edge of the stage); robot gripper positions; and, robot location and orientation. The BendMap data may be utilized by the intelligent manufacturing system for various applications. For example, the BendMap data may be used for simulating the final bending plan through a graphical interface (such as that shown in FIG. 17) and for displaying bending plan information in the various interfaces that may be provided to the operator, as discussed above.

The FEL commands that are sent from the expert planning system 70 to the intelligent manufacturing system 60 may be interpreted by, for example, the interface module provided at server module 32. As discussed above, this interface module may be a separate executable application or may be provided within the intelligent manufacturing system application 60. Based on the FEL commands that are received, the interface module may interpret and strip out the final bending plan information and save the same in database 30. The FEL messages may include a "FINALIZE" message to indicate the final bending plan information. Additional FEL commands such as "BENDS", "LOADER_LOCATIONS", "ROBOT_LOC", "REPO_LOC", "BENDMAP", and "BGAGE_LOC" may be used to indicate the various final bending plan information. In addition, other FEL commands may be used to indicate the selection of tooling and grippers (for example, "ROBOT_GRIPPER" and "REPO_GRIPPER"). Appendix D illustrates an exemplary set of FEL messages that may be sent from the expert planning system to the intelligent manufacturing system when a final bending plan has been developed.

The final bending plan information that is sent to the intelligent manufacturing system 60 may be organized and saved into one or more files according to "category" type. These files may be saved in database 30 and sent to the bending workstation and other locations when executing the final bending plan. Depending on the machinery and components at the workstation(s), the files may include FEL commands and/or NC data for controlling the machinery and performing, for example, the bend operations according to the bending plan. For example, an "EVB" file which includes data relating to the bending machinery including backgauging settings and press brake operations may be developed and stored based on the final bending plan information. This data may be stored without X-gauging information. Appendix E is an exemplary "EVB" file, which includes NC data for controlling, for example, an Amada FBD press brake. Another file that may be saved is an "EVT" file which includes tool setup data, including backgauging data that is used to set the various tool stages in the press brake. The various processes and operations discussed in U.S. patent application Ser. No. 08/386,369 may be utilized to facilitate the setup of the tool stages by using and controlling the backgauges of the press brake. Appendix F is an exemplary "EVT" file, which includes NC data for controlling, for example, an Amada FBD press brake.

In addition, an "EVX" data file may be stored for carrying out a learning process to correct the robot motion. This data file may include the initial press brake movements and backgauging positions set in the final bending plan. Appendix G is an exemplary "EVX" file, which includes NC data for controlling, for example, an Amada FBD press brake. This data may later be adjusted to correct the robot motion by using X-gauging movement and material loading height information. In this regard, an "RB1" file may also be provided which includes robot orientations and motions relative to the workstation with X-gauging information. The "RB1" file may include FEL messages. Appendix H is an exemplary "RB1" file, which includes FEL messages for controlling a robot of an Amada BM100 workstation. The "EVX" and "RB1" files may be used together for providing the learning function process. "RB2" and "RB3" files may also be provided and generated based on the final bending plan information and the adjustments that were made to the data in the "EVX" file. That is, the "RB2" file may include data which defines all robot motion without X-gauging information, and the "RB3" file may be developed and stored so as to include all the adjustments to the "EVX" file after the learning functional process has been performed. The various features disclosed in U.S. patent application Ser. No. 08/386,369 may be provided for implementing a learning function in the present invention. The "RB2" file may include FEL messages. Appendix I is an exemplary "RB2" file, which includes FEL messages for controlling a robot of an Amada BM100 workstation.

Moreover, a "FIN" data file may be saved by the intelligent manufacturing system 60 to include all of the pertinent final bending plan information that was generated by the expert planning system 70. Such a file may include FEL messages and data similar to that contained within Appendix D. The resultant bending plan information that is saved by the intelligent manufacturing system may be sent or downloaded to the various workstations in order to execute the bending plan. As described above, this final bending plan information may be stored in database 30 along with the bend model file related to the part. Alternatively, these data files may be stored within a storage device of server module 32. In order to execute the final bending plan, the above-noted files may be sent to the controller and sequencer of the bend workstation to perform different tasks. These files may include FEL messages and commands, and/or NC data that are interpreted by the controller and sequencer of the workstation, so that the various components and machinery at the workstation may be operated in accordance with the final bending plan.

For example, the "EVT" file and other tooling information may be sent to the bending workstation over, for example, communications network 26, to set up necessary tooling for the press brake and/or workstation. The "EVX" and "RB1" files may be initially sent to the bending workstation to perform the above-noted learning function and to test and/or correct the various settings and motions determined by the expert planning system. After making the appropriate adjustments to the final bending plan parameters, the "EVB" and "RB3" files may be sent to the bending workstation to perform and execute the bending plan to produce the customer's part. The "RB3" file may also be sent during the initial stages of setup and testing in order to perform and execute robot motion without the workpiece material, and in order to check the robot motion determined by the expert planning system and to confirm that it is satisfactory.

While the invention has been described with reference to several illustrative embodiments, it is understood that the words which have been used herein are words of description, rather than words of limitation. Changes may be made within the purview of the appended claims, without departing from the scope and the spirit of the invention and its aspects. Although the invention has been described here in reference to particular means, materials, and embodiments, it is understood that the invention is not to be limited to the particulars disclosed herein, and that the invention extends to all equivalent structures, methods and uses such as are within the scope of the appended claims.

APPENDIX A

****************************************************************************

Copyright 1996 AmadaSoft America, Inc.

**************************************************************************** send msg size 119
send msg size 116
send msg size 114
send msg size 115
Read c:\PC_ABE\planning\config.fel
Read c:\PC_ABE\planning\exports.fel (SET ((TYPE MESSAGE) (FROM INTERACTING) (TO PLANNING) (STATE REQUEST))
    ((TYPE OPTIONS)
     (VERBOSE TRUE)
     (REPORT TRUE) ) )

(SET ((TYPE MESSAGE) (FROM INTERACTING) (TO PLANNING) (STATE REQUEST))
    ((TYPE PARAMS)
     (FILENAME "c:\pc_abe\bin\file1") ) )

(SET ((TYPE MESSAGE) (FROM INTERACTING) (TO PLANNING) (STATE REQUEST))
    ((TYPE PARAMS)
     (TOOLING_DATABASE "c:\pc_abe\database\tool.fel") ) )

(SET ((TYPE MESSAGE) (FROM INTERACTING) (TO PLANNING) (STATE REQUEST))
    ((TYPE PARAMS)
     (GRIPPER_DATABASE "c:\pc_abe\database\grip.fel") ) )

(SET ((TYPE MESSAGE) (FROM INTERACTING) (TO PLANNING) (STATE REQUEST))
    ((TYPE PARAMS)
     (MACHINE_DATABASE "c:\pc_abe\database\machine_database.fbd3.fel") ) )

(SET ((TYPE MESSAGE) (FROM INTERACTING) (TO PLANNING) (STATE

APPENDIX A

REQUEST))
    ((TYPE PARAMS)
    (SETUP_DATABASE "c:\pc_abe\database\cursetup.fel") ) )

(SET ((TYPE MESSAGE) (FROM INTERACTING) (TO PLANNING) (STATE REQUEST))
    ((TYPE OPTIONS)
    (CONSTRAINTS (((-1 -2) ((6 1) -2) (-1 -2) (9 -2) (-1 -2) ((5 2) -2) (-1 -2) (7 -2) (-1 -2) (3 -2) (-1 -2) (4 -2) (-1 -2) (10 -2) (-1 -2) (8 -2) (-1 -2)))) ) )

(SET ((TYPE MESSAGE) (FROM INTERACTING) (TO PLANNING) (STATE REQUEST))
    ((TYPE PARAMS)
    (REPO_COST 30)
    (UNLOADING_COST 0)
    (UNLOADING_GRASP_FACE 0) ) )

(SET ((TYPE MESSAGE) (FROM INTERACTING) (TO PLANNING) (STATE REQUEST))
    ((TYPE PARAMS)
    (STAGE_TIME_COST 0)
    (NO_UNLOAD_COST 0)
    (TOOLING_NOT_AVAIL_COST 0) ) )

(SET ((TYPE MESSAGE) (FROM INTERACTING) (TO PLANNING) (STATE REQUEST))
    ((TYPE PARAMS)
    (QUANTITY 0) ) )

(PLAN ((TYPE MESSAGE) (FROM INTERACTING) (TO PLANNING) (STATE REQUEST))
    ((TYPE PART)
    (MODEL "c:\pc_abe\bin\file1.pgf") ) )

APPENDIX B

```
****************************************************************
             Copyright 1996 AmadaSoft America, Inc.
**************************************************************** send msg size 119
send msg size 116
send msg size 114
send msg size 115
Read c:\PC_ABE\planning\config.fel
Read c:\PC_ABE\planning\exports.fel (SET  ((TYPE MESSAGE)  (FROM INTERACTING)  (TO PLANNING)  (STATE
REQUEST) )
     ((TYPE OPTIONS)
      (VERBOSE TRUE)
      (REPORT TRUE) ) )

(SET  ((TYPE MESSAGE)  (FROM INTERACTING)  (TO PLANNING)  (STATE
REQUEST) )
     ((TYPE PARAMS)
      (FILENAME "c:\pc_abe\bin\file1") ) )

(SET  ((TYPE MESSAGE)  (FROM INTERACTING)  (TO PLANNING)  (STATE
REQUEST) )
     ((TYPE PARAMS)
      (TOOLING_DATABASE "c:\pc_abe\database\tool.fel") ) )

(SET  ((TYPE MESSAGE)  (FROM INTERACTING)  (TO PLANNING)  (STATE
REQUEST) )
     ((TYPE PARAMS)
      (GRIPPER_DATABASE "c:\pc_abe\database\grip.fel") ) )

(SET  ((TYPE MESSAGE)  (FROM INTERACTING)  (TO PLANNING)  (STATE
REQUEST) )
     ((TYPE PARAMS)
      (MACHINE_DATABASE
"c:\pc_abe\database\machine_database.fbd3.fel") ) )

(SET  ((TYPE MESSAGE)  (FROM INTERACTING)  (TO PLANNING)  (STATE
REQUEST) )
     ((TYPE PARAMS)
      (SETUP_DATABASE "c:\pc_abe\database\cursetup.fel") ) )
```

APPENDIX B

```
(SET  ((TYPE MESSAGE)  (FROM INTERACTING)  (TO PLANNING)  (STATE
REQUEST) )
     ((TYPE PARAMS)
      (REPO_COST 30)
      (UNLOADING_COST 0)
      (UNLOADING_GRASP_FACE 0) ) )

(SET  ((TYPE MESSAGE)  (FROM INTERACTING)  (TO PLANNING)  (STATE
REQUEST) )
     ((TYPE PARAMS)
      (STAGE_TIME_COST 0)
      (NO_UNLOAD_COST 0)
      (TOOLING_NOT_AVAIL_COST 0) ) )

(SET  ((TYPE MESSAGE)  (FROM INTERACTING)  (TO PLANNING)  (STATE
REQUEST) )
     ((TYPE PARAMS)
      (QUANTITY 0) ) )

(PLAN ((TYPE MESSAGE)  (FROM INTERACTING)  (TO PLANNING)  (STATE
REQUEST) )
     ((TYPE PART)
      (MODEL "c:\pc_abe\bin\file1.pgf") ) )
```

APPENDIX C

```
****************************************************************
            Copyright 1996 AmadaSoft America, Inc.
****************************************************************

FELcom           = True
SHPLIB           = True
ExpThis          = interacting
ExpPlan          = planning
UIKEYWORDS       = c:\pc_abe\bin\uikwords.fel
DataBaseDir      = c:\pc_abe\database
GRIPPER_DB       = gripper_database.fel
PUNCH_DB  = punch.fel
DIE_DB           = die.fel
DHOLDER_DB       = dhl.fel
PHOLDER_DB       = phl.fel
ToolFileName     = tool.fel
GripFileName     = grip.fel
PartDir          = c:\pc_abe\bin
MotionDir        = c:\pc_abe\bin
MotionFileName   = file1
BascomDir        = c:\pc_abe\bin
DirPart          = pgf
International    = English
BascomCreation   = True
ExpGrasping      = False
ExpTooling       = True
ExpBending       = False
ExpMoving        = False
rxPlanning       = c:\pc_abe\bin\planning.exe
rxMoving         = c:\pc_abe\bin\moving.exe
rxGrasping       = c:\pc_abe\bin\grasping.exe
rxTooling        = c:\pc_abe\bin\tooling.exe
rxBending        = c:\pc_abe\bin\bending.exe
MACHINE_SETUP_DB = c:\pc_abe\database\setup.fel
MACHINE_DB_DIR   = c:\pc_abe\database
MACHINE_DB_FILES = machine_database.fbd3.fel|
MACHINE_NAMES    = JAPAN|
robot_form       = old
REPO_COST        = 30
UNLOADING_COST     = 10
UNLOADING_FACE     = 0
STAGE_COST         = 0
NO_UNLOADING_COST  = 5000
NO_TOOLING_COST    = 100
```

1

APPENDIX C

```
;****************************
;Tool Setup information(EVT)
;****************************
Xoffset = 0;
Loffset = 4.5
Zoffset = 0
Retract = 200.0
Tstrength_MILD = 32
Tstrength_ALM  = 10
Tstrength_SUS  = 15

: Roffset = Machine wide/2 - cmu's refference Point
:           690.2 - 528 (BM100)
:           1250 - 528 (FBD3)   722
Roffset = 0

:Boffset = 6.5
Boffset = 3.25

:Gage max and min location    04-24-96
BGage_left_min = -840
BGage_left_max = 840
BGage_right_max = 849

;**********************************
:Bend Setup Information(EVB,EVX)
;**********************************
Ladjust = 0
Zadjust = 0 ;15
;support gage thickness / 2 for Z hight in PM
;Bending Speed setup for EVX(initial value)
Speed1 = 3
```

APPENDIX D

```
*****************************************************************
                Copyright 1996 AmadaSoft America, Inc.
*****************************************************************

(REPORT ((TYPE MESSAGE) (FROM PLANNING) (TO INTERACTING) (STATE
REPLY) )
     ((TYPE INIT)
      (ROBOT_GRIPPER "IG-0725-U332Q")
      (REPO_GRIPPER "YG-1521-U59N")
      (PREDICTED_REPOS 2)
      (PREDICTED_STAGES 3) ) )

(REPORT ((TYPE MESSAGE) (FROM PLANNING) (TO INTERACTING) (STATE
REPLY) )
     ((TYPE FINALIZE)
      (BENDS (((2 5) 3) (9 7) (0 0) ((1 6) 3) (7 7) (3 9) (10 7) (0
0) (4 9) (8 9) (-10 0)))
      (LOADER_LOCATIONS    ((48.00000    48.00000)    (268.00000
138.00000)))
      (ROBOT_LOC ((1  1  (2.00000  -109.50000  0.00000)  (207.00000
-109.50000  0.00000)  140.00000  68.92000  71.42000  0.00000  2  0  0
43.49000  2.00000)  (1   1   (208.54000  59.34000  0.00000)  (0.46000
59.34000 0.00000) 140.00000 2.00000 58.59000 0.00000 1 1 1 88.67000
2.00000)   (1   1   (208.54000   59.34000   0.00000)   (0.46000 59.34000
0.00000)   70.00000   38.18000   40.68000   0.00000   0   0   1   54.98000
2.00000)))
      (REPO_LOC  ((1   1   (-26.00000   -46.00000   0.00000)   (0.46000
-46.00000 0.00000) 13.00000 19.99000 22.50000 10.36000 114.04000
3.14000 1.00000) (1  1  (2.00000  -100.34000  0.00000)  (207.00000
-100.34000 0.00000) 93.00000 4.00000 50.44000 10.36000 71.88000
3.14000 2.00000)))
      (BENDMAP ((1  (2 5) 1 3.00000 0 0 0 0 0 0 0 614.75000) (1
(9) 2 253.00000 0 0 0 0 0 0 0 614.75000) (1 (6) 3 280.50000 0 0
0 0 0 0 1 614.75000)  (2  (1)  3  -2.50000  0  0  0  0  0  0  0  1
1185.25000) (1 (7) 4 3.00000 0 0 0 0 0 0 0 614.75000) (3 (3) 5
-0.17000 0 0 0 0 0 0 0 1525.00000) (2 (10) 6 -2.50000 0 0 0 0 0
0 0 0 1185.25000) (3 (4) 7 -0.17000 0 0 0 0 0 0 0 1525.00000) (2
(8) 8 -2.50000 0 0 0 0 0 0 0 1185.25000)))
      (BGAGE_LOC ((72 7 10.00000 10.00000 2 2 16 15 9.00000 72) (27
26 10.00000 10.00000 1 1 32 29 9.00000 27) (2 32 10.00000 10.00000
1 1 32 31 9.00000 2) (16 15 10.00000 10.00000 2 2 15 14 9.00000 16)
(16 15 10.00000 10.00000 2 2 15 14 9.00000 16) (52 51 10.00000
10.00000 1 1 52 49 9.00000 52) (27 26 10.00000 10.00000 1 1 27 28
9.00000 27) (46 45 10.00000 10.00000 1 1 48 37 10.00000 46))) )
     ((TYPE PUNCH_SEGMENTS)
      (STAGE 1)
```

1

APPENDIX D

```
    (LENGTH 305)
    (HORNS "NONE")
    (SIZES (160 100 20 15 10))
    (X_LOCATION 614.75000)
    (PUNCH "00301")
    (PUNCH_ORIENT 2)
    (PUNCH_HOLDER "00001") )
((TYPE PUNCH_SEGMENTS)
    (STAGE 2)
    (LENGTH 200)
    (HORNS "NONE")
    (SIZES (160 40))
    (X_LOCATION 1185.25000)
    (PUNCH "00301")
    (PUNCH_ORIENT 2)
    (PUNCH_HOLDER "00001") )
((TYPE PUNCH_SEGMENTS)
    (STAGE 3)
    (LENGTH 105)
    (HORNS "NONE")
    (SIZES (80 15 10))
    (X_LOCATION 1525.00000)
    (PUNCH "00301")
    (PUNCH_ORIENT 2)
    (PUNCH_HOLDER "00001") )
((TYPE DIE_SEGMENTS)
    (STAGE 1)
    (LENGTH 305)
    (SIZES (160 100 20 15 10))
    (X_LOCATION 614.75000)
    (DIE "10606")
    (DIE_V_NUMBER 1)
    (DIE_HOLDER "53100") )
((TYPE DIE_SEGMENTS)
    (STAGE 2)
    (LENGTH 200)
    (SIZES (160 40))
    (X_LOCATION 1185.25000)
    (DIE "10606")
    (DIE_V_NUMBER 1)
    (DIE_HOLDER "53100") )
((TYPE DIE_SEGMENTS)
    (STAGE 3)
    (LENGTH 105)
    (SIZES (80 15 10))
    (X_LOCATION 1525.00000)
    (DIE "10606")
    (DIE_V_NUMBER 1)
    (DIE_HOLDER "53100") )
```

APPENDIX D

```
((TYPE SETUP)
 (MACHINE_NAME "JAPAN")
 (ROBOT_GRIPPER "TG25")
 (REPO_GRIPPER UNDEFINED)
 (LOADER_GRIPPER UNDEFINED)
 (BACKGAGE_FINGER_LENGTH 75.00000)
 (PHL_LOCATIONS (75 275 475 675 875 1075 1275 1475 1675 1875
2075 2275))
 (PHL_TYPES (150 150 150 150 150 150 150 150 150 150 150 150))

(DHL_LOCATIONS (0))
 (DHL_TYPES (2500))
 (STAGE_LOCATIONS (614 1185 1525))
 (PUNCH_TYPES ("00301" "00301" "00301"))
 (DIE_TYPES ("10606" "10606" "10606"))
 (PUNCH_ORIENT UNDEFINED)
 (STAGES ((1 305.00000 614.75000 2 0 "00301" "10606" "00001"
"53100" 1 2 1 108.34000 265.50000 0 2 0) (2 200.00000 1185.25000 2
0 "00301" "10606" "00001" "53100" 1 2 2 265.50000 57.00000 1 3 0)
(3 105.00000 1525.00000 2 0 "00301" "10606" "00001" "53100" 2 1 1
54.51000 63.67000 2 0 0))) ) )
```

3

APPENDIX E

```
****************************************************************
              Copyright 1996 AmadaSoft America, Inc.
                      Example of "EVB" file.
****************************************************************

WK01WNbbc03
NP1T1.00MNSPCC1
QM1S32SQ8
SN1PN00301PR0.6PA88.00PH90.00PP30DN10606V6DR1.5DA88.00DH60.00DW7.
0DB14.0DP94DT1HH50.00
SN2PN00301PR0.6PA88.00PH90.00PP30DN10606V6DR1.5DA88.00DH60.00DW7.
0DB14.0DP94DT1HH50.00
SN3PN00301PR0.6PA88.00PH90.00PP30DN10606V6DR1.5DA88.00DH60.00DW7.
0DB14.0DP94DT1HH50.00
SN4PN00301PR0.6PA88.00PH90.00PP30DN10606V6DR1.5DA88.00DH60.00DW7.
0DB14.0DP94DT1HH50.00
SN5PN00301PR0.6PA88.00PH90.00PP30DN10606V6DR1.5DA88.00DH60.00DW7.
0DB14.0DP94DT1HH50.00
KD01H9.03A90.00B94SN11
KD02H54.03A90.00B49SN22
KD03H20.03A90.00B53SN11
KD04H54.03A90.00B49SN33
KD05H53.83A90.00B105SN44
KD06H10.03A90.00B207SN11
KD07H53.83A90.00B105SN22
KD08H53.06A90.00B207SN11
PM01LD56F3BP-398YL-540.3YR-256.3LS39.2
PM02LD71F3BP-533YL-532.2YR-412.4LS100.0
PM03LD45F3BP250YL103.0YR397.0LS100.0
PM04LD55F3BP-686YL-806.4YR-686.5LS100.0
PM05LD32F3BP-241YL-278.9YR-159.1LS67.5
PM06LD55F3BP-607YL-700.4YR-513.4LS100.0
PM07LD32F3BP-241YL-322.1YR-202.3LS83.0
PM08LD28F3BP-607YL-700.4YR-513.4LS100.0
```

APPENDIX F

```
****************************************************************
              Copyright 1996 AmadaSoft America, Inc.
                     Example of "EVT" file.
****************************************************************

WK01WNbbc03
NP1T1.00MNSPCC1
QM1S32SQ8
SN1PN00301PR0.6PA88.00PH90.00PP30DN10606V6DR1.5DA88.00DH60.00DW7.
0DB14.0DP94DT1HH50.00
TS00LL200.00LR200.00XL-501.1XR875.0Z100.0
TS01LL2.50LR2.50XL-501.1XR875.0Z100.0
SN2PN00301PR0.6PA88.00PH90.00PP30DN10606V6DR1.5DA88.00DH60.00DW7.
0DB14.0DP94DT1HH50.00
TS00LL2.50LR2.50XL-187.4XR875.0Z100.0
SN3PN00301PR0.6PA88.00PH90.00PP30DN10606V6DR1.5DA88.00DH60.00DW7.
0DB14.0DP94DT1HH50.00
TS00LL2.50LR2.50XL124.5XR875.0Z100.0
SN4PN00301PR0.6PA88.00PH90.00PP30DN10606V6DR1.5DA88.00DH60.00DW7.
0DB14.0DP94DT1HH50.00
TS00LL2.50LR2.50XL412.0XR875.0Z100.0
SN5PN00301PR0.6PA88.00PH90.00PP30DN10606V6DR1.5DA88.00DH60.00DW7.
0DB14.0DP94DT1HH50.00
TS00LL200.00LR200.00XL412.0XR875.0Z100.0
KD01H22.00A90.20B100SN11
```

APPENDIX G

```
****************************************************************
                 Copyright 1996 AmadaSoft America, Inc.
                         Example of "EVX" file.
****************************************************************

WK01WNbbc03
NP1T1.00MNSPCC1
QM1S32SQ8
SN1PN00301PR0.6PA88.00PH90.00PP30DN10606V6DR1.5DA88.00DH60.00DW7.
0DB14.0DP94DT1HH50.00
SN2PN00301PR0.6PA88.00PH90.00PP30DN10606V6DR1.5DA88.00DH60.00DW7.
0DB14.0DP94DT1HH50.00
SN3PN00301PR0.6PA88.00PH90.00PP30DN10606V6DR1.5DA88.00DH60.00DW7.
0DB14.0DP94DT1HH50.00
SN4PN00301PR0.6PA88.00PH90.00PP30DN10606V6DR1.5DA88.00DH60.00DW7.
0DB14.0DP94DT1HH50.00
SN5PN00301PR0.6PA88.00PH90.00PP30DN10606V6DR1.5DA88.00DH60.00DW7.
0DB14.0DP94DT1HH50.00
KD01H9.03A90.00B94SN11
KD02H54.03A90.00B49SN22
KD03H20.03A90.00B53SN11
KD04H54.03A90.00B49SN33
KD05H53.83A90.00B105SN44
KD06H10.03A90.00B207SN11
KD07H53.83A90.00B105SN22
KD08H53.06A90.00B207SN11
PM01LD56F3BP-398YL-540.3YR-256.3LS39.2
XG00LL29.24LR29.24XL-540.3XR-256.3Z100.0XS3
XG01LL39.24LR39.24XL-540.3XR-256.3Z100.0XS0
XG02LL39.24LR39.24XL-558.6XR-201.3Z100.0XS0
XG03LL6.00LR6.00XL-558.6XR-201.3Z100.0XS1
XG04LL6.00LR6.00XL-568.6XR-201.3Z100.0XS0
XG05LL39.24LR39.24XL-568.6XR-201.3Z100.0XS0
XG06LL39.24LR39.24XL-540.3XR-256.3Z100.0XS0
XG07LL9.03LR9.03XL-540.3XR-256.3Z100.0XS0
XG08LL28.16LR28.16XL-540.3XR-256.3Z100.0XS2
PM02LD71F3BP-533YL-532.2YR-412.4LS100.0
XG00LL54.03LR54.03XL-532.2XR-412.4Z100.0XS3
XG01LL64.03LR64.03XL-532.2XR-412.4Z100.0XS0
XG02LL64.03LR64.03XL-564.6XR-357.0Z100.0XS0
XG03LL44.29LR44.29XL-564.6XR-357.0Z100.0XS1
XG04LL44.29LR44.29XL-574.6XR-357.0Z100.0XS0
XG05LL64.03LR64.03XL-574.6XR-357.0Z100.0XS0
```

APPENDIX G

```
XG06LL64.03LR64.03XL-532.2XR-412.4Z100.0XS0
XG07LL54.03LR54.03XL-532.2XR-412.4Z100.0XS0
XG08LL73.16LR73.16XL-532.2XR-412.4Z100.0XS2
PM03LD45F3BP250YL103.0YR397.0LS100.0
XG00LL69.87LR69.87XL103.0XR397.0Z100.0XS3
XG01LL79.00LR79.00XL103.0XR397.0Z100.0XS0
XG02LL79.00LR79.00XL89.8XR447.0Z100.0XS0
XG03LL60.13LR60.13XL89.8XR447.0Z100.0XS1
XG04LL60.13LR60.13XL79.8XR447.0Z100.0XS0
XG05LL79.00LR79.00XL79.8XR447.0Z100.0XS0
XG06LL79.00LR79.00XL103.0XR397.0Z100.0XS0
XG07LL20.03LR20.03XL103.0XR397.0Z100.0XS0
XG08LL44.66LR44.66XL103.0XR397.0Z100.0XS2
PM04LD55F3BP-686YL-806.4YR-686.5LS100.0
XG00LL54.03LR54.03XL-806.4XR-686.5Z100.0XS3
XG01LL64.03LR64.03XL-806.4XR-686.5Z100.0XS0
XG02LL64.03LR64.03XL-861.7XR-673.3Z100.0XS0
XG03LL44.29LR44.29XL-861.7XR-673.3Z100.0XS1
XG04LL44.29LR44.29XL-861.7XR-663.3Z100.0XS0
XG05LL64.03LR64.03XL-861.7XR-663.3Z100.0XS0
XG06LL64.03LR64.03XL-806.4XR-686.5Z100.0XS0
XG07LL54.03LR54.03XL-806.4XR-686.5Z100.0XS0
XG08LL76.51LR76.51XL-806.4XR-686.5Z100.0XS2
PM05LD32F3BP-241YL-278.9YR-159.1LS67.5
XG00LL53.83LR53.83XL-288.9XR-169.1Z100.0XS3
XG01LL63.83LR63.83XL-288.9XR-169.1Z100.0XS0
XG02LL63.83LR63.83XL-354.3XR-145.9Z100.0XS0
XG03LL44.09LR44.09XL-354.3XR-145.9Z100.0XS1
XG04LL44.09LR44.09XL-354.3XR-135.9Z100.0XS0
XG05LL63.83LR63.83XL-354.3XR-135.9Z100.0XS0
XG06LL63.83LR63.83XL-288.9XR-169.1Z100.0XS0
XG07LL53.83LR53.83XL-278.9XR-159.1Z100.0XS0
XG08LL76.32LR76.32XL-278.9XR-159.1Z100.0XS2
PM06LD55F3BP-607YL-700.4YR-513.4LS100.0
XG00LL15.74LR15.74XL-700.4XR-513.4Z100.0XS3
XG01LL25.74LR25.74XL-700.4XR-513.4Z100.0XS0
XG02LL25.74LR25.74XL-750.7XR-500.1Z100.0XS0
XG03LL6.00LR6.00XL-750.7XR-500.1Z100.0XS1
XG04LL6.00LR6.00XL-750.7XR-490.1Z100.0XS0
XG05LL25.74LR25.74XL-750.7XR-490.1Z100.0XS0
XG06LL25.74LR25.74XL-700.4XR-513.4Z100.0XS0
XG07LL10.03LR10.03XL-700.4XR-513.4Z100.0XS0
XG08LL29.16LR29.16XL-700.4XR-513.4Z100.0XS2
PM07LD32F3BP-241YL-322.1YR-202.3LS83.0
XG00LL53.83LR53.83XL-312.1XR-192.3Z100.0XS3
XG01LL63.83LR63.83XL-312.1XR-192.3Z100.0XS0
XG02LL63.83LR63.83XL-335.4XR-127.0Z100.0XS0
XG03LL44.09LR44.09XL-335.4XR-127.0Z100.0XS1
XG04LL44.09LR44.09XL-345.4XR-127.0Z100.0XS0
```

2

APPENDIX G

```
XG05LL63.83LR63.83XL-345.4XR-127.0Z100.0XS0
XG06LL63.83LR63.83XL-312.1XR-192.3Z100.0XS0
XG07LL53.83LR53.83XL-322.1XR-202.3Z100.0XS0
XG08LL76.32LR76.32XL-322.1XR-202.3Z100.0XS2
PM08LD28F3BP-607YL-700.4YR-513.4LS100.0
XG00LL53.06LR53.06XL-700.4XR-513.4Z100.0XS3
XG01LL63.06LR63.06XL-700.4XR-513.4Z100.0XS0
XG02LL63.06LR63.06XL-750.7XR-499.8Z100.0XS0
XG03LL41.24LR41.24XL-750.7XR-499.8Z100.0XS1
XG04LL41.24LR41.24XL-750.7XR-489.8Z100.0XS0
XG05LL63.06LR63.06XL-750.7XR-489.8Z100.0XS0
XG06LL63.06LR63.06XL-700.4XR-513.4Z100.0XS0
XG07LL53.06LR53.06XL-700.4XR-513.4Z100.0XS0
XG08LL71.32LR71.32XL-700.4XR-513.4Z100.0XS2
```

APPENDIX H

```
****************************************************************
              Copyright 1996 AmadaSoft America, Inc.

Example of "RB1" file.
****************************************************************

(STARTUP ((TYPE MESSAGE) (FROM RIMD) (TO MACH90) (STATE REQUEST) )
     ((TYPE PRESSBRAKE)
      (NBENDS 8)
      (NPARTS 1)
      (DIE_WIDTH 7.00000) )
     ((TYPE ROBOT)
      (GRIPPER CLOSE)
      (ROBOT_SPEED 3)
      (VERIFY_POINT  (1017.00000  -426.57000   124.56000   -18.99000
85.40000))
      (ROBOT_ABS_MOVE ((800.00000   -400.00000   100.00000   0.00000
-90.00000)))  )
     ((TYPE BACKGAGE) ) )
(GET ((TYPE MESSAGE) (FROM RIMD) (TO MACH90) (STATE REQUEST) )
     ((TYPE LOADER)
      (ROBOT_ABS_MOVE  ((900.00000   -500.00000   480.00000   0.00000
-90.00000)  (900.00000  -500.00000   480.00000  -90.00000  -90.00000)
(900.00000  -500.00000  480.00000  -180.00000  -90.00000)  (900.00000
-468.50000  480.00000  -180.00000  -90.00000)  (884.57000  -468.50000
499.20000  -180.00000  -90.00000)))
      (ROBOT_ZGAGE (518.20000 480.20000))
      (MEMORIZE_PRELOAD_POINT   (884.57000   -468.50000    499.20000
-180.00000 -90.00000))
      (ROBOT_REL_MOVE    ((260.48000    0.00000    0.00000    0.00000
0.00000)))
      (ROBOT_ABS_MOVE ((1145.05000 -468.50000 480.20000 -180.00000
-90.00000)))
      (EXCHANGE_PART 5.00000)
      (ROBOT_REL_MOVE ((0.00000 0.00000 6.50000 0.00000 0.00000)))
      (ROBOT_REL_MOVE    ((-500.00000    0.00000    0.00000    0.00000
0.00000))) ) )
(PUT ((TYPE MESSAGE) (FROM RIMD) (TO MACH90) (STATE REQUEST) )
     ((TYPE PRESSBRAKE)
      (ROBOT_ABS_MOVE ((645.05000  -468.50000  486.70000  -180.00000
-90.00000)  (645.05000  -468.50000  486.70000  -90.00000  -90.00000)
(645.05000   -468.50000   486.70000   0.00000   0.00000)   (-364.83000
-468.50000   131.00000   0.00000   0.00000)   (-364.83000   -390.35000
131.00000 0.00000 0.00000)))
      (ROBOT_ZGAGE (88.00000 250.00000))
```

APPENDIX H

```
      (MEMORIZE_PRELOAD_POINT  (-364.83000  -390.35000  131.00000
0.00000 0.00000))
      (BGAGE_ABS_MOVE ((-256.33000 110.00000 -540.33000 110.00000
29.24000)))
      (ROBOT_REL_MOVE ((0.00000 60.21000 0.00000 0.00000 0.00000)))

(ROBOT_ABS_MOVE  ((-364.83000  -330.14000  110.00000  0.00000
0.00000)))
      (ROBOT_ZGAGE (88.00000 250.00000))
      (MODE XGAGE_YES)
      (MODE YSHIFT_NO)
      (ROBOT_YGAGE  (-320.14000  -300.14000  -325.14000  -256.33000
-540.33000 29.24000))
      (BGAGE_ABS_MOVE ((-256.33000 110.00000 -540.33000 110.00000
39.24000) (-201.33000 110.00000 -558.58000 110.00000 39.24000)))
      (ROBOT_REL_MOVE ((15.00000 0.00000 0.00000 0.00000 0.00000)))

(BGAGE_ABS_MOVE ((-201.33000 110.00000 -558.58000 110.00000
6.00000)))
      (ROBOT_XGAGE (-364.83000 -379.83000 -359.83000))
      (BGAGE_ABS_MOVE ((-201.33000 110.00000 -568.58000 110.00000
6.00000)  (-201.33000  110.00000  -568.58000  110.00000  39.24000)
(-256.33000 110.00000 -540.33000 110.00000 39.24000)))
      (ROBOT_REL_MOVE   ((0.00000   -25.21000   0.00000   0.00000
0.00000)))
      (MEMORIZE_LOAD_POINT (-364.83000 -340.35000 110.00000 0.00000
0.00000))
      (BGAGE_ABS_MOVE ((-256.33000 110.00000 -540.33000 110.00000
9.03000)))
      (ROBOT_YGAGE  (-340.35000  -320.35000  -345.35000  -256.33000
-540.33000 9.03000))
      (MEMORIZE_BEND_POINT (-364.83000 -340.35000 110.00000 0.00000
0.00000)) ) )
(BEND ((TYPE MESSAGE) (FROM RIMD) (TO MACH90) (STATE REQUEST) )
      ((TYPE FOLLOW)
      (BEND ((10 1) 8))
      (BEND_ANGLE 90.00000)
      (MATERIAL_THICKNESS 1.00000)
      (PRESS_TRAVEL 2.57000)
      (FOLLOWING_SPEED 0)
      (FOLLOWING_HEIGHT 0.00000)
      (MODE DIE_CONTACT)
      (BGAGE_ABS_MOVE ((-256.33000 110.00000 -540.33000 110.00000
28.16000))) ) )
(GET ((TYPE MESSAGE) (FROM RIMD) (TO MACH90) (STATE REQUEST) )
      ((TYPE PRESSBRAKE)
      (MODE DIE_CONTACT)
      (ROBOT_REL_MOVE ((0.00000 0.00000 10.00000 0.00000 0.00000)
(0.00000  -30.00000  0.00000  0.00000  0.00000)  (0.00000  -53.93000
```

2

APPENDIX H

```
-70.28000 15.00000 0.00000) (0.00000 -33.90000 -81.85000 15.00000
0.00000) (0.00000 -11.56000 -87.83000 15.00000 0.00000))) ) )
(PUT ((TYPE MESSAGE) (FROM RIMD) (TO MACH90) (STATE REQUEST) )
     ((TYPE PRESSBRAKE)
      (ROBOT_ABS_MOVE ((-364.83000 -420.35000 131.00000  0.00000
0.00000)  (-364.83000  -420.35000  131.00000  0.00000   -90.00000)
(-736.39000 -241.49000 131.00000 0.00000 -90.00000)))
      (ROBOT_ZGAGE (88.00000 250.00000))
      (MEMORIZE_PRELOAD_POINT  (-736.39000  -241.49000   131.00000
0.00000 -90.00000))
      (BGAGE_ABS_MOVE ((-412.37000 110.00000 -532.21000 110.00000
54.03000)))
      (ROBOT_REL_MOVE ((0.00000 93.16000 0.00000 0.00000 0.00000)))

(ROBOT_ABS_MOVE  ((-736.39000  -148.33000  110.00000  0.00000
-90.00000)))
      (ROBOT_ZGAGE (88.00000 250.00000))
      (MODE XGAGE_YES)
      (MODE YSHIFT_NO)
      (ROBOT_YGAGE  (-138.33000   -118.33000   -143.33000   -412.37000
-532.21000 54.03000))
      (BGAGE_ABS_MOVE ((-412.37000 110.00000 -532.21000 110.00000
64.03000) (-357.03000 110.00000 -564.62000 110.00000 64.03000)))
      (ROBOT_REL_MOVE ((15.00000 0.00000 0.00000 0.00000 0.00000)))

(BGAGE_ABS_MOVE ((-357.03000 110.00000 -564.62000 110.00000
44.29000)))
      (ROBOT_XGAGE (-736.39000 -751.39000 -731.39000))
      (BGAGE_ABS_MOVE ((-357.03000 110.00000 -574.62000 110.00000
44.29000)  (-357.03000  110.00000  -574.62000  110.00000  64.03000)
(-412.37000 110.00000 -532.21000 110.00000 64.03000)))
      (ROBOT_REL_MOVE ((0.00000 -5.00000 0.00000 0.00000 0.00000)))

(MEMORIZE_LOAD_POINT (-736.39000 -138.33000 110.00000 0.00000
-90.00000))
      (BGAGE_ABS_MOVE ((-412.37000 110.00000 -532.21000 110.00000
54.03000)))
      (ROBOT_YGAGE  (-138.33000   -118.33000   -143.33000   -412.37000
-532.21000 54.03000))
      (MEMORIZE_BEND_POINT (-736.39000 -138.33000 110.00000 0.00000
-90.00000)) ) )
(BEND ((TYPE MESSAGE) (FROM RIMD) (TO MACH90) (STATE REQUEST) )
     ((TYPE FOLLOW)
      (BEND (4 4))
      (BEND_ANGLE 90.00000)
      (MATERIAL_THICKNESS 1.00000)
      (PRESS_TRAVEL 2.57000)
      (FOLLOWING_SPEED 0)
      (FOLLOWING_HEIGHT 0.00000)
```

3

APPENDIX H

```
        (MODE DIE_CONTACT)
        (BGAGE_ABS_MOVE ((-412.37000 110.00000 -532.21000 110.00000
73.16000))) ) )
(GET ((TYPE MESSAGE) (FROM RIMD) (TO MACH90) (STATE REQUEST) )
     ((TYPE PRESSBRAKE)
      (MODE DIE_CONTACT)
      (ROBOT_REL_MOVE ((0.00000 0.00000 65.00000 0.00000 0.00000)
(0.00000 -85.00000 0.00000 0.00000 0.00000) (0.00000 -21.83000
-28.44000 15.00000 0.00000) (0.00000 -13.72000 -33.12000 15.00000
0.00000) (0.00000 -4.68000 -35.55000 15.00000 0.00000))) ) )
(PUT ((TYPE MESSAGE) (FROM RIMD) (TO MACH90) (STATE REQUEST) )
     ((TYPE REPO)
      (ROBOT_ABS_MOVE ((-736.39000 -223.33000 130.00000 0.00000
-90.00000) (-736.39000 -396.08000 130.00000 0.00000 -90.00000)
(-764.56000 -396.08000 479.77000 0.00000 -90.00000)))
      (ROBOT_ZGAGE (88.00000 250.00000))
      (MEMORIZE_PRELOAD_POINT (-764.56000 -396.08000 479.77000
0.00000 -90.00000))
      (ROBOT_REL_MOVE   ((-170.00000    0.00000    0.00000    0.00000
0.00000)))
      (ROBOT_ABS_MOVE ((-934.56000 -396.08000 458.35000 0.00000
-90.00000)))
      (EXCHANGE_PART 5.00000)
      (ROBOT_REL_MOVE   ((0.00000    0.00000    -30.00000    0.00000
0.00000)))
      (ROBOT_REL_MOVE   ((-170.00000    0.00000    0.00000    0.00000
0.00000))) ) )
(GET ((TYPE MESSAGE) (FROM RIMD) (TO MACH90) (STATE REQUEST) )
     ((TYPE REPO)
      (ROBOT_ABS_MOVE ((-1104.56000 -396.08000 428.35000 0.00000
-90.00000) (-1104.56000 -396.08000 200.00000 0.00000 -90.00000)
(-198.20000 -328.54000 200.00000 0.00000 -90.00000) (-135.90000
-380.00000 200.00000 0.00000 0.00000) (-135.90000 -380.00000
200.00000 0.00000 90.00000) (-198.20000 -380.00000 200.00000
0.00000 90.00000) (-198.20000 -380.00000 439.35000 0.00000
90.00000) (-198.20000 -328.54000 439.35000 0.00000 90.00000)))
      (ROBOT_ZGAGE (458.35000 420.35000))
      (MEMORIZE_PRELOAD_POINT (-198.20000 -328.54000 439.35000
0.00000 90.00000))
      (ROBOT_REL_MOVE   ((-170.00000    0.00000    0.00000    0.00000
0.00000)))
      (ROBOT_ABS_MOVE ((-368.20000 -328.54000 458.35000 0.00000
90.00000)))
      (EXCHANGE_PART 5.00000)
      (ROBOT_REL_MOVE ((0.00000 0.00000 21.42000 0.00000 0.00000)))

(ROBOT_REL_MOVE   ((172.00000    0.00000    0.00000    0.00000
0.00000))) ) )
(PUT ((TYPE MESSAGE) (FROM RIMD) (TO MACH90) (STATE REQUEST) )
```

4

APPENDIX H

```
    ((TYPE PRESSBRAKE)
     (ROBOT_ABS_MOVE ((-196.20000 -328.54000 479.77000 0.00000
90.00000) (-196.20000 -496.84000 479.77000 -90.00000 90.00000)
(-196.20000 -496.84000 479.77000 -180.00000 180.00000) (215.96000
-496.84000 139.16000 -180.00000 180.00000) (215.96000 -447.83000
139.16000 -180.00000 180.00000)))
     (ROBOT_ZGAGE (88.00000 250.00000))
     (MEMORIZE_PRELOAD_POINT  (215.96000   -447.83000   139.16000
-180.00000 180.00000))
     (BGAGE_ABS_MOVE ((397.00000  110.00000  103.00000  110.00000
69.87000)))
     (ROBOT_REL_MOVE    ((0.00000    114.50000    0.00000    0.00000
0.00000)))
     (ROBOT_ABS_MOVE ((215.96000 -333.33000 110.00000 -180.00000
180.00000)))
     (ROBOT_ZGAGE (88.00000 250.00000))
     (MODE XGAGE_YES)
     (MODE YSHIFT_NO)
     (ROBOT_YGAGE  (-323.33000  -303.33000  -328.33000  397.00000
103.00000 69.87000))
     (BGAGE_ABS_MOVE ((397.00000  110.00000  103.00000  110.00000
79.00000) (447.00000 110.00000 89.75000 110.00000 79.00000)))
     (ROBOT_REL_MOVE ((15.00000 0.00000 0.00000 0.00000 0.00000)))

(BGAGE_ABS_MOVE  ((447.00000  110.00000  89.75000  110.00000
60.13000)))
     (ROBOT_XGAGE (215.96000 200.96000 220.96000))
     (BGAGE_ABS_MOVE  ((447.00000  110.00000  79.75000  110.00000
60.13000)   (447.00000    110.00000    79.75000    110.00000    79.00000)
(397.00000 110.00000 103.00000 110.00000 79.00000)))
     (ROBOT_REL_MOVE    ((0.00000    -54.84000    0.00000    0.00000
0.00000)))
     (MEMORIZE_LOAD_POINT    (215.96000    -373.17000    110.00000
-180.00000 180.00000))
     (BGAGE_ABS_MOVE ((397.00000  110.00000  103.00000  110.00000
20.03000)))
     (ROBOT_YGAGE  (-373.17000  -353.17000  -378.17000  397.00000
103.00000 20.03000))
     (MEMORIZE_BEND_POINT    (215.96000    -373.17000    110.00000
-180.00000 180.00000)) )
(BEND ((TYPE MESSAGE) (FROM RIMD) (TO MACH90) (STATE REQUEST) )
     ((TYPE FOLLOW)
     (BEND ((3 9) 2))
     (BEND_ANGLE 90.00000)
     (MATERIAL_THICKNESS 1.00000)
     (PRESS_TRAVEL 2.57000)
     (FOLLOWING_SPEED 0)
     (FOLLOWING_HEIGHT 0.00000)
     (MODE DIE_CONTACT)
```

APPENDIX H

```
        (BGAGE_ABS_MOVE ((397.00000  110.00000  103.00000  110.00000
44.66000))) ) )
(GET ((TYPE MESSAGE) (FROM RIMD) (TO MACH90) (STATE REQUEST) )
     ((TYPE PRESSBRAKE)
      (MODE DIE_CONTACT)
      (ROBOT_REL_MOVE ((0.00000 0.00000 52.00000 0.00000 0.00000)
(0.00000 -65.00000 0.00000 0.00000 0.00000) (0.00000 -59.15000
-77.08000 15.00000 0.00000) (0.00000 -37.18000 -89.76000 15.00000
0.00000) (0.00000 -12.68000 -96.33000 15.00000 0.00000))) ) )
(PUT ((TYPE MESSAGE) (FROM RIMD) (TO MACH90) (STATE REQUEST) )
     ((TYPE PRESSBRAKE)
      (ROBOT_ABS_MOVE ((215.96000 -488.17000 149.16000 -180.00000
180.00000) (215.96000 -488.17000 149.16000 -90.00000 270.00000)
(215.96000 -496.84000 149.16000 0.00000 270.00000) (-1048.71000
-242.03000 149.16000 0.00000 270.00000)))
      (ROBOT_ZGAGE (88.00000 250.00000))
      (MEMORIZE_PRELOAD_POINT (-1048.71000 -242.03000 149.16000
0.00000 270.00000))
      (BGAGE_ABS_MOVE ((-686.53000 110.00000 -806.37000 110.00000
54.03000)))
      (ROBOT_REL_MOVE ((0.00000 93.16000 0.00000 0.00000 0.00000)))

(ROBOT_ABS_MOVE ((-1048.71000 -148.87000 110.00000 0.00000
270.00000)))
      (ROBOT_ZGAGE (88.00000 250.00000))
      (MODE XGAGE_YES)
      (MODE YSHIFT_NO)
      (ROBOT_YGAGE (-138.87000 -118.87000 -143.87000 -686.53000
-806.37000 54.03000))
      (BGAGE_ABS_MOVE ((-686.53000 110.00000 -806.37000 110.00000
64.03000) (-673.28000 110.00000 -861.71000 110.00000 64.03000)))
      (ROBOT_REL_MOVE   ((-15.00000    0.00000    0.00000    0.00000
0.00000)))
      (BGAGE_ABS_MOVE ((-673.28000 110.00000 -861.71000 110.00000
44.29000)))
      (ROBOT_XGAGE (-1048.71000 -1033.71000 -1053.71000))
      (BGAGE_ABS_MOVE ((-663.28000 110.00000 -861.71000 110.00000
44.29000) (-663.28000 110.00000 -861.71000 110.00000 64.03000)
(-686.53000 110.00000 -806.37000 110.00000 64.03000)))
      (ROBOT_REL_MOVE ((0.00000 -5.00000 0.00000 0.00000 0.00000)))

(MEMORIZE_LOAD_POINT   (-1048.71000    -138.87000    110.00000
0.00000 -90.00000))
      (BGAGE_ABS_MOVE ((-686.53000 110.00000 -806.37000 110.00000
54.03000)))
      (ROBOT_YGAGE (-138.87000 -118.87000 -143.87000 -686.53000
-806.37000 54.03000))
      (MEMORIZE_BEND_POINT   (-1048.71000   -138.87000   110.00000
0.00000 -90.00000)) ) )
```

6

APPENDIX H

```
(BEND ((TYPE MESSAGE) (FROM RIMD) (TO MACH90) (STATE REQUEST) )
     ((TYPE FOLLOW)
      (BEND (6 4))
      (BEND_ANGLE 90.00000)
      (MATERIAL_THICKNESS 1.00000)
      (PRESS_TRAVEL 2.57000)
      (FOLLOWING_SPEED 0)
      (FOLLOWING_HEIGHT 0.00000)
      (MODE DIE_CONTACT)
      (BGAGE_ABS_MOVE ((-686.53000 110.00000 -806.37000 110.00000
76.51000))) ) )
(GET ((TYPE MESSAGE) (FROM RIMD) (TO MACH90) (STATE REQUEST) )
     ((TYPE PRESSBRAKE)
      (MODE DIE_CONTACT)
      (ROBOT_REL_MOVE ((0.00000 0.00000 72.00000 0.00000 0.00000)
(0.00000 -105.00000 0.00000 0.00000 0.00000) (0.00000 -21.91000
-28.56000 15.00000 0.00000) (0.00000 -13.77000 -33.25000 15.00000
0.00000) (0.00000 -4.70000 -35.69000 15.00000 0.00000))) ) )
(PUT ((TYPE MESSAGE) (FROM RIMD) (TO MACH90) (STATE REQUEST) )
     ((TYPE PRESSBRAKE)
      (ROBOT_ABS_MOVE ((-1048.71000 -293.87000 149.16000 0.00000
270.00000) (-1048.71000 -293.87000 130.00000 0.00000 270.00000)
(-521.29000 -293.87000 130.00000 0.00000 270.00000) (-521.29000
-242.03000 130.00000 0.00000 270.00000)))
      (ROBOT_ZGAGE (88.00000 250.00000))
      (MEMORIZE_PRELOAD_POINT  (-521.29000  -242.03000  130.00000
0.00000 270.00000))
      (BGAGE_ABS_MOVE ((-169.11000 110.00000 -288.95000 110.00000
53.83000)))
      (ROBOT_REL_MOVE ((0.00000 92.96000 0.00000 0.00000 0.00000)))

(ROBOT_ABS_MOVE  ((-531.29000  -149.07000  110.00000  0.00000
270.00000)))
      (ROBOT_ZGAGE (88.00000 250.00000))
      (MODE XGAGE_YES)
      (MODE YSHIFT_NO)
      (ROBOT_YGAGE  (-139.07000  -119.07000  -144.07000  -169.11000
-288.95000 53.83000))
      (BGAGE_ABS_MOVE ((-169.11000 110.00000 -288.95000 110.00000
63.83000) (-145.86000 110.00000 -354.29000 110.00000 63.83000)))
      (ROBOT_REL_MOVE   ((-15.00000    0.00000    0.00000    0.00000
0.00000)))
      (BGAGE_ABS_MOVE ((-145.86000 110.00000 -354.29000 110.00000
44.09000)))
      (ROBOT_XGAGE (-531.29000 -516.29000 -536.29000))
      (BGAGE_ABS_MOVE ((-135.86000 110.00000 -354.29000 110.00000
44.09000) (-135.86000 110.00000 -354.29000 110.00000 63.83000)
(-169.11000 110.00000 -288.95000 110.00000 63.83000)))
      (ROBOT_REL_MOVE ((0.00000 -5.00000 0.00000 0.00000 0.00000)))
```

APPENDIX H

```
        (MEMORIZE_LOAD_POINT (-521.29000 -139.07000 110.00000 0.00000
-90.00000))
        (BGAGE_ABS_MOVE ((-159.11000 110.00000 -278.95000 110.00000
53.83000)))
        (ROBOT_YGAGE (-139.07000 -119.07000 -144.07000 -159.11000
-278.95000 53.83000))
        (MEMORIZE_BEND_POINT (-521.29000 -139.07000 110.00000 0.00000
-90.00000)) ) )
(BEND ((TYPE MESSAGE) (FROM RIMD) (TO MACH90) (STATE REQUEST) )
     ((TYPE FOLLOW)
      (BEND (8 6))
      (BEND_ANGLE 90.00000)
      (MATERIAL_THICKNESS 1.00000)
      (PRESS_TRAVEL 2.57000)
      (FOLLOWING_SPEED 0)
      (FOLLOWING_HEIGHT 0.00000)
      (MODE DIE_CONTACT)
      (BGAGE_ABS_MOVE ((-159.11000 110.00000 -278.95000 110.00000
76.32000))) ) )
(GET ((TYPE MESSAGE) (FROM RIMD) (TO MACH90) (STATE REQUEST) )
     ((TYPE PRESSBRAKE)
      (MODE DIE_CONTACT)
      (ROBOT_REL_MOVE ((0.00000 0.00000 10.00000 0.00000 0.00000)
(0.00000 -95.00000 0.00000 0.00000 0.00000) (0.00000 -21.94000
-28.60000 15.00000 0.00000) (0.00000 -13.79000 -33.30000 15.00000
0.00000) (0.00000 -4.70000 -35.74000 15.00000 0.00000))) ) )
(PUT ((TYPE MESSAGE) (FROM RIMD) (TO MACH90) (STATE REQUEST) )
     ((TYPE PRESSBRAKE)
      (ROBOT_ABS_MOVE ((-521.29000 -284.07000 130.00000 0.00000
270.00000) (-521.29000 -466.84000 130.00000 0.00000 270.00000)
(-521.29000 -466.84000 130.00000 0.00000 360.00000) (-572.83000
-447.83000 130.00000 0.00000 360.00000)))
      (ROBOT_ZGAGE (88.00000 250.00000))
      (MEMORIZE_PRELOAD_POINT  (-572.83000  -447.83000  130.00000
0.00000 360.00000))
      (BGAGE_ABS_MOVE ((-513.37000 110.00000 -700.37000 110.00000
15.74000)))
      (ROBOT_REL_MOVE ((0.00000 54.87000 0.00000 0.00000 0.00000)))

(ROBOT_ABS_MOVE  ((-572.83000  -392.96000 110.00000  0.00000
360.00000)))
      (ROBOT_ZGAGE (88.00000 250.00000))
      (MODE XGAGE_YES)
      (MODE YSHIFT_NO)
      (ROBOT_YGAGE  (-382.96000  -362.96000  -387.96000  -513.37000
-700.37000 15.74000))
      (BGAGE_ABS_MOVE ((-513.37000 110.00000 -700.37000 110.00000
25.74000) (-500.12000 110.00000 -750.71000 110.00000 25.74000)))

8
```

APPENDIX H

```
     (ROBOT_REL_MOVE   ((-15.00000    0.00000    0.00000    0.00000
0.00000)))
     (BGAGE_ABS_MOVE ((-500.12000 110.00000 -750.71000 110.00000
6.00000)))
     (ROBOT_XGAGE (-572.83000 -557.83000 -577.83000))
     (BGAGE_ABS_MOVE ((-490.12000 110.00000 -750.71000 110.00000
6.00000)  (-490.12000  110.00000  -750.71000  110.00000  25.74000)
(-513.37000 110.00000 -700.37000 110.00000 25.74000)))
     (ROBOT_REL_MOVE   ((0.00000    -10.71000    0.00000    0.00000
0.00000)))
     (MEMORIZE_LOAD_POINT (-572.83000 -388.67000 110.00000 0.00000
0.00000))
     (BGAGE_ABS_MOVE ((-513.37000 110.00000 -700.37000 110.00000
10.03000)))
     (ROBOT_YGAGE  (-388.67000 -368.67000 -393.67000 -513.37000
-700.37000 10.03000))
     (MEMORIZE_BEND_POINT (-572.83000 -388.67000 110.00000 0.00000
0.00000)) ) )
(BEND ((TYPE MESSAGE) (FROM RIMD) (TO MACH90) (STATE REQUEST) )
     ((TYPE FOLLOW)
     (BEND (7 4))
     (BEND_ANGLE 90.00000)
     (MATERIAL_THICKNESS 1.00000)
     (PRESS_TRAVEL 2.57000)
     (FOLLOWING_SPEED 0)
     (FOLLOWING_HEIGHT 0.00000)
     (MODE DIE_CONTACT)
     (BGAGE_ABS_MOVE ((-513.37000 110.00000 -700.37000 110.00000
29.16000))) ) )
(GET ((TYPE MESSAGE) (FROM RIMD) (TO MACH90) (STATE REQUEST) )
     ((TYPE PRESSBRAKE)
     (MODE DIE_CONTACT)
     (ROBOT_REL_MOVE ((0.00000 0.00000 10.00000 0.00000 0.00000)
(0.00000 -130.00000 0.00000 0.00000 0.00000)  (0.00000 -61.61000
-80.29000 15.00000 0.00000)  (0.00000 -38.73000 -93.50000 15.00000
0.00000) (0.00000 -13.21000 -100.34000 15.00000 0.00000))) ) )
(PUT ((TYPE MESSAGE) (FROM RIMD) (TO MACH90) (STATE REQUEST) )
     ((TYPE REPO)
     (ROBOT_ABS_MOVE  ((-572.83000  -518.67000  130.00000  0.00000
360.00000)  (-572.83000  -518.67000  130.00000  0.00000  450.00000)
(-201.86000  -518.67000  479.77000  0.00000  450.00000)  (-201.86000
-224.54000 479.77000 0.00000 450.00000)))
     (ROBOT_ZGAGE (88.00000 250.00000))
     (MEMORIZE_PRELOAD_POINT  (-201.86000  -224.54000   479.77000
0.00000 450.00000))
     (ROBOT_REL_MOVE   ((-170.00000    0.00000    0.00000    0.00000
0.00000)))
     (ROBOT_ABS_MOVE ((-371.86000 -224.54000 458.35000 0.00000
450.00000)))
```

APPENDIX H

```
    (EXCHANGE_PART 5.00000)
    (ROBOT_REL_MOVE   ((0.00000   0.00000   -30.00000   0.00000
0.00000)))
    (ROBOT_REL_MOVE   ((170.00000   0.00000   0.00000   0.00000
0.00000))) )
(GET ((TYPE MESSAGE) (FROM RIMD) (TO MACH90) (STATE REQUEST) )
    ((TYPE REPO)
    (ROBOT_ABS_MOVE  ((-201.86000  -224.54000  428.35000  0.00000
450.00000)  (-201.86000  -294.54000  428.35000  0.00000  450.00000)
(-201.86000 -294.54000 439.35000 0.00000 450.00000)))
    (ROBOT_ZGAGE (458.35000 420.35000))
    (MEMORIZE_PRELOAD_POINT  (-201.86000  -294.54000  439.35000
0.00000 450.00000))
    (ROBOT_REL_MOVE   ((-170.00000   0.00000   0.00000   0.00000
0.00000)))
    (ROBOT_ABS_MOVE  ((-371.86000  -294.54000  458.35000  0.00000
450.00000)))
    (EXCHANGE_PART 5.00000)
    (ROBOT_REL_MOVE ((0.00000 0.00000 21.42000 0.00000 0.00000)))

(ROBOT_REL_MOVE   ((172.00000   0.00000   0.00000   0.00000
0.00000))) )
(PUT ((TYPE MESSAGE) (FROM RIMD) (TO MACH90) (STATE REQUEST) )
    ((TYPE PRESSBRAKE)
    (ROBOT_ABS_MOVE  ((-199.86000  -294.54000  479.77000  0.00000
450.00000)  (-199.86000  -243.95000  479.77000  0.00000  450.00000)
(40.05000 -243.95000 130.00000 0.00000 450.00000)))
    (ROBOT_ZGAGE (88.00000 250.00000))
    (MEMORIZE_PRELOAD_POINT   (40.05000   -243.95000   130.00000
0.00000 450.00000))
    (BGAGE_ABS_MOVE ((-192.29000 110.00000 -312.13000 110.00000
53.83000)))
    (ROBOT_REL_MOVE ((0.00000 92.96000 0.00000 0.00000 0.00000)))

(ROBOT_ABS_MOVE   ((50.05000   -150.99000   110.00000   0.00000
450.00000)))
    (ROBOT_ZGAGE (88.00000 250.00000))
    (MODE XGAGE_YES)
    (MODE YSHIFT_NO)
    (ROBOT_YGAGE   (-140.99000   -120.99000   -145.99000   -192.29000
-312.13000 53.83000))
    (BGAGE_ABS_MOVE ((-192.29000 110.00000 -312.13000 110.00000
63.83000) (-126.95000 110.00000 -335.38000 110.00000 63.83000)))
    (ROBOT_REL_MOVE ((15.00000 0.00000 0.00000 0.00000 0.00000)))

(BGAGE_ABS_MOVE ((-126.95000 110.00000 -335.38000 110.00000
44.09000)))
    (ROBOT_XGAGE (50.05000 35.05000 55.05000))
    (BGAGE_ABS_MOVE ((-126.95000 110.00000 -345.38000 110.00000
```

10

APPENDIX H

```
44.09000)   (-126.95000   110.00000   -345.38000   110.00000   63.83000)
(-192.29000 110.00000 -312.13000 110.00000 63.83000)))
       (ROBOT_REL_MOVE ((0.00000 -5.00000 0.00000 0.00000 0.00000)))

(MEMORIZE_LOAD_POINT (40.05000 -140.99000 110.00000 0.00000
90.00000))
       (BGAGE_ABS_MOVE ((-202.29000 110.00000 -322.13000 110.00000
53.83000)))
       (ROBOT_YGAGE  (-140.99000  -120.99000  -145.99000  -202.29000
-322.13000 53.83000))
       (MEMORIZE_BEND_POINT (40.05000 -140.99000 110.00000 0.00000
90.00000)) ) )
(BEND ((TYPE MESSAGE) (FROM RIMD) (TO MACH90) (STATE REQUEST) )
      ((TYPE FOLLOW)
       (BEND (2 6))
       (BEND_ANGLE 90.00000)
       (MATERIAL_THICKNESS 1.00000)
       (PRESS_TRAVEL 2.57000)
       (FOLLOWING_SPEED 0)
       (FOLLOWING_HEIGHT 0.00000)
       (MODE DIE_CONTACT)
       (BGAGE_ABS_MOVE ((-202.29000 110.00000 -322.13000 110.00000
76.32000))) ) )
(GET ((TYPE MESSAGE) (FROM RIMD) (TO MACH90) (STATE REQUEST) )
     ((TYPE PRESSBRAKE)
      (MODE DIE_CONTACT)
      (ROBOT_REL_MOVE ((0.00000 0.00000 10.00000 0.00000 0.00000)
(0.00000  -95.00000  0.00000  0.00000  0.00000)  (0.00000  -22.25000
-28.99000  15.00000  0.00000)  (0.00000  -13.99000  -33.77000  15.00000
0.00000) (0.00000 -4.77000 -36.23000 15.00000 0.00000))) ) )
     (PUT ((TYPE MESSAGE) (FROM RIMD) (TO MACH90) (STATE REQUEST) )
         ((TYPE PRESSBRAKE)
      (ROBOT_ABS_MOVE  ((40.05000   -285.99000   130.00000   0.00000
450.00000)   (40.05000   -457.68000   130.00000   0.00000   450.00000)
(40.05000  -457.68000  130.00000  0.00000  360.00000)   (-642.83000
-438.67000 130.00000 0.00000 360.00000)))
      (ROBOT_ZGAGE (88.00000 250.00000))
      (MEMORIZE_PRELOAD_POINT   (-642.83000   -438.67000   130.00000
0.00000 360.00000))
      (BGAGE_ABS_MOVE ((-513.37000 110.00000 -700.37000 110.00000
53.06000)))
      (ROBOT_REL_MOVE ((0.00000 91.32000 0.00000 0.00000 0.00000)))

(ROBOT_ABS_MOVE   ((-642.83000   -347.35000   110.00000   0.00000
360.00000)))
      (ROBOT_ZGAGE (88.00000 250.00000))
      (MODE XGAGE_YES)
      (MODE YSHIFT_NO)
      (ROBOT_YGAGE  (-337.35000  -317.35000  -342.35000  -513.37000
```

APPENDIX H

```
-700.37000 53.06000))
        (BGAGE_ABS_MOVE ((-513.37000 110.00000 -700.37000 110.00000
63.06000) (-499.78000 110.00000 -750.71000 110.00000 63.06000)))
        (ROBOT_REL_MOVE   ((-15.00000   0.00000   0.00000   0.00000
0.00000)))
        (BGAGE_ABS_MOVE ((-499.78000 110.00000 -750.71000 110.00000
41.24000)))
        (ROBOT_XGAGE (-642.83000 -627.83000 -647.83000))
        (BGAGE_ABS_MOVE ((-489.78000 110.00000 -750.71000 110.00000
41.24000) (-489.78000 110.00000 -750.71000 110.00000 63.06000)
(-513.37000 110.00000 -700.37000 110.00000 63.06000)))
        (ROBOT_REL_MOVE ((0.00000 -5.00000 0.00000 0.00000 0.00000)))

(MEMORIZE_LOAD_POINT (-642.83000 -337.35000 110.00000 0.00000
0.00000))
        (BGAGE_ABS_MOVE ((-513.37000 110.00000 -700.37000 110.00000
53.06000)))
        (ROBOT_YGAGE (-337.35000 -317.35000 -342.35000 -513.37000
-700.37000 53.06000))
        (MEMORIZE_BEND_POINT (-642.83000 -337.35000 110.00000 0.00000
0.00000)) ) )
(BEND ((TYPE MESSAGE) (FROM RIMD) (TO MACH90) (STATE REQUEST) )
    ((TYPE FOLLOW)
     (BEND (5 6))
     (BEND_ANGLE 90.00000)
     (MATERIAL_THICKNESS 1.00000)
     (PRESS_TRAVEL 2.57000)
     (FOLLOWING_SPEED 0)
     (FOLLOWING_HEIGHT 0.00000)
     (MODE DIE_CONTACT)
     (BGAGE_ABS_MOVE ((-513.37000 110.00000 -700.37000 110.00000
71.32000))) ) )
(GET ((TYPE MESSAGE) (FROM RIMD) (TO MACH90) (STATE REQUEST) )
    ((TYPE PRESSBRAKE)
     (MODE DIE_CONTACT)
     (ROBOT_REL_MOVE ((0.00000 0.00000 28.00000 0.00000 0.00000)
(0.00000 -140.00000 0.00000 0.00000 0.00000) (0.00000 -53.45000
-69.66000 15.00000 0.00000) (0.00000 -33.60000 -81.12000 15.00000
0.00000) (0.00000 -11.46000 -87.06000 15.00000 0.00000))) ) )
(PUT ((TYPE MESSAGE) (FROM RIMD) (TO MACH90) (STATE REQUEST) )
    ((TYPE LOADER)
     (ROBOT_ABS_MOVE ((-642.83000  -477.35000 130.00000  0.00000
360.00000) (-642.83000 -477.35000 280.00000 -90.00000 270.00000)
(-642.83000 -477.35000 280.00000 -180.00000 270.00000) (-642.83000
-529.16000 280.00000 -180.00000 270.00000) (612.57000 -529.16000
299.20000 -180.00000 270.00000)))
        (ROBOT_ZGAGE (88.00000 250.00000))
        (MEMORIZE_PRELOAD_POINT  (612.57000   -529.16000   299.20000
-180.00000 270.00000))
```

12

APPENDIX H

```
    (ROBOT_REL_MOVE    ((500.00000    0.00000    0.00000    0.00000
0.00000)))
    (ROBOT_ABS_MOVE ((1112.57000 -529.16000 280.20000 -180.00000
270.00000)))
    (EXCHANGE_PART 5.00000)
    (ROBOT_REL_MOVE ((0.00000 0.00000 5.00000 0.00000 0.00000)))
    (ROBOT_REL_MOVE    ((-212.57000    0.00000    0.00000    0.00000
0.00000))) ) )
```

APPENDIX I

```
****************************************************************
            Copyright 1996 AmadaSoft America, Inc.
                    Example of "RB2" file.
****************************************************************

(STARTUP ((TYPE MESSAGE) (FROM RIMD) (TO MACH90) (STATE REQUEST) )
      ((TYPE PRESSBRAKE)
       (NBENDS 8)
       (NPARTS 1)
       (DIE_WIDTH 7.00000) )
      ((TYPE ROBOT)
       (GRIPPER CLOSE)
       (ROBOT_SPEED 3)
       (VERIFY_POINT  (1017.00000   -426.57000   124.56000   -18.99000
85.40000))
       (ROBOT_ABS_MOVE  ((800.00000  -400.00000  100.00000  0.00000
-90.00000)))  )
      ((TYPE BACKGAGE) ) )
(GET ((TYPE MESSAGE) (FROM RIMD) (TO MACH90) (STATE REQUEST) )
      ((TYPE LOADER)
       (ROBOT_ABS_MOVE   ((900.00000  -500.00000  480.00000   0.00000
-90.00000)  (900.00000  -500.00000  480.00000  -90.00000  -90.00000)
(900.00000  -500.00000  480.00000  -180.00000  -90.00000)  (900.00000
-468.50000  480.00000  -180.00000  -90.00000)  (884.57000  -468.50000
499.20000  -180.00000  -90.00000)))
       (ROBOT_REL_MOVE     ((260.48000    0.00000    0.00000    0.00000
0.00000)))
       (ROBOT_ABS_MOVE ((1145.05000 -468.50000 480.20000 -180.00000
-90.00000)))
       (EXCHANGE_PART 5.00000)
       (ROBOT_REL_MOVE ((0.00000 0.00000 6.50000 0.00000 0.00000)))
       (ROBOT_REL_MOVE     ((-500.00000    0.00000    0.00000    0.00000
0.00000)))  ) )
(PUT ((TYPE MESSAGE) (FROM RIMD) (TO MACH90) (STATE REQUEST) )
      ((TYPE PRESSBRAKE)
       (BGAGE_ABS_MOVE  ((-256.33000  110.00000  -540.33000  110.00000
9.03000)))
       (ROBOT_ABS_MOVE  ((645.05000  -468.50000  486.70000  -180.00000
-90.00000)  (645.05000  -468.50000  486.70000  -90.00000  -90.00000)
(645.05000   -468.50000   486.70000   0.00000   0.00000)   (-364.83000
-468.50000   131.00000   0.00000   0.00000)   (-364.83000   -390.35000
131.00000 0.00000 0.00000)))
       (MODE YSHIFT_NO)
       (ROBOT_YGAGE  (-340.35000  -320.35000  -345.35000  -256.33000
```

APPENDIX I

```
-540.33000 9.03000)) ) )
(BEND ((TYPE MESSAGE) (FROM RIMD) (TO MACH90) (STATE REQUEST) )
     ((TYPE FOLLOW)
       (BEND ((10 1) 8))
       (BEND_ANGLE 90.00000)
       (MATERIAL_THICKNESS 1.00000)
       (PRESS_TRAVEL 2.57000)
       (FOLLOWING_SPEED 0)
       (FOLLOWING_HEIGHT 0.00000)
       (MODE DIE_CONTACT)
       (BGAGE_ABS_MOVE ((-256.33000 110.00000 -540.33000 110.00000
28.16000))) ) )
(GET ((TYPE MESSAGE) (FROM RIMD) (TO MACH90) (STATE REQUEST) )
     ((TYPE PRESSBRAKE)
       (MODE DIE_CONTACT)
       (ROBOT_REL_MOVE ((0.00000 0.00000 10.00000 0.00000 0.00000)
(0.00000 -30.00000 0.00000 0.00000 0.00000) (0.00000 -53.93000
-70.28000 15.00000 0.00000) (0.00000 -33.90000 -81.85000 15.00000
0.00000) (0.00000 -11.56000 -87.83000 15.00000 0.00000))) ) )
(PUT ((TYPE MESSAGE) (FROM RIMD) (TO MACH90) (STATE REQUEST) )
     ((TYPE PRESSBRAKE)
       (BGAGE_ABS_MOVE ((-412.37000 110.00000 -532.21000 110.00000
54.03000)))
       (ROBOT_ABS_MOVE ((-364.83000 -420.35000 131.00000 0.00000
0.00000) (-364.83000 -420.35000 131.00000 0.00000 -90.00000)
(-736.39000 -241.49000 131.00000 0.00000 -90.00000)))
       (MODE YSHIFT_NO)
       (ROBOT_YGAGE (-138.33000 -118.33000 -143.33000 -412.37000
-532.21000 54.03000)) ) )
(BEND ((TYPE MESSAGE) (FROM RIMD) (TO MACH90) (STATE REQUEST) )
     ((TYPE FOLLOW)
       (BEND (4 4))
       (BEND_ANGLE 90.00000)
       (MATERIAL_THICKNESS 1.00000)
       (PRESS_TRAVEL 2.57000)
       (FOLLOWING_SPEED 0)
       (FOLLOWING_HEIGHT 0.00000)
       (MODE DIE_CONTACT)
       (BGAGE_ABS_MOVE ((-412.37000 110.00000 -532.21000 110.00000
73.16000))) ) )
(GET ((TYPE MESSAGE) (FROM RIMD) (TO MACH90) (STATE REQUEST) )
     ((TYPE PRESSBRAKE)
       (MODE DIE_CONTACT)
       (ROBOT_REL_MOVE ((0.00000 0.00000 65.00000 0.00000 0.00000)
(0.00000 -85.00000 0.00000 0.00000 0.00000) (0.00000 -21.83000
-28.44000 15.00000 0.00000) (0.00000 -13.72000 -33.12000 15.00000
0.00000) (0.00000 -4.68000 -35.55000 15.00000 0.00000))) ) )
(PUT ((TYPE MESSAGE) (FROM RIMD) (TO MACH90) (STATE REQUEST) )
     ((TYPE REPO)
```

2

APPENDIX I

```
        (ROBOT_ABS_MOVE  ((-736.39000  -223.33000  130.00000  0.00000
-90.00000)  (-736.39000  -396.08000  130.00000  0.00000  -90.00000)
(-764.56000  -396.08000  479.77000  0.00000  -90.00000)  (-934.56000
-396.08000 479.77000 0.00000 -90.00000)))
        (ROBOT_ABS_MOVE  ((-934.56000  -396.08000  458.35000  0.00000
-90.00000)))
        (EXCHANGE_PART 5.00000)
        (ROBOT_REL_MOVE    ((0.00000    0.00000    -30.00000    0.00000
0.00000)))
        (ROBOT_REL_MOVE    ((-170.00000   0.00000    0.00000    0.00000
0.00000))) ) )
(GET ((TYPE MESSAGE) (FROM RIMD) (TO MACH90) (STATE REQUEST) )
     ((TYPE REPO)
        (ROBOT_ABS_MOVE  ((-1104.56000  -396.08000  428.35000  0.00000
-90.00000)  (-1104.56000  -396.08000  200.00000  0.00000  -90.00000)
(-198.20000  -328.54000  200.00000  0.00000  -90.00000)  (-135.90000
-380.00000   200.00000   0.00000   0.00000)   (-135.90000   -380.00000
200.00000   0.00000   90.00000)   (-198.20000   -380.00000   200.00000
0.00000   90.00000)   (-198.20000   -380.00000   439.35000   0.00000
90.00000)   (-198.20000   -328.54000   439.35000   0.00000   90.00000)
(-368.20000 -328.54000 439.35000 0.00000 90.00000)))
        (ROBOT_ABS_MOVE  ((-368.20000  -328.54000  458.35000  0.00000
90.00000)))
        (EXCHANGE_PART 5.00000)
        (ROBOT_REL_MOVE ((0.00000 0.00000 21.42000 0.00000 0.00000)))

(ROBOT_REL_MOVE    ((172.00000    0.00000    0.00000    0.00000
0.00000))) ) )
(PUT ((TYPE MESSAGE) (FROM RIMD) (TO MACH90) (STATE REQUEST) )
     ((TYPE PRESSBRAKE)
        (BGAGE_ABS_MOVE  ((397.00000  110.00000  103.00000  110.00000
20.03000)))
        (ROBOT_ABS_MOVE  ((-196.20000  -328.54000  479.77000  0.00000
90.00000)  (-196.20000  -496.84000  479.77000  -90.00000  90.00000)
(-196.20000  -496.84000  479.77000  -180.00000  180.00000)  (215.96000
-496.84000  139.16000  -180.00000  180.00000)  (215.96000  -447.83000
139.16000 -180.00000 180.00000)))
        (MODE YSHIFT_NO)
        (ROBOT_YGAGE   (-373.17000   -353.17000   -378.17000   397.00000
103.00000 20.03000)) ) )
(BEND ((TYPE MESSAGE) (FROM RIMD) (TO MACH90) (STATE REQUEST) )
     ((TYPE FOLLOW)
        (BEND ((3 9) 2))
        (BEND_ANGLE 90.00000)
        (MATERIAL_THICKNESS 1.00000)
        (PRESS_TRAVEL 2.57000)
        (FOLLOWING_SPEED 0)
        (FOLLOWING_HEIGHT 0.00000)
        (MODE DIE_CONTACT)
```

3

APPENDIX I

```
        (BGAGE_ABS_MOVE ((397.00000 110.00000 103.00000 110.00000
44.66000))) ) )
(GET ((TYPE MESSAGE) (FROM RIMD) (TO MACH90) (STATE REQUEST) )
        ((TYPE PRESSBRAKE)
        (MODE DIE_CONTACT)
        (ROBOT_REL_MOVE ((0.00000 0.00000 52.00000 0.00000 0.00000)
(0.00000 -65.00000 0.00000 0.00000 0.00000) (0.00000 -59.15000
-77.08000 15.00000 0.00000) (0.00000 -37.18000 -89.76000 15.00000
0.00000) (0.00000 -12.68000 -96.33000 15.00000 0.00000))) ) )
(PUT ((TYPE MESSAGE) (FROM RIMD) (TO MACH90) (STATE REQUEST) )
        ((TYPE PRESSBRAKE)
        (BGAGE_ABS_MOVE ((-686.53000 110.00000 -806.37000 110.00000
54.03000)))
        (ROBOT_ABS_MOVE ((215.96000 -488.17000 149.16000 -180.00000
180.00000) (215.96000 -488.17000 149.16000 -90.00000 270.00000)
(215.96000 -496.84000 149.16000 0.00000 270.00000) (-1048.71000
-242.03000 149.16000 0.00000 270.00000)))
        (MODE YSHIFT_NO)
        (ROBOT_YGAGE (-138.87000 -118.87000 -143.87000 -686.53000
-806.37000 54.03000)) ) )
(BEND ((TYPE MESSAGE) (FROM RIMD) (TO MACH90) (STATE REQUEST) )
        ((TYPE FOLLOW)
        (BEND (6 4))
        (BEND_ANGLE 90.00000)
        (MATERIAL_THICKNESS 1.00000)
        (PRESS_TRAVEL 2.57000)
        (FOLLOWING_SPEED 0)
        (FOLLOWING_HEIGHT 0.00000)
        (MODE DIE_CONTACT)
        (BGAGE_ABS_MOVE ((-686.53000 110.00000 -806.37000 110.00000
76.51000))) ) )
(GET ((TYPE MESSAGE) (FROM RIMD) (TO MACH90) (STATE REQUEST) )
        ((TYPE PRESSBRAKE)
        (MODE DIE_CONTACT)
        (ROBOT_REL_MOVE ((0.00000 0.00000 72.00000 0.00000 0.00000)
(0.00000 -105.00000 0.00000 0.00000 0.00000) (0.00000 -21.91000
-28.56000 15.00000 0.00000) (0.00000 -13.77000 -33.25000 15.00000
0.00000) (0.00000 -4.70000 -35.69000 15.00000 0.00000))) ) )
(PUT ((TYPE MESSAGE) (FROM RIMD) (TO MACH90) (STATE REQUEST) )
        ((TYPE PRESSBRAKE)
        (BGAGE_ABS_MOVE ((-159.11000 110.00000 -278.95000 110.00000
53.83000)))
        (ROBOT_ABS_MOVE ((-1048.71000 -293.87000 149.16000 0.00000
270.00000) (-1048.71000 -293.87000 130.00000 0.00000 270.00000)
(-521.29000 -293.87000 130.00000 0.00000 270.00000) (-521.29000
-242.03000 130.00000 0.00000 270.00000)))
        (MODE YSHIFT_NO)
        (ROBOT_YGAGE (-139.07000 -119.07000 -144.07000 -159.11000
-278.95000 53.83000)) ) )
```

APPENDIX I

```
(BEND ((TYPE MESSAGE) (FROM RIMD) (TO MACH90) (STATE REQUEST) )
    ((TYPE FOLLOW)
    (BEND (8 6))
    (BEND_ANGLE 90.00000)
    (MATERIAL_THICKNESS 1.00000)
    (PRESS_TRAVEL 2.57000)
    (FOLLOWING_SPEED 0)
    (FOLLOWING_HEIGHT 0.00000)
    (MODE DIE_CONTACT)
    (BGAGE_ABS_MOVE ((-159.11000 110.00000 -278.95000 110.00000
76.32000))) ) )
(GET ((TYPE MESSAGE) (FROM RIMD) (TO MACH90) (STATE REQUEST) )
    ((TYPE PRESSBRAKE)
    (MODE DIE_CONTACT)
    (ROBOT_REL_MOVE ((0.00000 0.00000 10.00000 0.00000 0.00000)
(0.00000 -95.00000 0.00000 0.00000 0.00000) (0.00000 -21.94000
-28.60000 15.00000 0.00000) (0.00000 -13.79000 -33.30000 15.00000
0.00000) (0.00000 -4.70000 -35.74000 15.00000 0.00000))) ) )
(PUT ((TYPE MESSAGE) (FROM RIMD) (TO MACH90) (STATE REQUEST) )
    ((TYPE PRESSBRAKE)
    (BGAGE_ABS_MOVE ((-513.37000 110.00000 -700.37000 110.00000
10.03000)))
    (ROBOT_ABS_MOVE ((-521.29000 -284.07000 130.00000 0.00000
270.00000) (-521.29000 -466.84000 130.00000 0.00000 270.00000)
(-521.29000 -466.84000 130.00000 0.00000 360.00000) (-572.83000
-447.83000 130.00000 0.00000 360.00000)))
    (MODE YSHIFT_NO)
    (ROBOT_YGAGE (-388.67000 -368.67000 -393.67000 -513.37000
-700.37000 10.03000)) ) )
(BEND ((TYPE MESSAGE) (FROM RIMD) (TO MACH90) (STATE REQUEST) )
    ((TYPE FOLLOW)
    (BEND (7 4))
    (BEND_ANGLE 90.00000)
    (MATERIAL_THICKNESS 1.00000)
    (PRESS_TRAVEL 2.57000)
    (FOLLOWING_SPEED 0)
    (FOLLOWING_HEIGHT 0.00000)
    (MODE DIE_CONTACT)
    (BGAGE_ABS_MOVE ((-513.37000 110.00000 -700.37000 110.00000
29.16000))) ) )
(GET ((TYPE MESSAGE) (FROM RIMD) (TO MACH90) (STATE REQUEST) )
    ((TYPE PRESSBRAKE)
    (MODE DIE_CONTACT)
    (ROBOT_REL_MOVE ((0.00000 0.00000 10.00000 0.00000 0.00000)
(0.00000 -130.00000 0.00000 0.00000 0.00000) (0.00000 -61.61000
-80.29000 15.00000 0.00000) (0.00000 -38.73000 -93.50000 15.00000
0.00000) (0.00000 -13.21000 -100.34000 15.00000 0.00000))) ) )
(PUT ((TYPE MESSAGE) (FROM RIMD) (TO MACH90) (STATE REQUEST) )
    ((TYPE REPO)
```

5

APPENDIX I

```
     (ROBOT_ABS_MOVE ((-572.83000  -518.67000  130.00000  0.00000
360.00000)  (-572.83000  -518.67000  130.00000  0.00000  450.00000)
(-201.86000  -518.67000  479.77000  0.00000  450.00000)  (-201.86000
-224.54000  479.77000  0.00000  450.00000)  (-371.86000  -224.54000
479.77000 0.00000 450.00000)))
     (ROBOT_ABS_MOVE ((-371.86000  -224.54000  458.35000  0.00000
450.00000)))
     (EXCHANGE_PART 5.00000)
     (ROBOT_REL_MOVE    ((0.00000    0.00000    -30.00000    0.00000
0.00000)))
     (ROBOT_REL_MOVE    ((170.00000    0.00000    0.00000    0.00000
0.00000))) )
(GET ((TYPE MESSAGE) (FROM RIMD) (TO MACH90) (STATE REQUEST) )
     ((TYPE REPO)
     (ROBOT_ABS_MOVE ((-201.86000  -224.54000  428.35000  0.00000
450.00000)  (-201.86000  -294.54000  428.35000  0.00000  450.00000)
(-201.86000  -294.54000  439.35000  0.00000  450.00000)  (-371.86000
-294.54000 439.35000 0.00000 450.00000)))
     (ROBOT_ABS_MOVE ((-371.86000  -294.54000  458.35000  0.00000
450.00000)))
     (EXCHANGE_PART 5.00000)
     (ROBOT_REL_MOVE ((0.00000 0.00000 21.42000 0.00000 0.00000)))

(ROBOT_REL_MOVE    ((172.00000    0.00000    0.00000    0.00000
0.00000))) )
(PUT ((TYPE MESSAGE) (FROM RIMD) (TO MACH90) (STATE REQUEST) )
     ((TYPE PRESSBRAKE)
     (BGAGE_ABS_MOVE ((-202.29000 110.00000 -322.13000 110.00000
53.83000)))
     (ROBOT_ABS_MOVE ((-199.86000  -294.54000  479.77000  0.00000
450.00000)  (-199.86000  -243.95000  479.77000  0.00000  450.00000)
(40.05000 -243.95000 130.00000 0.00000 450.00000)))
     (MODE YSHIFT_NO)
     (ROBOT_YGAGE  (-140.99000  -120.99000  -145.99000  -202.29000
-322.13000 53.83000)) ) )
(BEND ((TYPE MESSAGE) (FROM RIMD) (TO MACH90) (STATE REQUEST) )
     ((TYPE FOLLOW)
     (BEND (2 6))
     (BEND_ANGLE 90.00000)
     (MATERIAL_THICKNESS 1.00000)
     (PRESS_TRAVEL 2.57000)
     (FOLLOWING_SPEED 0)
     (FOLLOWING_HEIGHT 0.00000)
     (MODE DIE_CONTACT)
     (BGAGE_ABS_MOVE ((-202.29000 110.00000 -322.13000 110.00000
76.32000))) ) )
(GET ((TYPE MESSAGE) (FROM RIMD) (TO MACH90) (STATE REQUEST) )
     ((TYPE PRESSBRAKE)
     (MODE DIE_CONTACT)
```

6

APPENDIX I

```
        (ROBOT_REL_MOVE ((0.00000 0.00000 10.00000 0.00000 0.00000)
(0.00000 -95.00000 0.00000 0.00000 0.00000) (0.00000 -22.25000
-28.99000 15.00000 0.00000) (0.00000 -13.99000 -33.77000 15.00000
0.00000) (0.00000 -4.77000 -36.23000 15.00000 0.00000))) ) )
  (PUT ((TYPE MESSAGE) (FROM RIMD) (TO MACH90) (STATE REQUEST) )
      ((TYPE PRESSBRAKE)
        (BGAGE_ABS_MOVE ((-513.37000 110.00000 -700.37000 110.00000
53.06000)))
        (ROBOT_ABS_MOVE   ((40.05000   -285.99000   130.00000   0.00000
450.00000)    (40.05000    -457.68000   130.00000   0.00000   450.00000)
(40.05000   -457.68000  130.00000   0.00000   360.00000)   (-642.83000
-438.67000 130.00000 0.00000 360.00000)))
        (MODE YSHIFT_NO)
        (ROBOT_YGAGE   (-337.35000  -317.35000  -342.35000  -513.37000
-700.37000 53.06000)) ) )
  (BEND ((TYPE MESSAGE) (FROM RIMD) (TO MACH90) (STATE REQUEST) )
      ((TYPE FOLLOW)
        (BEND (5 6))
        (BEND_ANGLE 90.00000)
        (MATERIAL_THICKNESS 1.00000)
        (PRESS_TRAVEL 2.57000)
        (FOLLOWING_SPEED 0)
        (FOLLOWING_HEIGHT 0.00000)
        (MODE DIE_CONTACT)
        (BGAGE_ABS_MOVE ((-513.37000 110.00000 -700.37000 110.00000
71.32000))) ) )
  (GET ((TYPE MESSAGE) (FROM RIMD) (TO MACH90) (STATE REQUEST) )
      ((TYPE PRESSBRAKE)
        (MODE DIE_CONTACT)
        (ROBOT_REL_MOVE ((0.00000 0.00000 28.00000 0.00000 0.00000)
(0.00000 -140.00000 0.00000 0.00000 0.00000) (0.00000 -53.45000
-69.66000 15.00000 0.00000) (0.00000 -33.60000 -81.12000 15.00000
0.00000) (0.00000 -11.46000 -87.06000 15.00000 0.00000))) ) )
  (PUT ((TYPE MESSAGE) (FROM RIMD) (TO MACH90) (STATE REQUEST) )
      ((TYPE LOADER)
        (ROBOT_ABS_MOVE   ((-642.83000   -477.35000   130.00000   0.00000
360.00000) (-642.83000 -477.35000 280.00000 -90.00000 270.00000)
(-642.83000 -477.35000 280.00000 -180.00000 270.00000) (-642.83000
-529.16000 280.00000 -180.00000 270.00000) (612.57000 -529.16000
299.20000 -180.00000 270.00000)))
        (ROBOT_REL_MOVE    ((500.00000    0.00000    0.00000    0.00000
0.00000)))
        (ROBOT_ABS_MOVE ((1112.57000 -529.16000 280.20000 -180.00000
270.00000)))
        (EXCHANGE_PART 5.00000)
        (ROBOT_REL_MOVE ((0.00000 0.00000 5.00000 0.00000 0.00000)))
        (ROBOT_REL_MOVE    ((-212.57000    0.00000    0.00000    0.00000
0.00000))) ) )
```

What is claimed:

1. An integrated sheet metal manufacturing and production system, comprising:
an intelligent manufacturing system which develops a bend model of a sheet metal part to be produced;
an expert planning system which develops bending plan information related to a bending plan for producing said sheet metal part based on said bend model, said expert planning system including a plurality of expert modules; and
a system to select a set of said plurality of expert modules in order to adapt said expert planning system for different bending applications, said expert planning system developing said bending plan information based on said set of said plurality of expert modules that are selected.

2. An integrated sheet metal manufacturing and production system according to claim 1, wherein said system to select said set of said plurality of expert modules comprises means for indicating to said expert planning system said set of said plurality of expert modules that are selected.

3. An integrated sheet metal manufacturing and production system according to claim 2, wherein said indicating means indicates said set of said plurality of expert modules that are selected based on Feature Exchange Language (FEL) commands.

4. An integrated sheet metal manufacturing and production system according to claim 3, wherein said FEL commands comprise a TYPE EXPERTS command to indicate said set of said plurality of expert modules that are selected.

5. An integrated sheet metal manufacturing and production system according to claim 1, wherein said different bending applications comprise robot-assisted bending operations and manual, operator-assisted bending operations.

6. An integrated sheet metal manufacturing and production system according to claim 1, said plurality of expert modules comprising a planning expert module, said planning expert module proposing and developing a bend sequence based on said bend model.

7. An integrated sheet metal manufacturing and production system according to claim 6, said plurality of expert modules further comprising a tooling expert module, a holding expert module and a motion expert module.

8. An integrated sheet metal manufacturing and production system according to claim 7, said planning expert module comprising means for selectively querying said tooling expert module, said holding expert module or said motion expert module to obtain expert information and to develop said bend sequence.

9. An integrated sheet metal manufacturing and production system according to claim 8, wherein said tooling expert module provides tooling information to said planning expert module, said tooling information including a tool type needed for performing a bend operation in said bend sequence.

10. An integrated sheet metal manufacturing and production system according to claim 8, wherein said holding expert module provides holding information to said planning expert module, said holding information including a location where a robot can grasp said sheet metal part during a bend operation in said bend sequence.

11. An integrated sheet metal manufacturing and production system according to claim 8, wherein said motion expert module generates and provides motion plan information to said planning expert module, said motion plan information including a robot motion path for handling said sheet metal part to perform bending operations in said bend sequence.

12. An integrated sheet metal manufacturing and production system according to claim 8, said planning expert module further comprising means for generating said bending plan information based on said bend sequence and said expert information obtained from said expert modules that are selected.

13. An integrated sheet metal manufacturing and production system according to claim 1, further comprising a constraint system for selectively constraining said bending plan information developed by said expert planning system based on a defined constraint.

14. An integrated sheet metal manufacturing and production system according to claim 13, said constraint system comprising a constraint manager for developing a constraint phrase in accordance with said defined constraint, and means for conveying said constraint phrase to said expert planning system, said expert planning system developing said bending plan information based on said constraint phrase.

15. An integrated sheet metal manufacturing and production system according to claim 14, wherein said defined constraint comprises a bend sequence constraint, said constraint manager developing said constraint phrase based on said bend sequence constraint.

16. An integrated sheet metal manufacturing and production system according to claim 1, wherein said bending plan information developed by said expert planning system comprises a bend sequence for performing bending operations and producing said sheet metal part.

17. An integrated sheet metal manufacturing and production system according to claim 16, further comprising means for displaying said bend sequence developed by said expert planning system and means for selectively modifying said bend sequence.

18. In an integrated sheet metal manufacturing and production system comprising an expert planning system having a plurality of expert modules, a method for developing a bending plan for producing a sheet metal part in accordance with one of a plurality of bending applications, said bending applications including a robot-assisted bending application and a manual, operator-assisted bending application, said method comprising:
creating a bend model of said sheet metal part to be produced, said bend model comprising bend model data;
selecting a set of said plurality of expert modules in accordance with one of said plurality of bending applications;
developing a proposed bending plan based on said set of said plurality of expert modules that are selected;
displaying said proposed bending plan; and
storing said proposed bending plan as a final bending plan under a predetermined condition.

19. A method according to claim 18, wherein said proposed bending plan is stored as the final bending plan after said proposed bending plan has been reviewed and confirmed by an operator.

20. A method according to claim 18, further comprising deleting said proposed bending plan when said proposed bending plan is not confirmed by an operator, entering a constraint to selectively constrain said set of said expert modules that are selected, and developing another proposed bending plan with said set of said expert modules in accordance with said constraint.

21. A method according to claim 18, wherein said plurality of expert modules are selected based on a Feature Exchange Language (FEL) command.

22. A method according to claim 21, wherein said FEL command comprises a TYPE EXPERTS command to indicate said set of said expert modules that are selected.

23. A method according to claim 18, said plurality of expert modules comprising a planning expert module, said proposed bending plan being developed by proposing and developing a bend sequence with said planning expert module based on said bend model data.

24. A method according to claim 23, said plurality of expert modules further comprising a tooling expert module, a holding expert module and a motion expert module, said method further comprising selectively querying said tooling expert module, said holding expert module or said motion expert module with said planning expert module to obtain expert information and to develop said bend sequence.

25. An integrated sheet metal manufacturing and production system, comprising:
   an intelligent manufacturing system to develop a bend model of a sheet metal part to be produced;
   an expert planning system to develop and propose a bending plan for producing said sheet metal part based on said bend model; and
   a constraint system to selectively constrain said bending plan developed by said expert planning system based on a defined constraint, said constraint system including a constraint manager which develops a constraint phrase in accordance with said defined constraint, wherein said expert planning system develops said bending plan in accordance with said constraint phrase.

26. An integrated sheet metal manufacturing and production system according to claim 25, wherein said defined constraint comprises a bend sequence constraint, said constraint manager developing said constraint phrase based on said bend sequence constraint.

27. An integrated sheet metal manufacturing and production system according to claim 25, wherein said defined constraint comprises a tool selection constraint, said constraint manager developing said constraint phrase based on said tool selection constraint.

28. An integrated sheet metal manufacturing and production system according to claim 25, further comprising means for entering a bend sequence, said constraint manager developing said constraint phrase based on said bend sequence entered by entering means.

29. An integrated sheet metal manufacturing and production system according to claim 25, wherein said defined constraint comprises a partial bend sequence constraint, said constraint manager developing said constraint phrase based on said partial bend sequence constraint.

30. An integrated sheet metal manufacturing and production system according to claim 26, wherein said constraint manager comprises means for developing an initial constraint phrase based on said bend sequence, means for detecting co-linear bends in said sheet metal part, and means for modifying said initial constraint phrase based on the detection of said co-linear bends.

31. An integrated sheet metal manufacturing and production system according to claim 30, said constraint manager further comprising means for detecting Z-bends in said sheet metal part, and means for modifying said initial constraint phrase based on the detection of said Z-bends.

32. An integrated sheet metal manufacturing and production system according to claim 31, wherein said means for modifying said initial constraint phrase based on the detection of said Z-bends modifies said initial constraint phrase based on said Z-bend detecting means detecting Z-bends in accordance with the following: $Z<N\times T$, wherein "Z" is the height of the Z-bend, "T" is the thickness of said sheet metal part, and "N" is a predetermined coefficient.

33. An integrated sheet metal manufacturing and production system according to claim 25, further comprising entering means, associated with said intelligent manufacturing system, for entering a bend sequence, said constraint manager developing said constraint phrase based on said bend sequence entered by said entering means, said entering means comprising a sequence table that includes an identification number for each bend in said sheet metal part and an associated bend sequence number in accordance with said bend sequence, said identification number for each bend being associated with a first set of bend identification numbers.

34. An integrated sheet metal manufacturing and production system according to claim 33, further comprising a matching identification table for matching said first set of bend identification numbers, associated with said intelligent manufacturing system, with a second set of bend identification numbers, associated with said expert planning system, and a final bend sequence table that includes identification numbers for each bend, in accordance with said second set of bend identification numbers, and a translated bend sequence number based on said sequence table and said matching identification table.

35. An integrated sheet metal manufacturing and production system according to claim 25, wherein said defined constraint comprises a plurality of constraint expressions, said constraint manager comprising means for detecting conflicts between said constraint expressions based on a presence of common operating constraints within a pair of said constraint expressions.

36. An integrated sheet metal manufacturing and production system according to claim 25, wherein said constraint system selectively constrains said bending plan based on a plurality of defined constraints, said constraint manager comprising means for detecting and resolving conflicts among the defined constraints, and means for developing said constraint phrase based on the resolved conflicts.

37. An integrated sheet metal manufacturing and production system according to claim 25, further comprising a display for displaying said constraint phrase developed by said constraint manager to an operator so that the operator may review and confirm said constraint phrase.

38. In an integrated sheet metal manufacturing and production system, a method for developing constraint phrases based on defined constraints, said method comprising:
   creating a bend model of a sheet metal part to be produced;
   defining a constraint, said defining comprising developing a constraint phrase in accordance with said defined constraint; and
   developing and proposing a bending plan for producing said sheet metal part, said bending plan being developed based on said bend model of said sheet metal part and said constraint phrase.

39. A method according to claim 38, wherein said defined constraint comprises a bend sequence constraint, said method further comprising developing said constraint phrase based on said bend sequence constraint.

40. A method according to claim 38, wherein said defined constraint comprises a tool selection constraint, said method further comprising developing said constraint phrase based on said tool selection constraint.

41. A method according to claim 38, further comprising creating a bend sequence, said constraint manager developing said constraint phrase based on said bend sequence that is created.

42. A method according to claim 38, wherein said constraint phrase is developed by developing an initial constraint phrase based on said bend sequence, detecting co-linear bends in said sheet metal part, and modifying said initial constraint phrase based on the detection of said co-linear bends.

43. A method according to claim 42, further comprising detecting Z-bends in said sheet metal part, and modifying said initial constraint phrase based on the detection of said Z-bends.

44. A method according to claim 38, said defined constraint comprising a plurality of constraint expressions, said method further comprising detecting conflicts between said constraint expressions based on a presence of common operating constraints within a pair of said constraint expressions.

45. A method according to claim 38, further comprising defining a plurality of constraints, detecting and resolving conflicts among the defined constraints, and developing said constraint phrase based on the resolved conflicts.

46. A method according to claim 38, further comprising displaying said constraint phrase that is developed to an operator so that the operator may confirm said constraint phrase.

47. An integrated system for developing a bending plan for a sheet metal part to be produced, said system comprising:
an intelligent manufacturing system which creates a bend model of said sheet metal part;
an expert planning system which develops and proposes bending plan information related to a bending plan for producing said sheet metal part based on said bend model; and
an interface module which generates and transfers messages from said intelligent manufacturing system to said expert planning system, said expert planning system developing said bending plan information based on said messages,
said expert planning system comprising a plurality of expert modules, said integrated system further comprising a system to select a set of said plurality of expert modules in order to adapt said expert planning system for different bending applications, wherein said bending plan information is developed by said set of said plurality of expert modules that are selected.

48. A system according to claim 47, wherein said messages are generated by said interface module based on a Feature Exchange Language (FEL), said FEL messages being transferred by said interface module to initialize said expert planning system and to transfer setup information.

49. A system according to claim 47, wherein said interface module comprises a conveying system to convey, to said expert planning system, said set of said plurality of expert modules that are selected.

50. A system according to claim 49, wherein said conveying system conveys said set of said plurality of expert modules that are selected based on a Feature Exchange Language (FEL) command.

51. A system according to claim 50, wherein said FEL command comprises a TYPE EXPERTS command indicating said set of said plurality of expert modules that are selected.

52. A system according to claim 47, wherein said intelligent manufacturing system and said expert planning system comprise computer-based applications, said interface module comprising sockets which transfer messages and information between said applications of said intelligent manufacturing system and said expert planning system.

53. A system according to claim 47, said expert planning system comprising a transfer system to transfer said bending plan information to said interface module, said bending plan information being transferred based on Feature Exchange Language (FEL) messages, said interface module comprising a system that detects said bending plan information from said expert planning system based on said FEL messages and transfers said bending plan information to said intelligent manufacturing system.

54. An integrated system for developing a bending plan for a sheet metal part to be produced, said system comprising:
an intelligent manufacturing system which creates a bend model of said sheet metal part;
an expert planning system which develops and proposes bending plan information related to a bending plan for producing said sheet metal part based on said bend model;
an interface module which generates and transfers messages from said intelligent manufacturing system to said expert planning system, said expert planning system developing said bending plan information based on said messages; and
a constraint system which selectively constrains said bending plan information developed by said expert planning system based on a defined constraint,
said constraint system comprising a constraint manager which develops a constraint phrase in accordance with said defined constraint, said interface module comprising an indicating module which indicates said constraint phrase to said expert planning system, said expert planning system developing said bending plan information based on said constraint phrase.

55. A system according to claim 54, wherein said indicating module communicates said constraint phrase based on a Feature Exchange Language (FEL) command.

56. A system according to claim 55, wherein said FEL command comprises a TYPE OPTIONS command and a CONSTRAINTS command to indicate said constraint phrase.

57. A system according to claim 54, wherein said intelligent manufacturing system and said expert planning system comprise computer-based applications, said interface module comprising sockets which transfer messages and information between said applications of said intelligent manufacturing system and said expert planning system.

58. A system according to claim 54, said expert planning system comprising a transfer system to transfer said bending plan information to said interface module, said bending plan information being transferred based on Feature Exchange Language (FEL) messages, said interface module comprising a system that detects said bending plan information from said expert planning system based on said FEL messages and transfers said bending plan information to said intelligent manufacturing system.

59. An integrated sheet metal manufacturing and production system, comprising:
an intelligent manufacturing system for creating a bend model of a sheet metal part to be produced, said bend model comprising bend model data;
an expert planning system for developing, based on said bend model data, bending plan information for producing said sheet metal part; and
a system for selectively activating said expert planning system for different bending applications, whereby an operator may independently develop a bending plan based on said bend model or selectively activate said expert planning system to develop said proposed bending plan information.

60. A system according to claim 59, said expert planning system comprising a plurality of expert modules, said integrated system further comprising a system for selecting a set of said plurality of expert modules, wherein said bending plan information is developed by said set of said plurality of expert modules that are selected.

61. A system according to claim 60, wherein said set of said plurality of expert modules comprises all of said expert modules, said bending plan information being developed by all of said expert modules.

62. A system according to claim 60, wherein said set of said plurality of expert modules comprises at least one of said expert modules, said bending plan information being developed by said at least one of said expert modules.

63. A system according to claim 60, wherein said bending plan information comprises one or more items from the group including: a bend sequence, tool selection, tool stage layout, robot motion paths, repositioning and backgauge settings.

64. A system according to claim 59, further comprising a constraint system for selectively constraining said bending plan information developed by said expert planning system based on a defined constraint.

65. A system according to claim 64, said constraint system comprising a constraint manager for developing a constraint phrase in accordance with said defined constraint, said integrated system further comprising means for indicating said constraint phrase to said expert planning system, said expert planning system developing said bending plan information based on said constraint phrase.

66. A system according to claim 65, further comprising means for entering a bend sequence, said constraint manager developing said constraint phrase based on said bend sequence entered by said entering means.

67. A system according to claim 65, wherein said defined constraint comprises a tool selection constraint, said constraint manager developing said constraint phrase based on said tool selection constraint.

68. A system according to claim 60, said plurality of expert modules comprising a planning expert module, said planning expert module proposing and developing a bend sequence based on said bend model.

69. A system according to claim 68, said plurality of expert modules further comprising a tooling expert module, a holding expert module and a motion expert module.

70. A system according to claim 69, said planning expert module comprising a system for selectively querying said tooling expert module, said holding expert module or said motion expert module to obtain expert information and to develop said bend sequence.

71. An integrated sheet metal manufacturing and production system, comprising:

an intelligent manufacturing system for creating a bend model of a sheet metal part to be produced, said bend model comprising bend model data;

an expert planning system for developing, based on said bend model data, bending plan information for producing said sheet metal part; and a system for selectively activating said expert planning system for different bending applications, whereby an operator may independently develop a bending plan based on said bend model or selectively activate said expert planning system to develop said proposed bending plan information, said expert planning system comprising a plurality of expert modules, said integrated system further comprising a system for selecting a set of said plurality of expert modules, wherein said bending plan information is developed by said set of said plurality of expert modules that are selected.

* * * * *

UNITED STATES PATENT AND TRADEMARK OFFICE
CERTIFICATE OF CORRECTION

PATENT NO. : 5,822,207  
DATED : October 13, 1998  
INVENTOR(S) : Kensuke Hazama et al.

It is certified that error appears in the above-identified patent and that said Letters Patent is hereby corrected as shown below:

On the title page of the printed patent at item [56], OTHER PUBLICATIONS, in the last reference cited "Prcoesses" should be --Processes--.

Signed and Sealed this

Twenty-sixth Day of June, 2001

*Attest:*

NICHOLAS P. GODICI  
*Attesting Officer*     *Acting Director of the United States Patent and Trademark Office*